United States Patent
Price et al.

(10) Patent No.: US 12,179,954 B2
(45) Date of Patent: *Dec. 31, 2024

(54) SYSTEMS AND METHODS FOR THE HIGH-SPEED APPLICATION OF PAPER-BASED END CLOSURES ON COMPOSITE CONTAINERS

(71) Applicant: Sonoco Development Inc., Hartsville, SC (US)

(72) Inventors: Trevor Price, North Canton, OH (US); James J. Peoples, Newbury, OH (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,538

(22) Filed: Oct. 18, 2023

(65) Prior Publication Data

US 2024/0043149 A1 Feb. 8, 2024

Related U.S. Application Data

(63) Continuation of application No. 17/701,269, filed on Mar. 22, 2022, now Pat. No. 11,834,218, which is a
(Continued)

(51) Int. Cl.
*B65B 51/22* (2006.01)
*B65B 7/28* (2006.01)
(Continued)

(52) U.S. Cl.
CPC .............. *B65B 7/2807* (2013.01); *B65B 7/28* (2013.01); *B65B 7/285* (2013.01); *B65D 3/04* (2013.01);
(Continued)

(58) Field of Classification Search
CPC ....... B65B 7/2807; B65B 7/285; B65B 41/06; B67B 3/06; B67B 3/062; B67B 2201/06;
(Continued)

(56) References Cited

U.S. PATENT DOCUMENTS

| | | | |
|---|---|---|---|
| 1,585,820 A | 5/1926 | Baum | |
| 2,085,879 A | 7/1937 | Trump | |

(Continued)

FOREIGN PATENT DOCUMENTS

| | | | |
|---|---|---|---|
| CN | 1960936 A | 5/2007 | |
| CN | 101772466 A | 7/2010 | |

(Continued)

OTHER PUBLICATIONS

Chinese First Office Action for application No. 202180048071.7; Issued Dec. 22, 2023; English translation provided; 8 pages.
(Continued)

*Primary Examiner* — Stephen F. Gerrity
(74) *Attorney, Agent, or Firm* — Nelson Mullins Riley & Scarborough LLP

(57) ABSTRACT

A system for assembling a container and closure comprising an expanding collet which has a plurality of pivoting collet segments, each configured to simultaneously pivot radially outward about a pivot point and comprising. The collet comprises a lip that is engagable with the rim of the open end of the container and an angled tip positioned radially inward from the lip and shaped to press a countersink portion of the closure against an interior wall of the container as the collet segments pivot radially outward. As the container and the chuck are brought together, the rim engages with the lips of the collet segments and causes the angled tips of the collet segments to pivot outward toward the interior wall of the container, thereby pushing the countersink portion of the closure against the interior wall of the container.

20 Claims, 52 Drawing Sheets

Related U.S. Application Data continuation of application No. 17/331,982, filed on May 27, 2021, now Pat. No. 11,673,696.

(60) Provisional application No. 63/125,013, filed on Dec. 14, 2020, provisional application No. 63/030,959, filed on May 28, 2020.

(51) Int. Cl.
   *B65D 3/04* (2006.01)
   *B29C 65/00* (2006.01)

(52) U.S. Cl.
   CPC ....... *B29C 66/53461* (2013.01); *B65B 7/2878* (2013.01); *B65B 51/227* (2013.01)

(58) Field of Classification Search
   CPC .... B65G 47/06; B65G 47/848; B65G 47/904; B65G 47/915; B65G 47/918; B65G 59/10
   USPC .......... 53/485, 488, 302, 304, 307, 310–312
   See application file for complete search history.

(56) References Cited

U.S. PATENT DOCUMENTS

| | | | |
|---|---|---|---|
| 2,204,594 A | 6/1940 | Hogg | |
| 2,246,398 A | 6/1941 | Van Saun et al. | |
| 2,600,138 A * | 6/1952 | Tesch, Jr. ............. | B65G 47/848 53/287 |
| 2,703,952 A | 3/1955 | Perriguey | |
| 2,915,308 A | 12/1959 | Matzen | |
| 2,972,216 A | 2/1961 | Schmidt | |
| 2,974,459 A | 3/1961 | Kinney | |
| 3,026,989 A | 3/1962 | Schaltegger | |
| 3,234,707 A | 2/1966 | Weston | |
| 3,837,141 A | 9/1974 | Lorieux | |
| 3,892,351 A | 7/1975 | Johnson et al. | |
| 3,939,625 A * | 2/1976 | Remele et al. ....... | B65B 7/2807 53/329.3 |
| 4,005,975 A | 2/1977 | Sollerud | |
| 4,094,460 A | 6/1978 | Scanga et al. | |
| 4,301,640 A | 11/1981 | Hass | |
| 4,504,350 A | 3/1985 | Joo | |
| 4,516,765 A | 5/1985 | Stocco et al. | |
| 4,599,123 A | 7/1986 | Christensson | |
| 4,643,633 A | 2/1987 | Lashyro | |
| 4,692,132 A | 9/1987 | Ikushima et al. | |
| 4,773,525 A | 9/1988 | Gertitschke et al. | |
| 5,013,878 A | 5/1991 | Fries, Jr. | |
| 5,035,106 A | 7/1991 | Haase | |
| 5,946,886 A * | 9/1999 | Bealer .................. | B65B 7/2807 53/287 |
| 6,471,083 B1 | 10/2002 | Helms | |
| 6,558,305 B1 | 5/2003 | Haggman | |
| 10,144,541 B2 * | 12/2018 | Rea et al. ............. | B65B 7/2807 |
| 11,198,526 B2 | 12/2021 | Burken et al. | |
| 11,673,696 B2 | 6/2023 | Price | |
| 11,827,407 B2 | 11/2023 | Price et al. | |
| 11,834,218 B2 | 12/2023 | Price et al. | |
| 2007/0164095 A1 | 7/2007 | Schuetz | |
| 2009/0193759 A1 | 8/2009 | Ueda et al. | |
| 2010/0205904 A1 | 8/2010 | Zanini | |
| 2012/0184421 A1 | 7/2012 | Clougherty et al. | |
| 2015/0375943 A1 * | 12/2015 | Ellefson et al. ..... | B65G 47/244 101/40.1 |
| 2018/0002074 A1 | 1/2018 | Berg et al. | |
| 2018/0297104 A1 | 10/2018 | Horz | |
| 2019/0217986 A1 | 7/2019 | Clougherty | |
| 2020/0094998 A1 | 3/2020 | Horz | |
| 2020/0180797 A1 | 6/2020 | Holka et al. | |

FOREIGN PATENT DOCUMENTS

| | | |
|---|---|---|
| CN | 105083606 A | 11/2015 |
| CN | 106660670 A | 5/2017 |
| CN | 107207130 A | 9/2017 |
| CN | 108025820 A | 5/2018 |
| CN | 108025846 A | 5/2018 |
| CN | 110536839 A | 12/2019 |
| CN | 110650891 A | 1/2020 |
| DE | 1906796 A1 | 8/1970 |
| DE | 19606796 A1 | 11/1996 |
| DE | 102017101150 B3 | 5/2018 |
| GB | 532595 A | 1/1941 |
| GB | 767029 A | 1/1957 |
| GB | 2176457 A | 12/1986 |
| JP | S52106984 A | 9/1977 |
| TW | 484593 U | 4/2002 |
| WO | 2010049589 A1 | 5/2010 |
| WO | 2016005800 A1 | 1/2016 |

OTHER PUBLICATIONS

Non Final Amendment for U.S. Appl. No. 18/433,989 dated Nov. 8, 2023; 14 pages.

International Search Report and Written Opinion issued in International application No. PCT/US2021/034448; Dated Sep. 9, 2021; 12 pages.

Non Final Office Action for U.S. Appl. No. 17/701,269; Dated Nov. 10, 2022; 22 pages.

Ex parte Quayle Action for U.S. Appl. No. 17/735,302: Dated Nov. 10, 2022; 12 pages.

Non-Final Office Action for U.S. Appl. No. 17/331,982 dated Sep. 22, 2022.

Japanese Office Action for App. No. 2022-573401, Dated Sep. 20, 2024; 9 Pages (Translation provided; only new art cited herein).

* cited by examiner

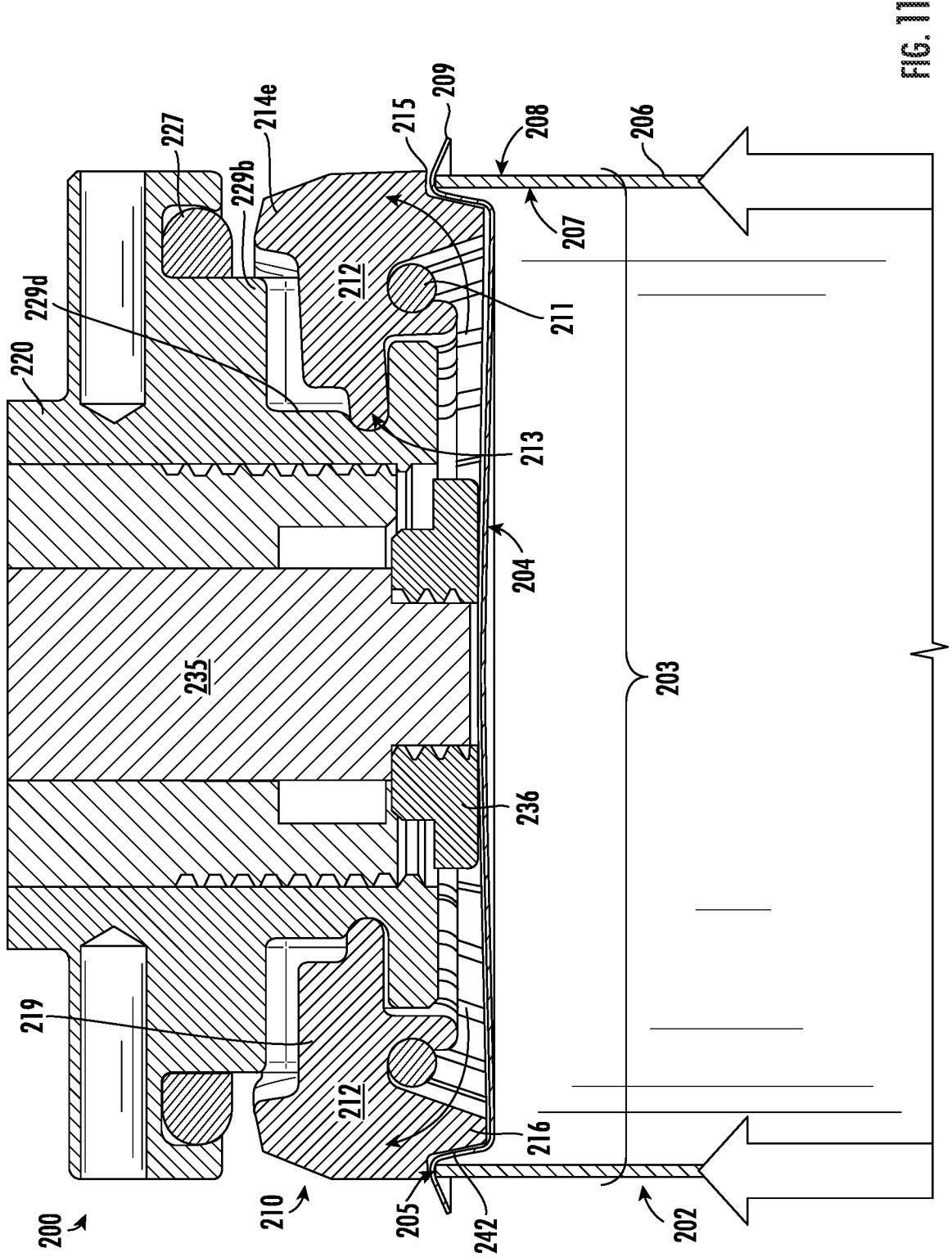

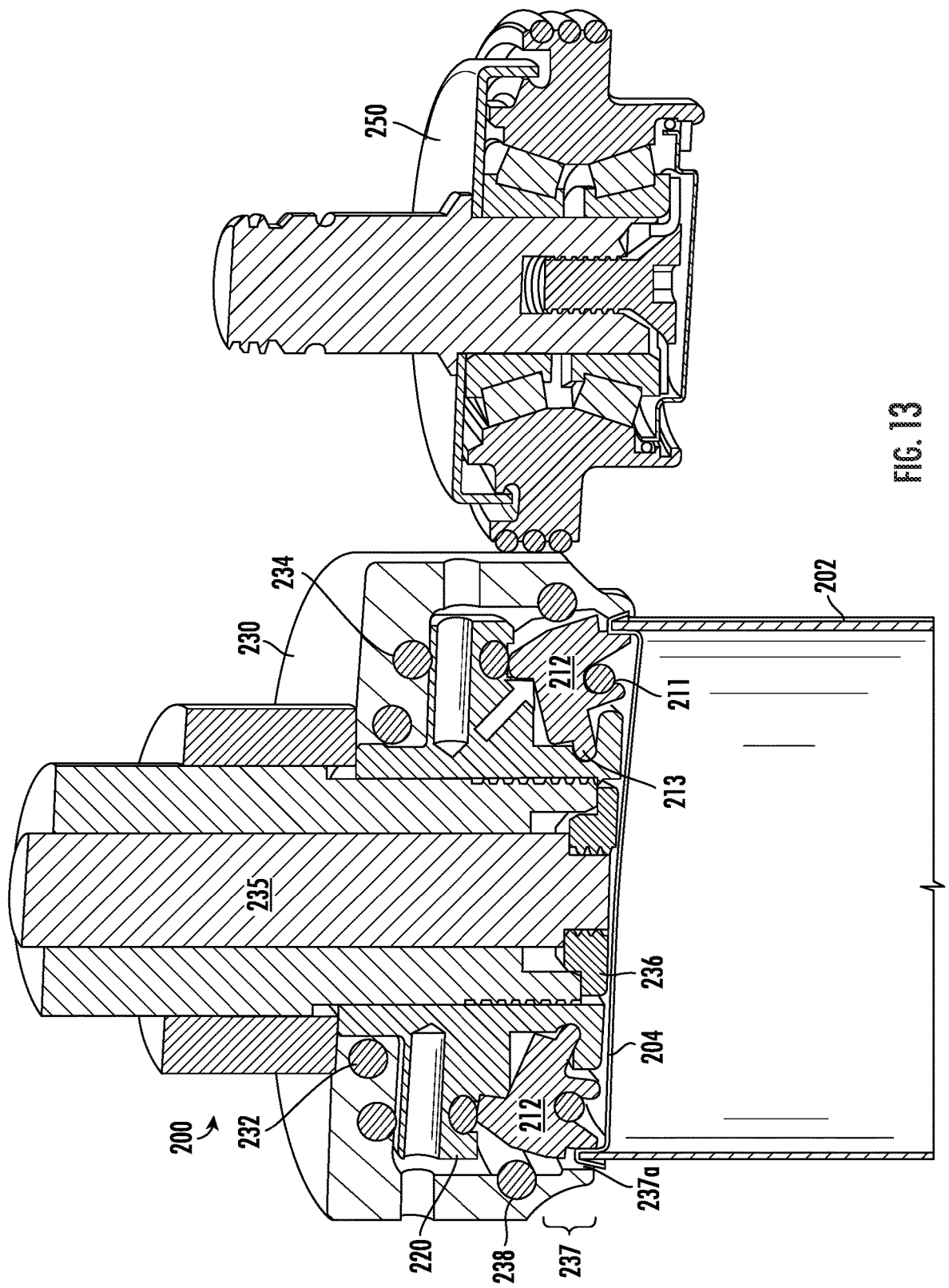

SYSTEMS AND METHODS FOR THE HIGH-SPEED APPLICATION OF PAPER-BASED END CLOSURES ON COMPOSITE CONTAINERS

This application is a continuation of U.S. Nonprovisional application Ser. No. 17/701,269 filed on Mar. 22, 2022, now U.S. Pat. No. 11,834,218, that is a continuation of U.S. Nonprovisional application Ser. No. 17/331,982 filed on May 27, 2021, now U.S. Pat. No. 11,673,696, which claims priority to U.S. Provisional Application No. 63/125,013, filed on Dec. 14, 2020, and U.S. Provisional Application No. 63/030,959, filed on May 28, 2020, all of which are incorporated by reference herein in their entirety.

FIELD OF THE DISCLOSURE

The present disclosure relates to systems and methods for the high-speed application of paper-based end closures on composite containers.

BACKGROUND OF THE DISCLOSURE

The present disclosure relates generally to containers and methods of sealing such containers. Cylindrical paper-based or composite containers are often used for snack foods and similar products. Such containers often have a membrane sealed to a top rim of the container, an overcap or end cap covering the membrane, and a metal closure seamed onto a bottom rim of the container. Typically, the membrane is first sealed to the top rim and the end cap is then applied to the container. The container is then filled with the products through the open bottom end of the container and the metal closure is then seamed onto the bottom rim of the container. The container may be flushed or evacuated during the bottom seaming process in order to preserve the stored products for a longer period of time.

The process described above, using metal bottom ends, may interfere with the recyclability of certain containers, as seaming the metal closure to the bottom of the container makes it very difficult to separate the metal closure from the container itself. Without the ability to separate the paper-based body of the container from the metal bottom, the container assembly, depending on its configuration, may be unable to enter either the paper or metal recycling stream. This may result in unnecessary waste and negative environmental impacts. There exists a need for recyclable containers in order to increase the sustainability of the end product.

One solution to the need for recyclability is to produce containers with paper-based end closures rather than metal ends. However, the existing equipment for seaming metal ends to containers is built specifically for metal ends, and simply swapping out metal closures for paper-based end closures is incompatible with the current metal end seaming process, as paper-based end closures introduce unique challenges not present with metal ends (e.g., flexibility of the closures, separating the closures from a stack of closures, feeding the closures, folding the closures, fusing the non-metal closures).

Through ingenuity and hard work, the inventors have not only developed systems and methods for applying paper-based end closures to containers, but have developed systems and methods that operate at high speeds (e.g., over 300 containers per minute). Additionally, in certain embodiments, certain aspects of the disclosed systems and methods may be used to retrofit existing metal end seamers (e.g., Angelus 60L), thereby saving on new equipment costs.

BRIEF SUMMARY OF THE DISCLOSURE

In some embodiments, an assembly module for assembling a container and closure may be provided. The containers and/or closures may be paper-based. The container may have an open end circumscribed by a rim. The assembly module may include a chuck, an expanding collet, and an actuator. The chuck may be configured for axial alignment with the container, and the actuator may be configured to bring the container and the chuck axially together. In some embodiments, the chuck may be configured to be axially stationary. The expanding collet may be engaged with the chuck and include pivoting collet segments. The collet segments may each be configured to simultaneously pivot radially outward about a pivot point. The collet segments may include a lip and an angled tip. Each lip of the collet segments may be positioned around the expanding collet to be engaged by the rim of the open end of the container. The angled tip of each collet segment may be positioned radially inward from the lip and shaped to press a countersink portion of the closure against an interior wall of the container as the collet segments pivot radially outward. As the container and the chuck are brought axially together by the actuator, the rim of the container may engage with the lips of the collet segments and cause the angled tips of the collet segments to pivot outward toward the interior wall of the container, thereby pushing the closure into the open end of the container and pressing the countersink portion of the closure between the angled tips of the collet segments and the interior wall of the container. The pivot point of each of the collet segments may be located where the expanding collet engages with the chuck. As the collet segments pivot radially outward about the pivot point, the diameter of the expanding collet may increase. In some embodiments, the diameter of the expanding collet may increase by about 5% of the total diameter of the expanding collet. When the diameter of the expanding collet has increased to the maximum diameter (e.g., in its fully expanded state), an exterior diameter of the angled tips of the collet segments may be substantially equivalent to an inner diameter of the container. The length of the angled tip may correlate to a countersink depth of the closure within the open end of the container when assembled. The angled tip may have an end proximate the lip and one distal and be angled such that the expanding collet has a diameter at the angled tip proximate end which is greater than a diameter at the angled tip distal end. In some embodiments, the lip may comprise a substantially horizontal surface configured to engage the rim of the container. In some embodiments, the expanding collet may be formed from a non-metal material.

In some embodiments, the expanding collet may further include an expandable retainer. The expandable retainer may be configured to urge the collet segments to pivot radially inward. The rim of the open end of the container may have a hoop strength greater than the urging force of the retainer through a predetermined expansion.

In some embodiments, the assembly module may further include a compressible backstop positioned to resist the pivoting of the collet segments after a predetermined pivot distance. The assembly module may also include a secondary backstop positioned to prevent the pivoting of the collet segments after a predetermined secondary pivot distance. The predetermined secondary pivot distance may occur before the predetermined compression.

In some embodiments, the assembly module may further include an assembly rod positioned concentrically within the chuck and the expanding collet. The assembly rod may be configured to move axially to push a central portion of the closure into the open end of the container as the container and the chuck are brought axially together. The assembly rod may include a centering disc that contacts a center of the closure as the closure is pushed into the open end of the container.

In some embodiments, the assembly module may further include a peripheral sleeve, surrounding the chuck and expanding collet. The peripheral sleeve may be configured to fold a peripheral skirt of the closure over the rim and around an exterior wall of the container. The peripheral sleeve may have an inner diameter larger than an outer diameter of the container. The peripheral sleeve may further include an inner brim with gripping surface texture configured to contact the folded peripheral skirt of the closure. The peripheral sleeve may be formed from a non-metal material. The assembly module may further include an o-ring positioned between the chuck and the peripheral sleeve, wherein the peripheral sleeve is movable rotationally and laterally along the o-ring relative to the chuck. The peripheral sleeve may be axially stationary.

In some embodiments, the assembly module may further include a roller. The roller may be configured to move laterally relative to the chuck and push the peripheral sleeve against a portion of the folded peripheral skirt of the closure. The container may be configured to be rotated axially relative to the roller. The expanding collet may resist the pushing action of the roller. The peripheral sleeve may be configured to shift eccentrically relative to the chuck when pushed by the roller.

In some embodiments, the assembly module may further include a membrane arranged around the lips and the angled tips of the expanding collet to prevent ingress of debris between the collet segments. The membrane may be formed from silicone and/or rubber.

BRIEF DESCRIPTION OF THE SEVERAL VIEWS OF THE DRAWING(S)

Having thus described the present disclosure in general terms, reference will now be made to the accompanying drawings, which are not necessarily drawn to scale, and wherein:

FIG. 11 is a cross-sectional side view of an example container and closure engaged with the assembly module of FIGS. 7-10 in a partially expanded state, caused by an upward force of a rim of the container acting on the collet segments to pivot them away from the front stop portion toward a back stop portion of the chuck, in accordance with some embodiments of the present disclosure;

Figure 14:
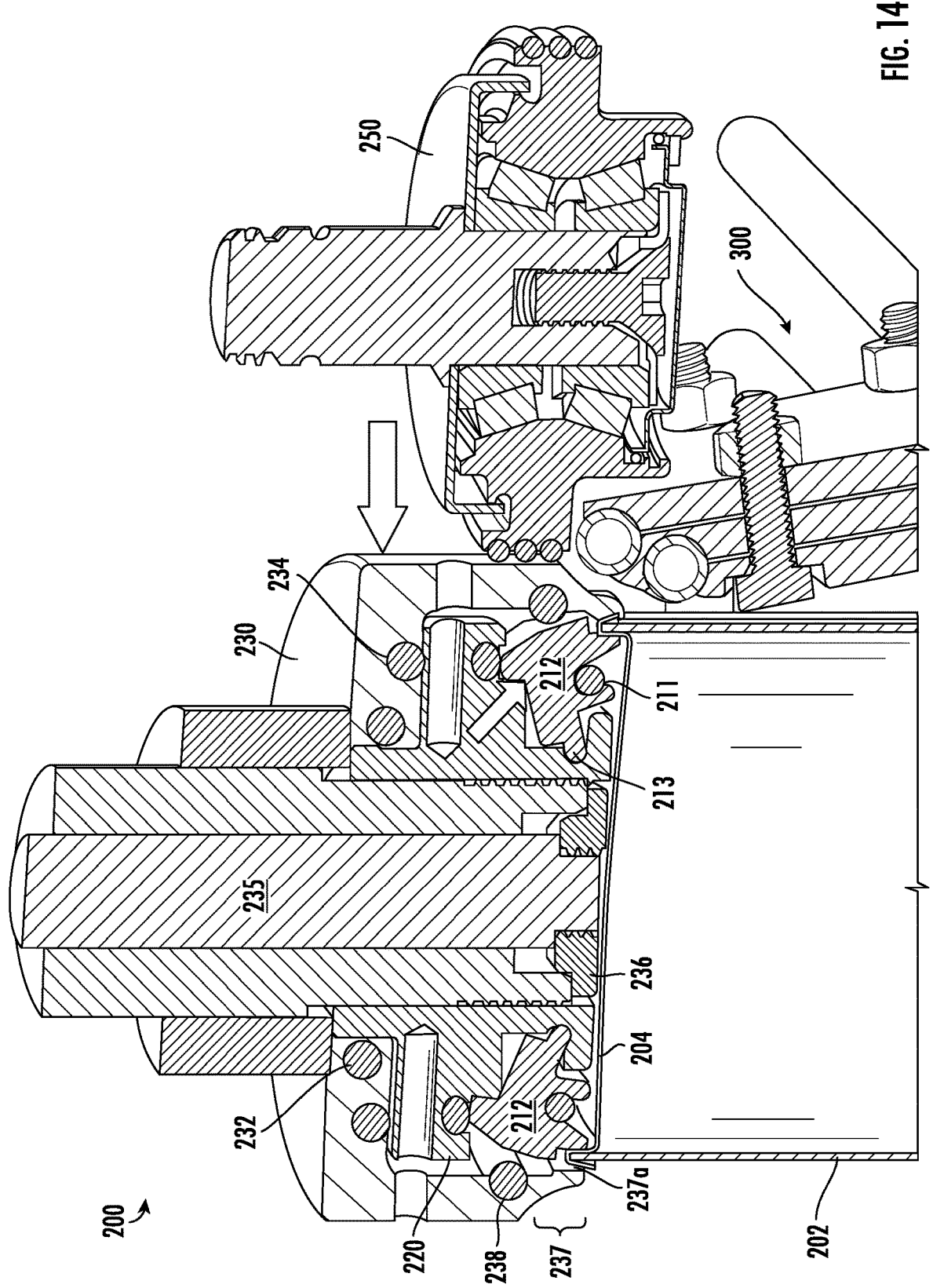
Figure 15:
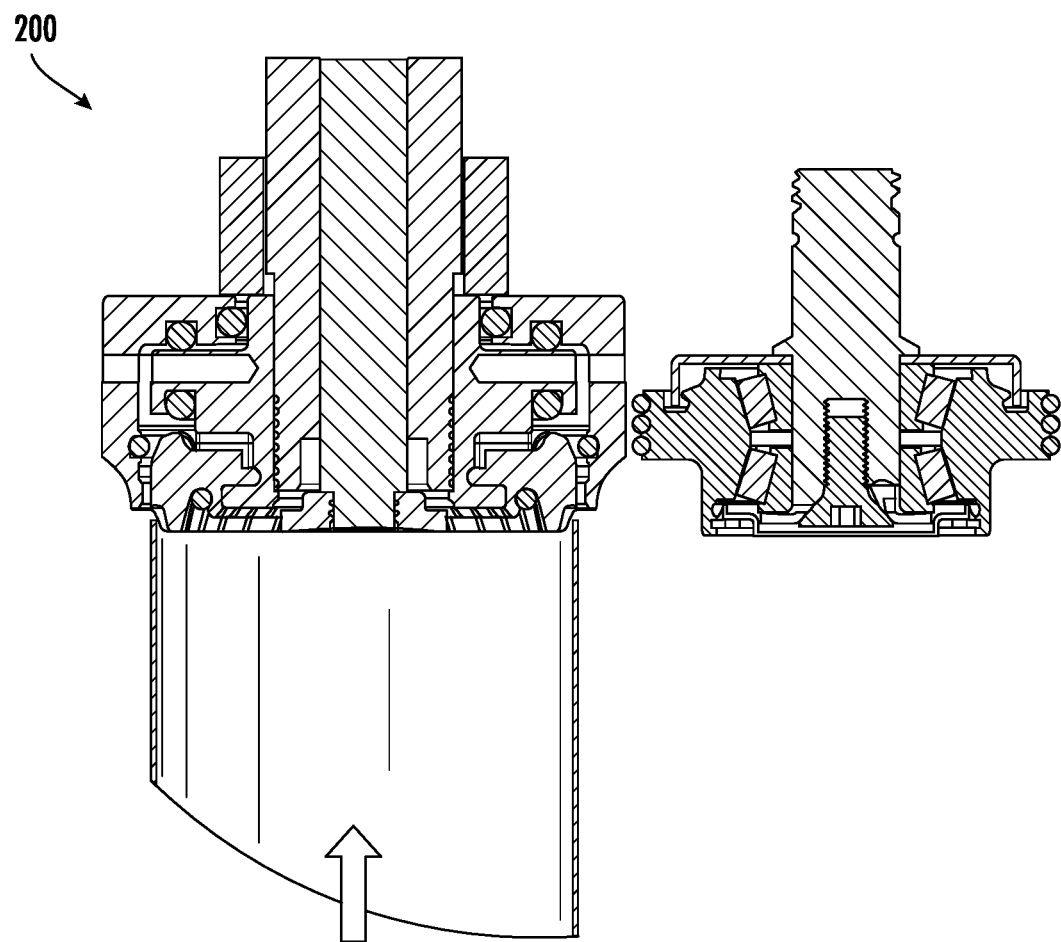
Figure 16:
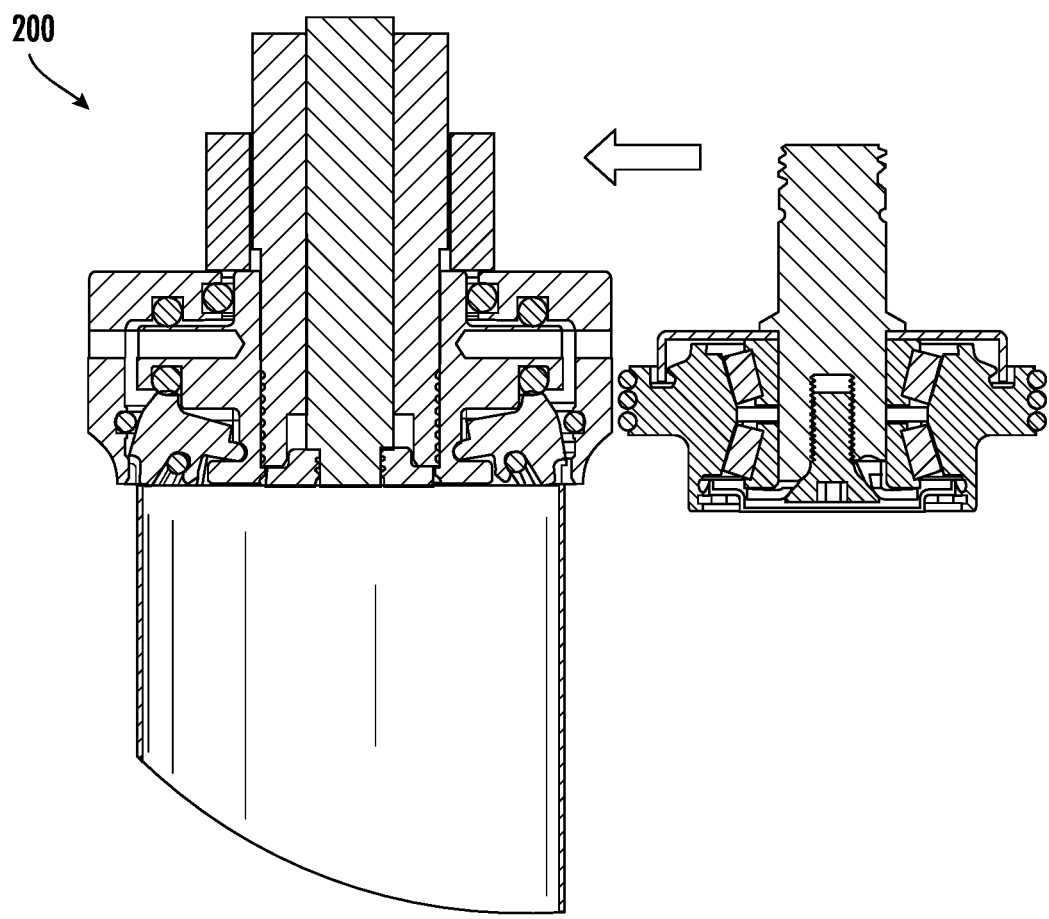
Figure 17:
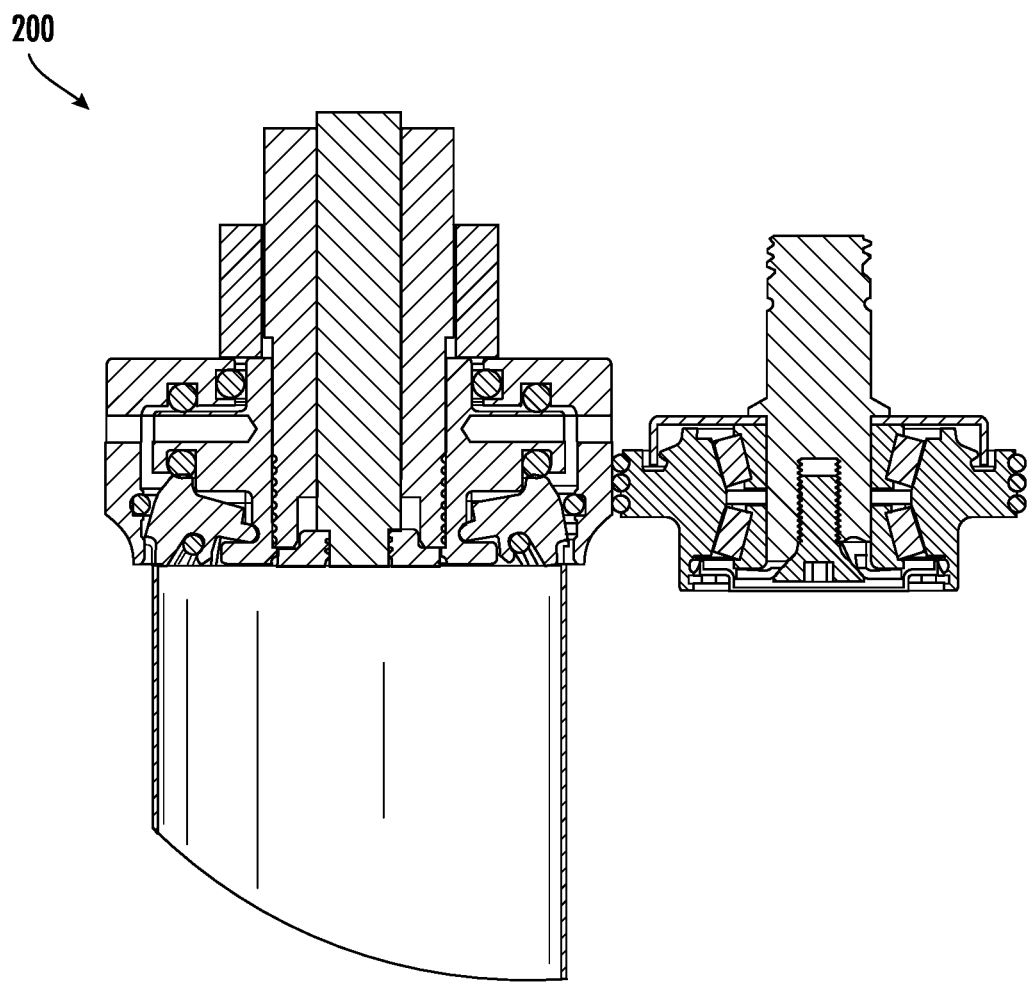
Figure 18:
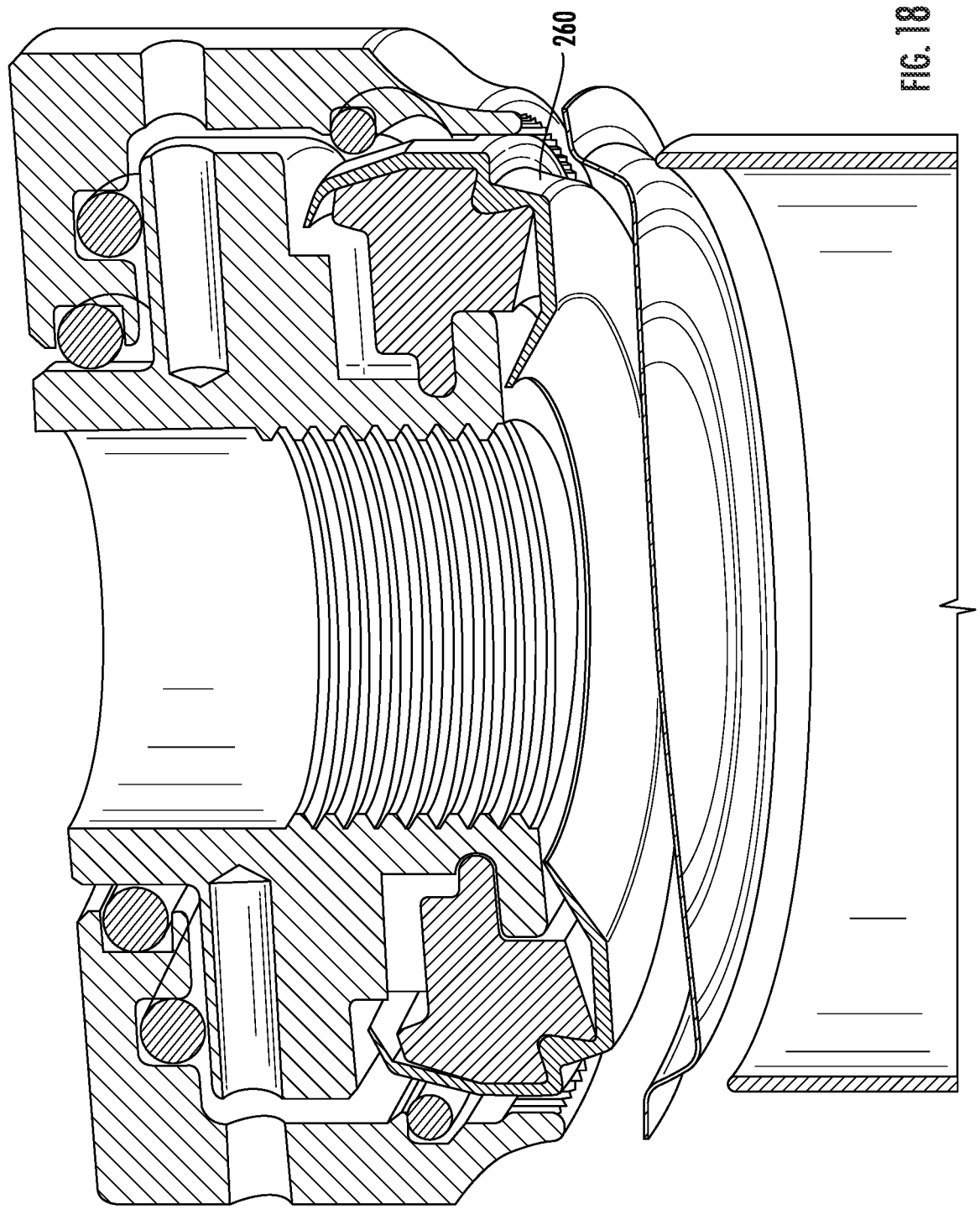
Figure 19:
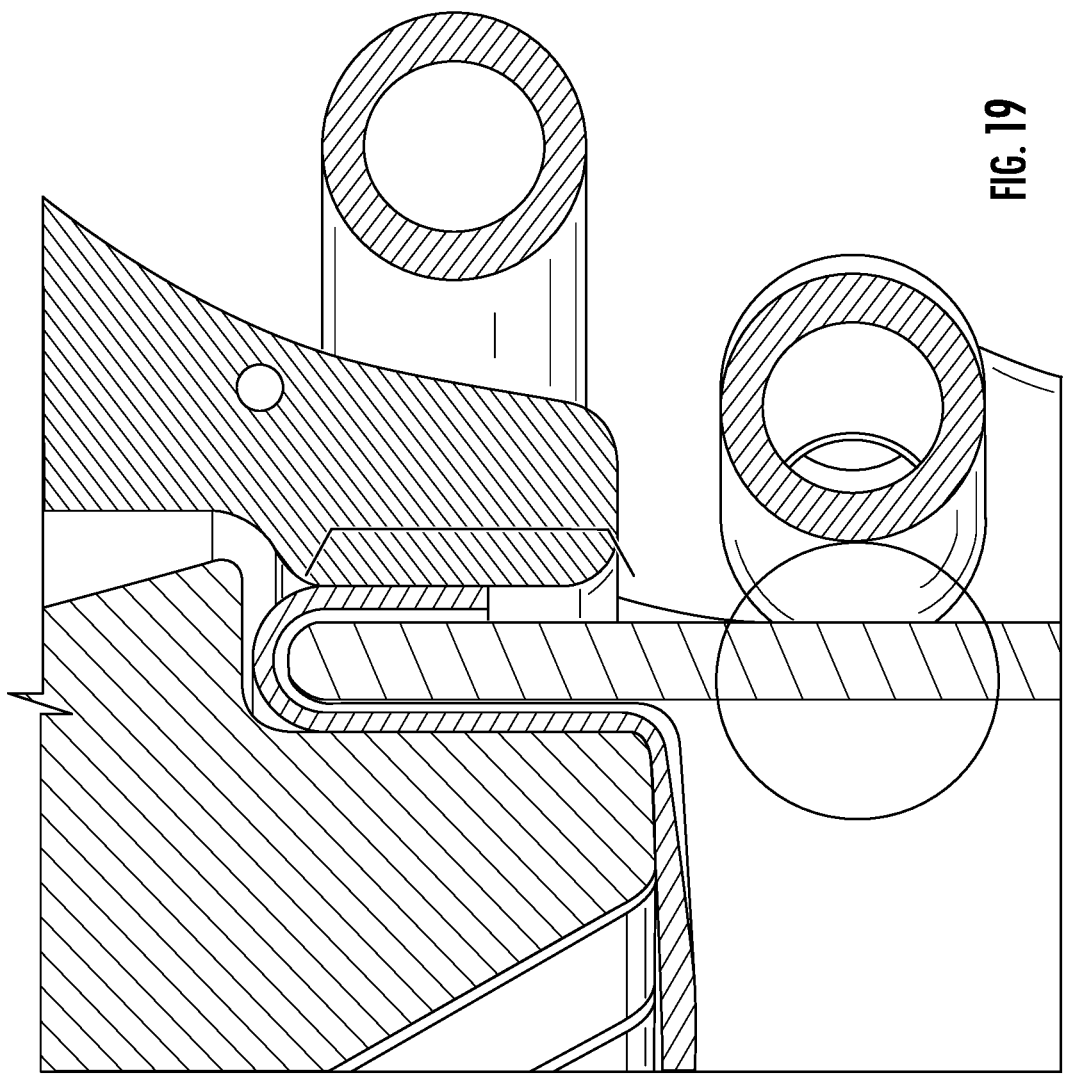
Figure 20:
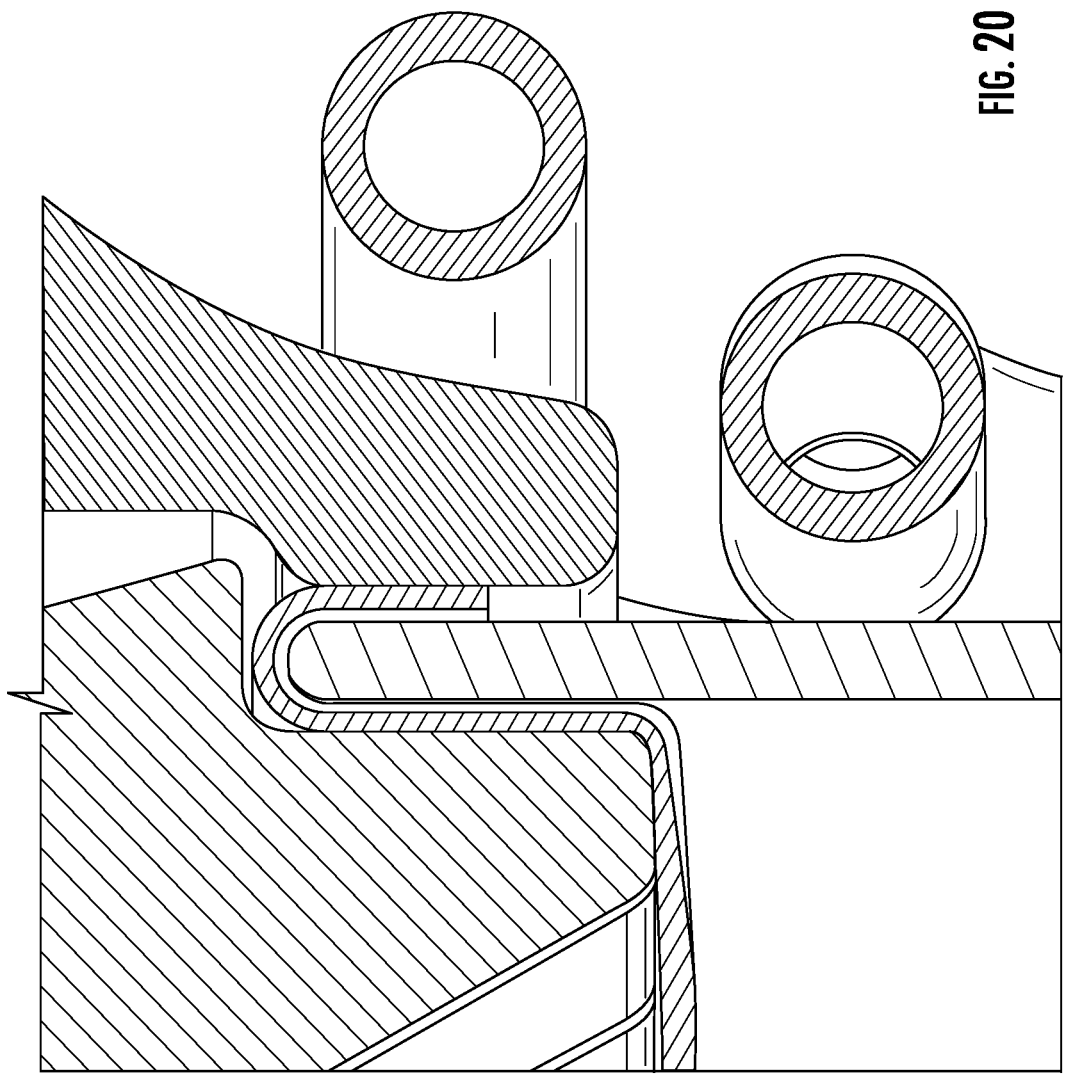
Figure 21:
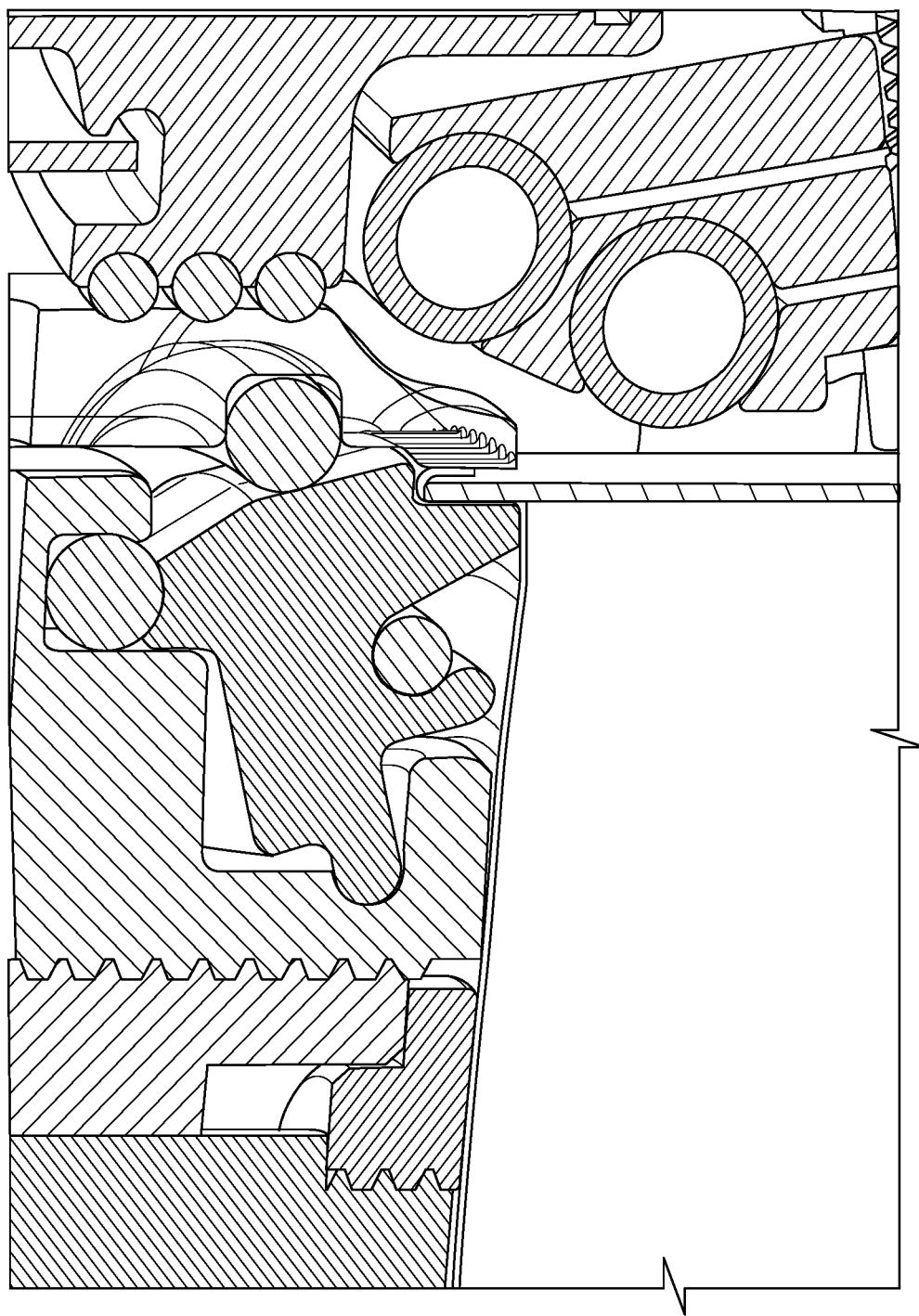
Figure 22:
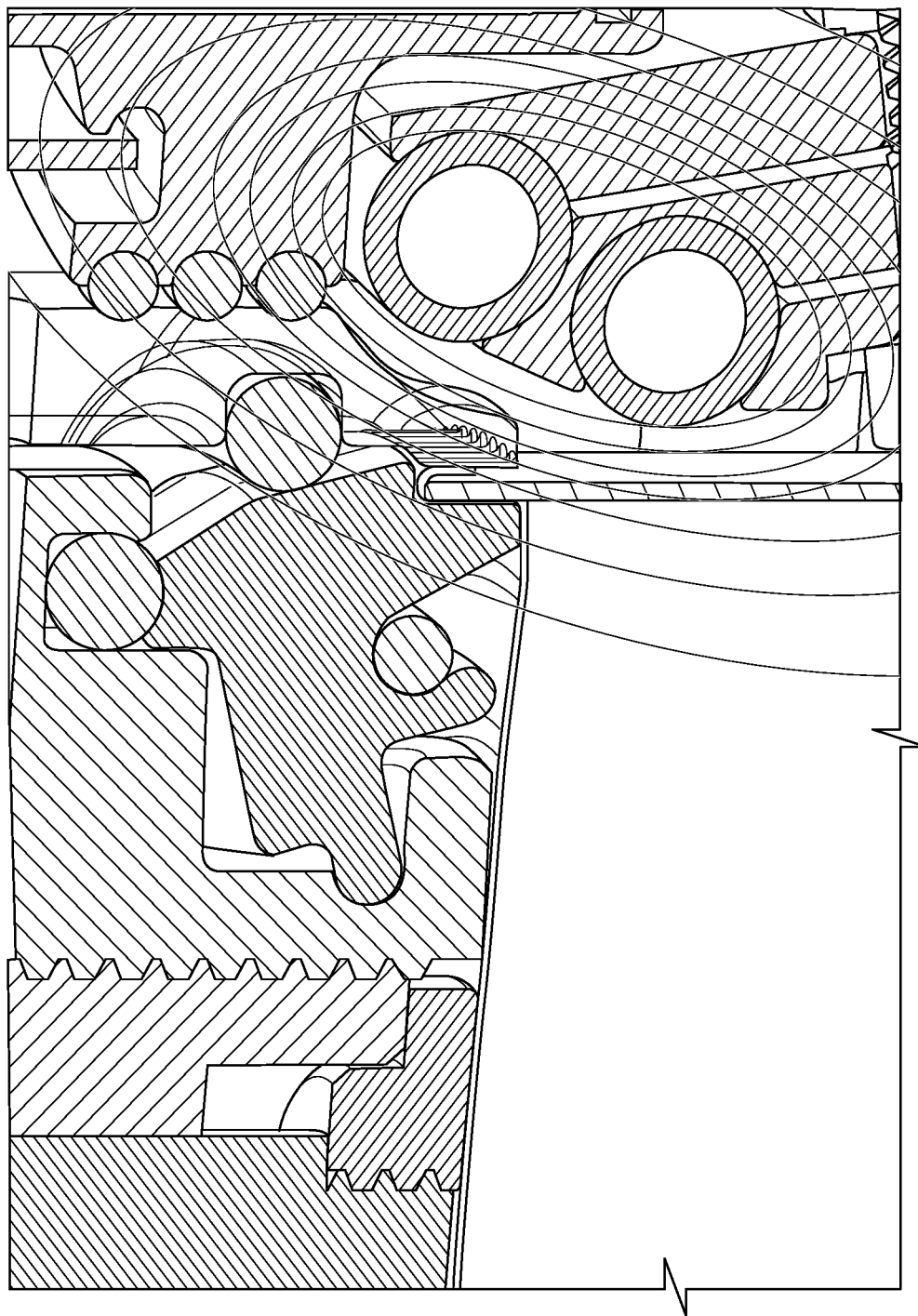
Figure 23:
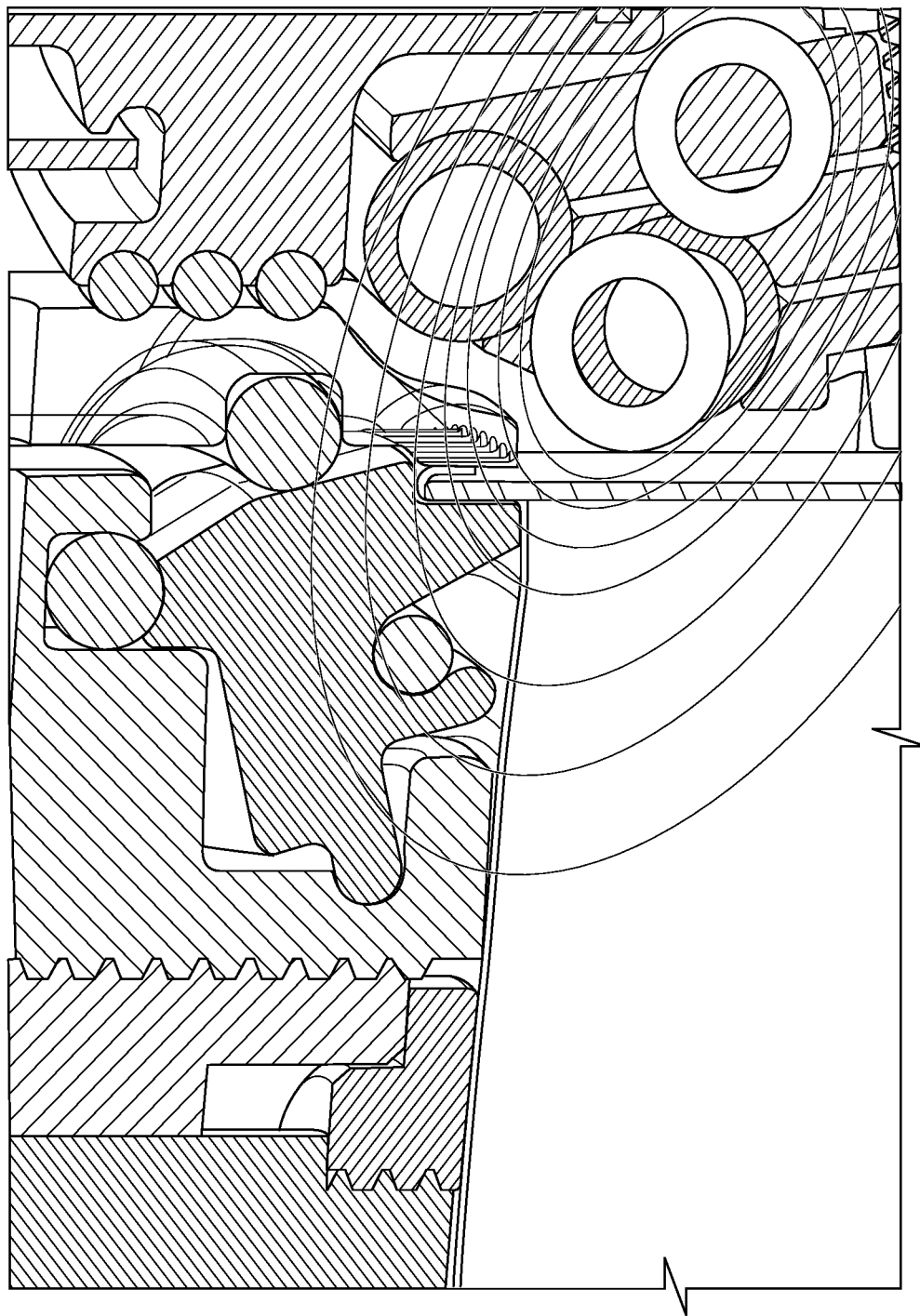
Figure 24:
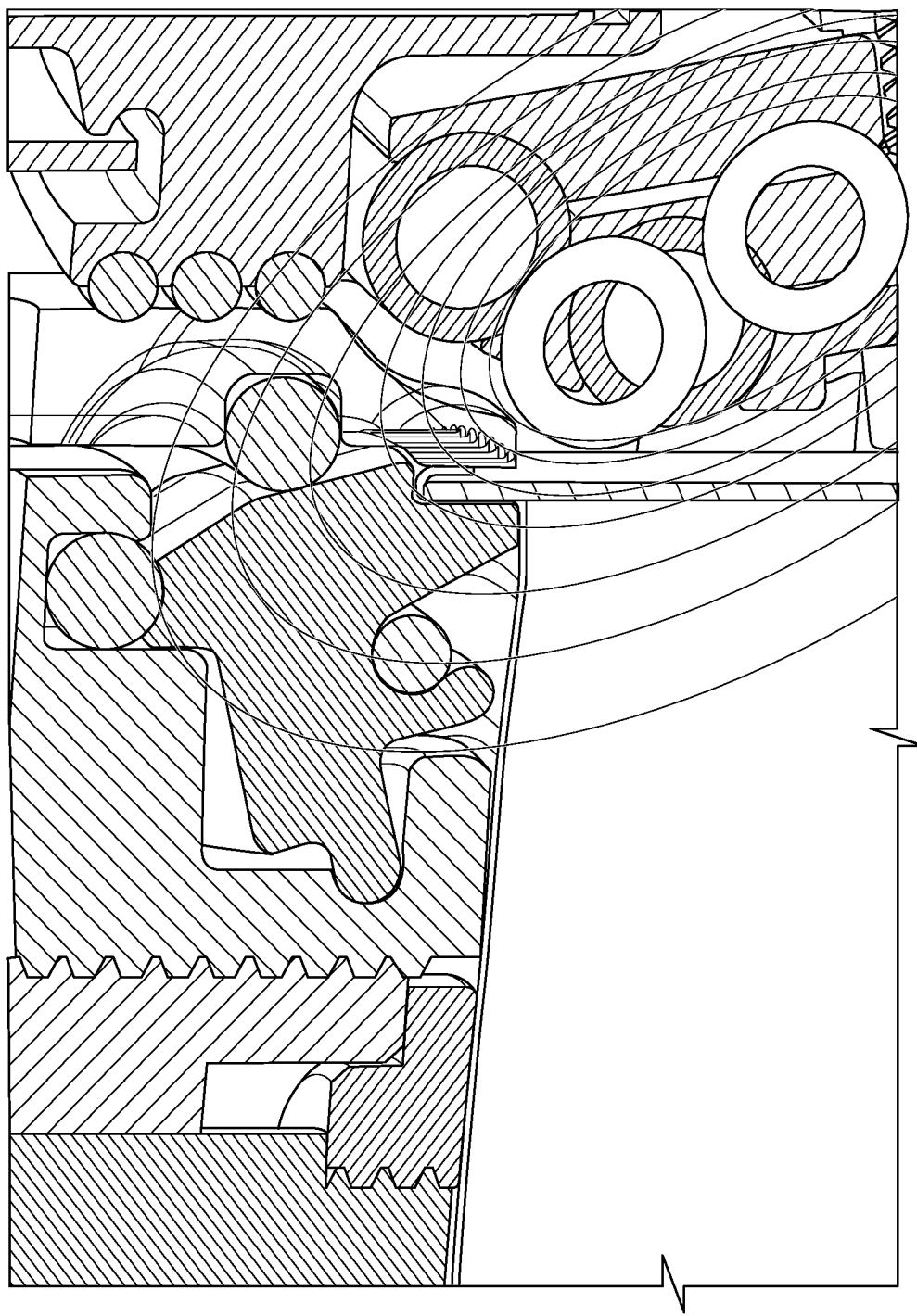
Figure 25:
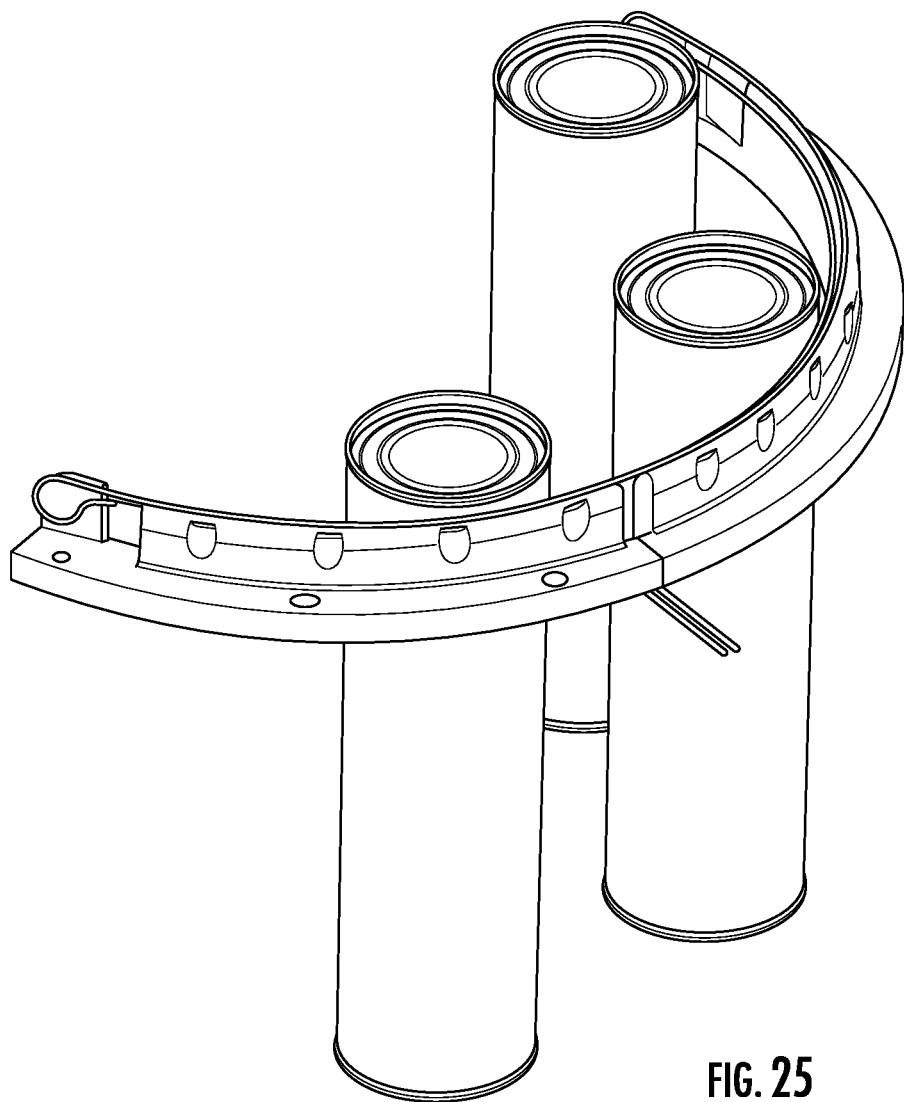
Figure 26:
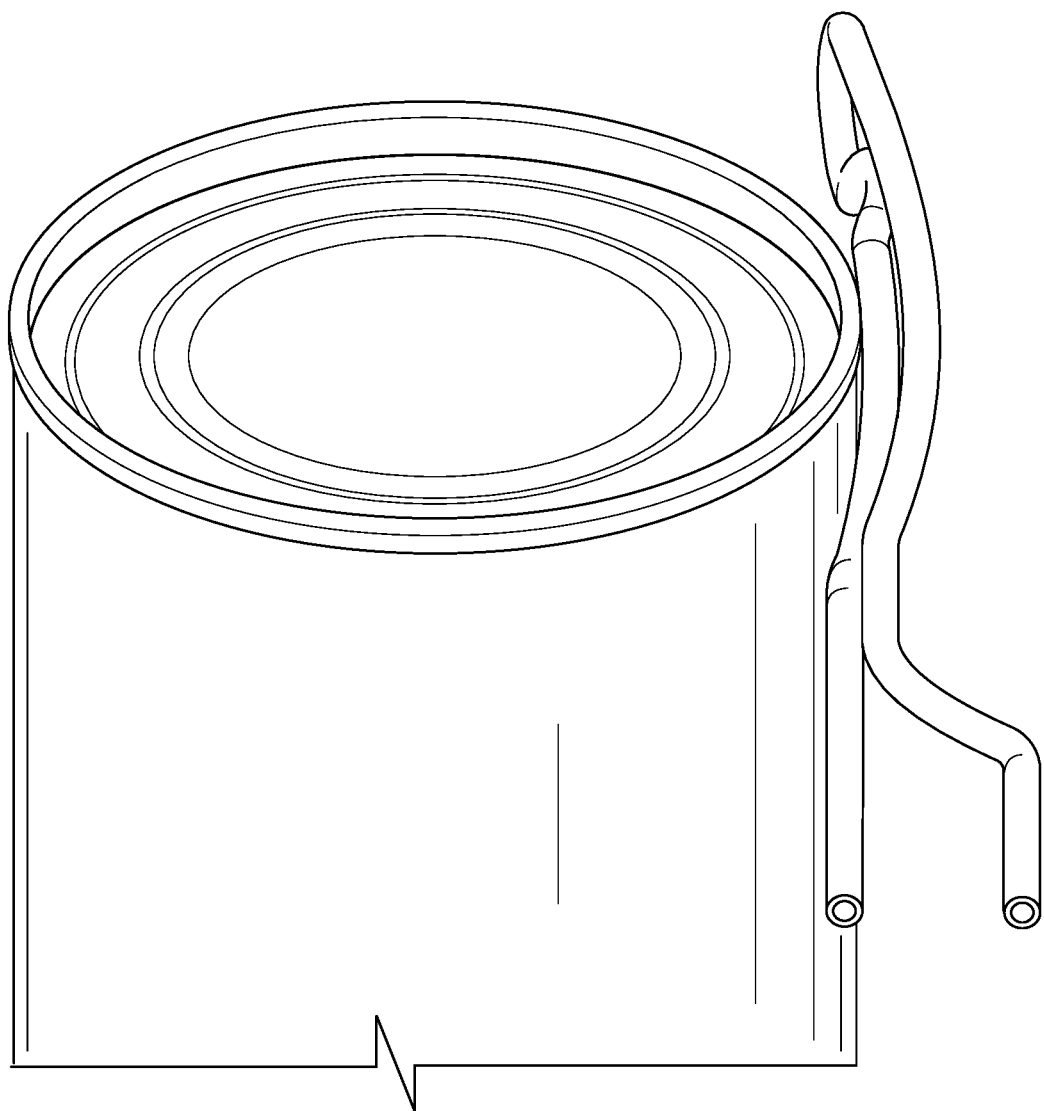
Figure 27:
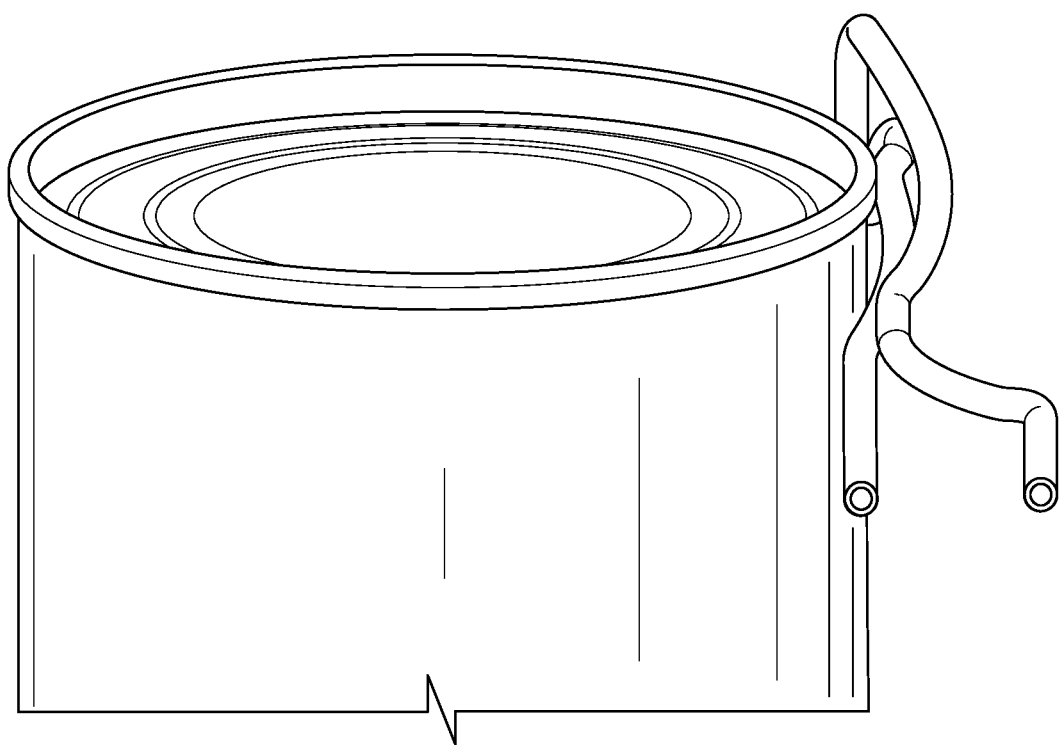
Figure 28:
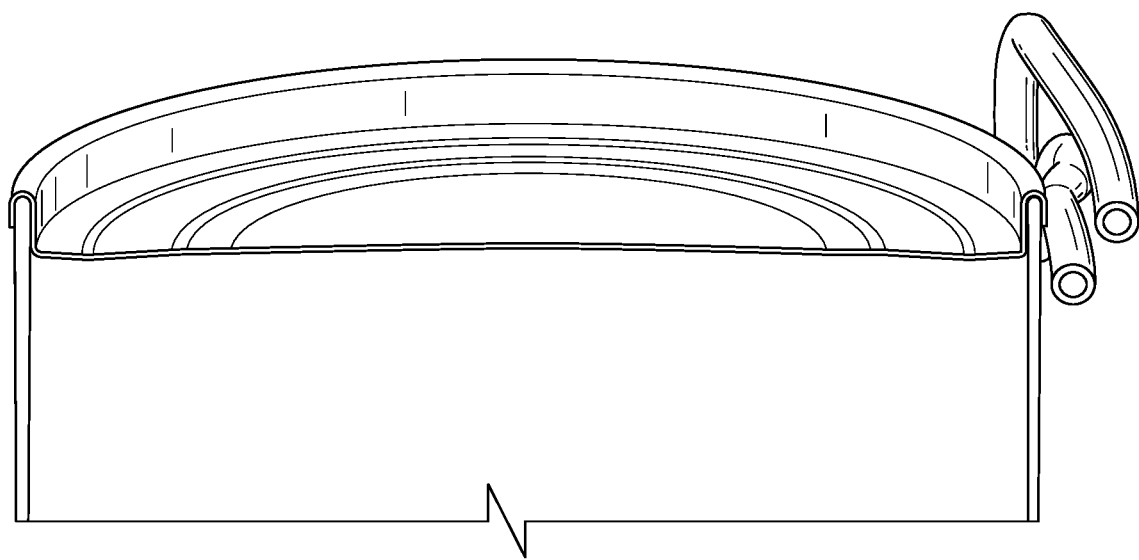
Figure 29:
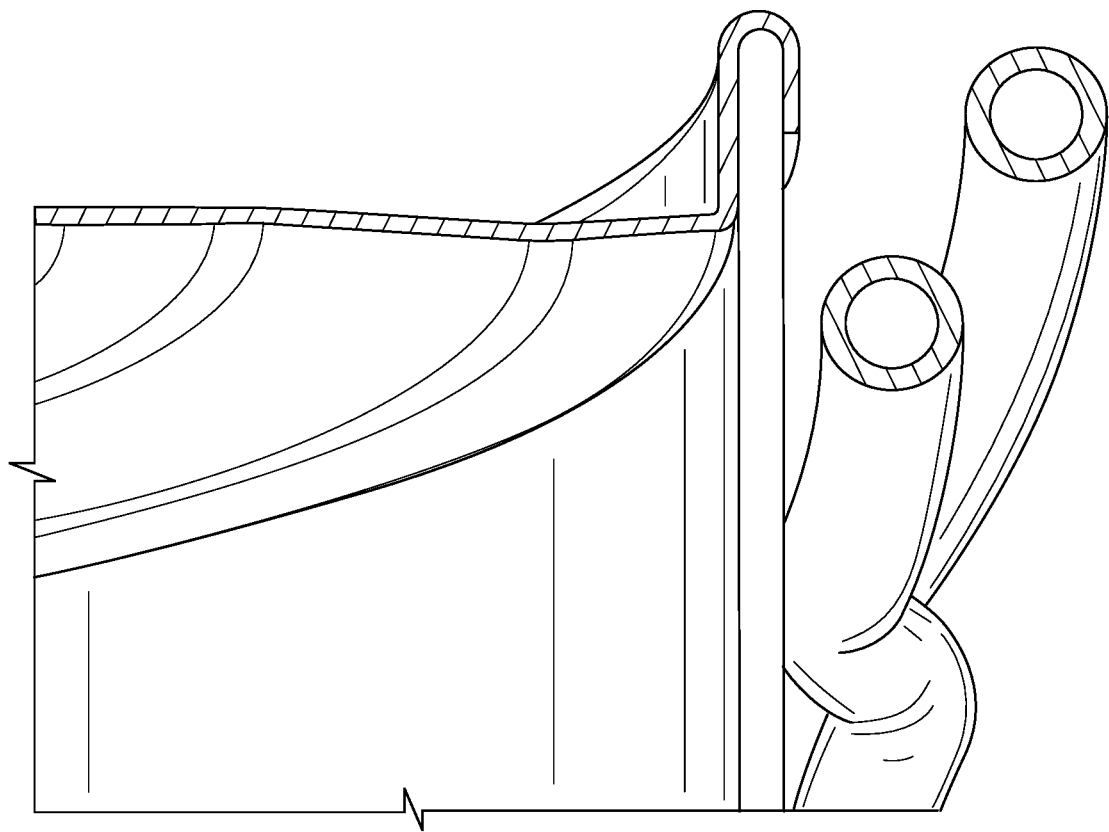
Figure 30:
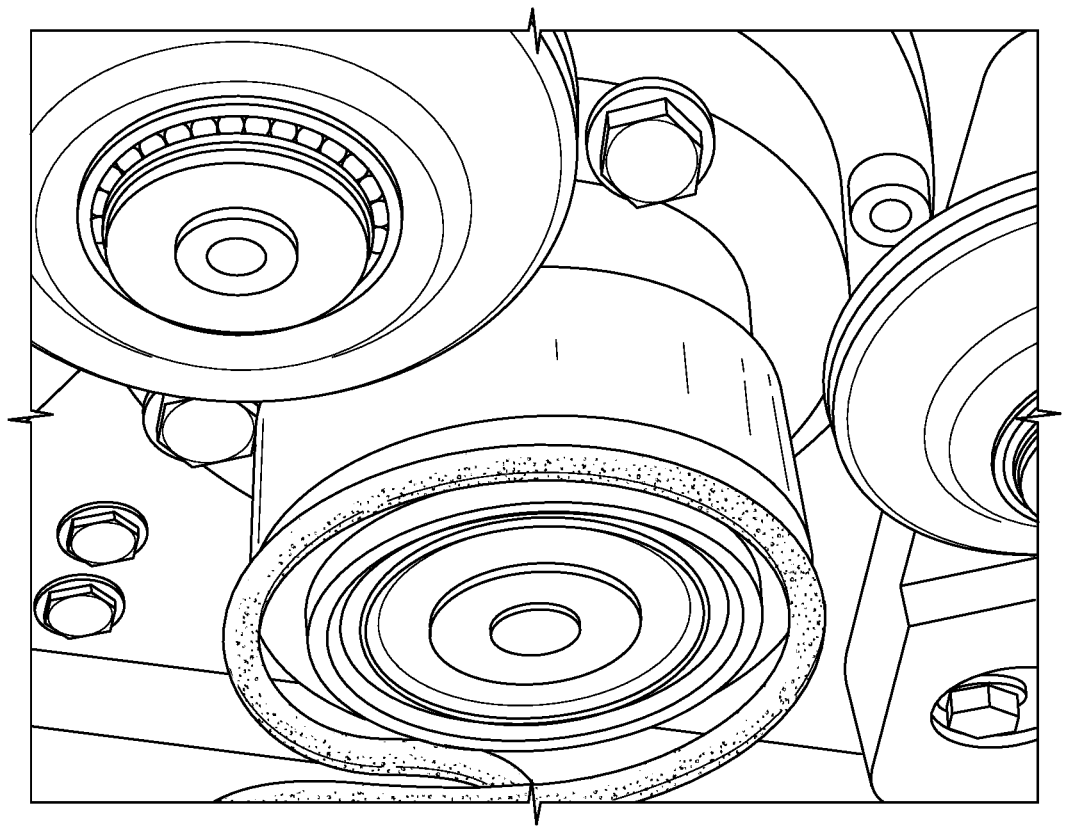
Figure 31:
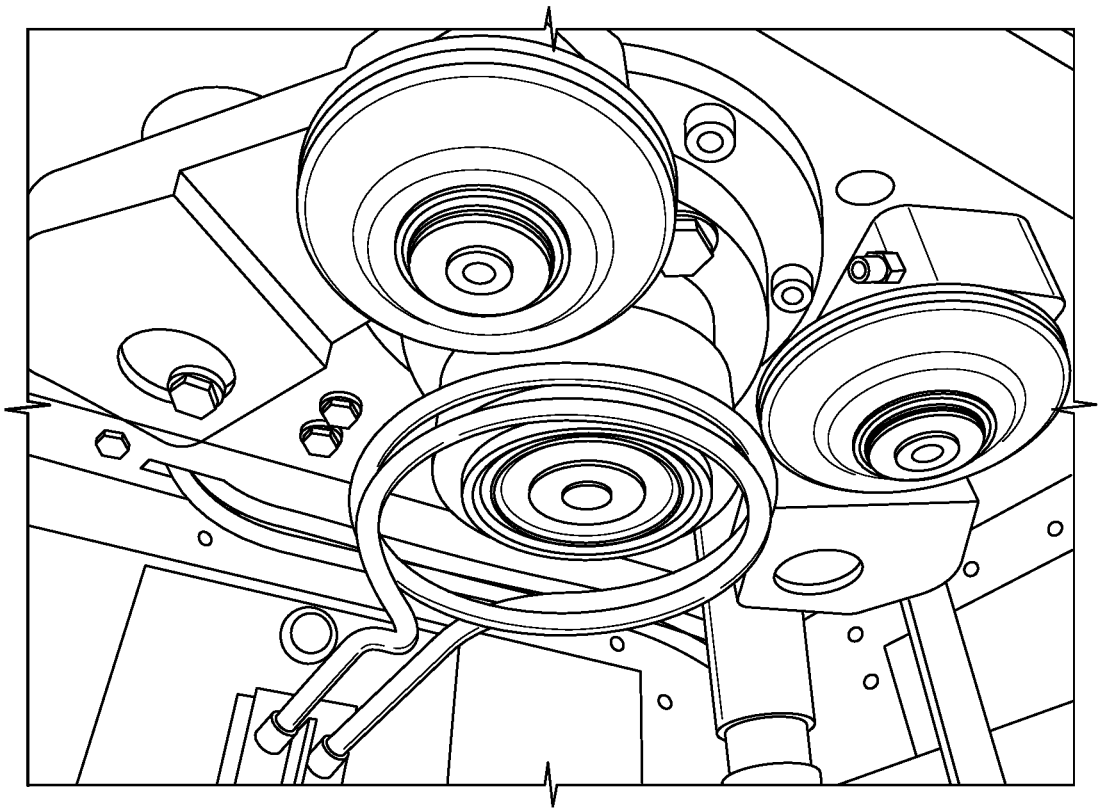
Figure 32:
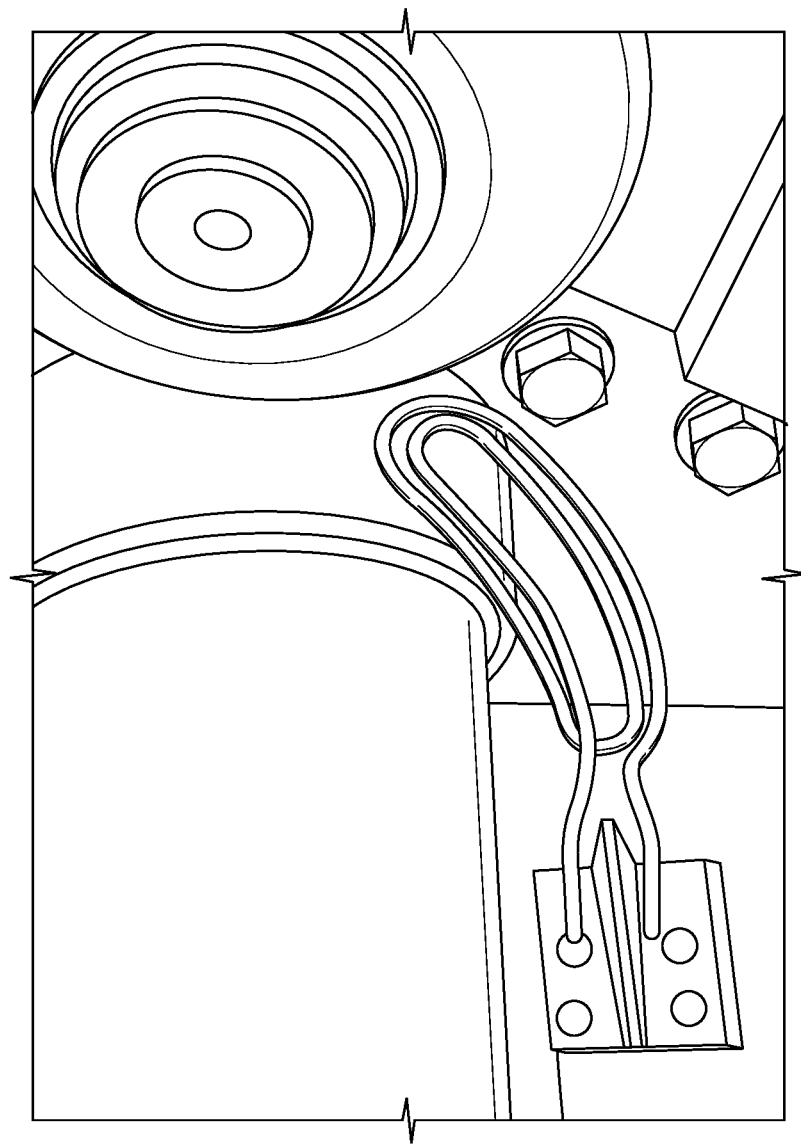
Figure 33:
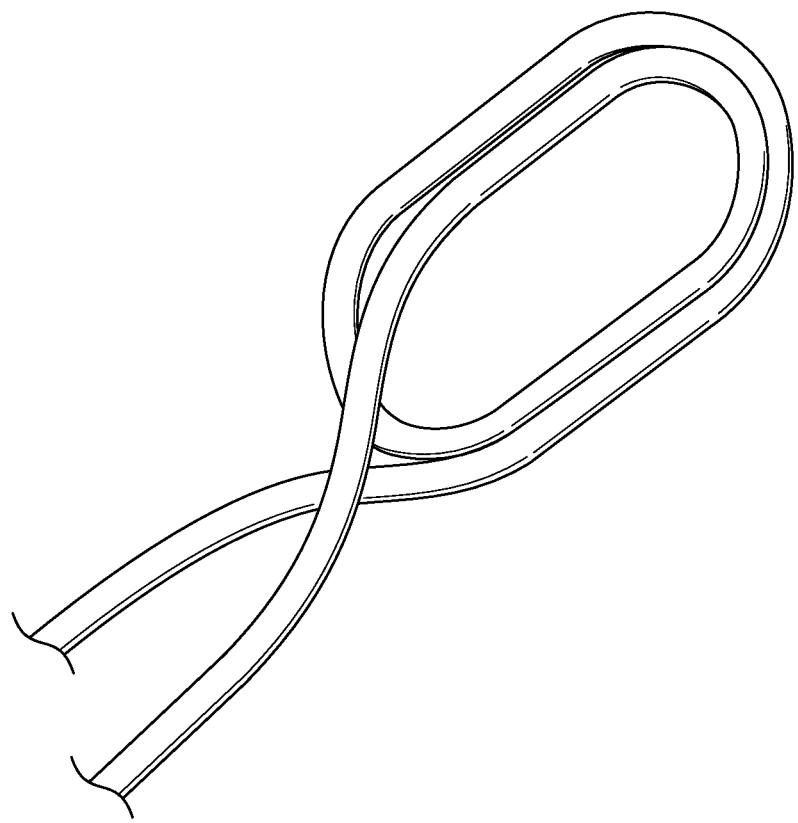
Figure 34:
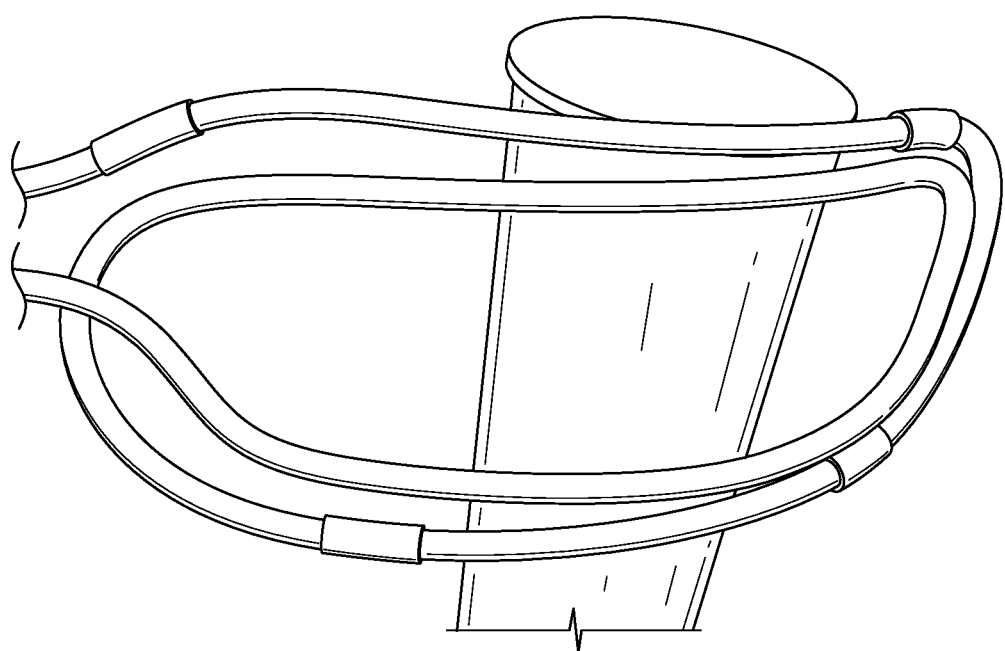
Figure 35:
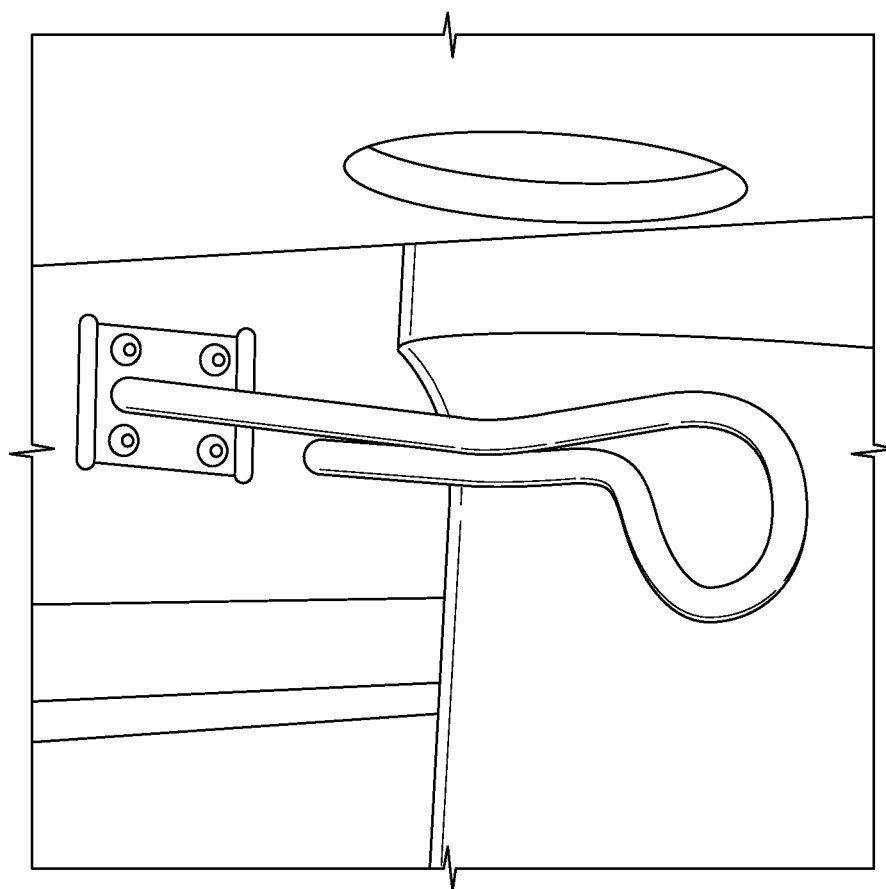
Figure 36:
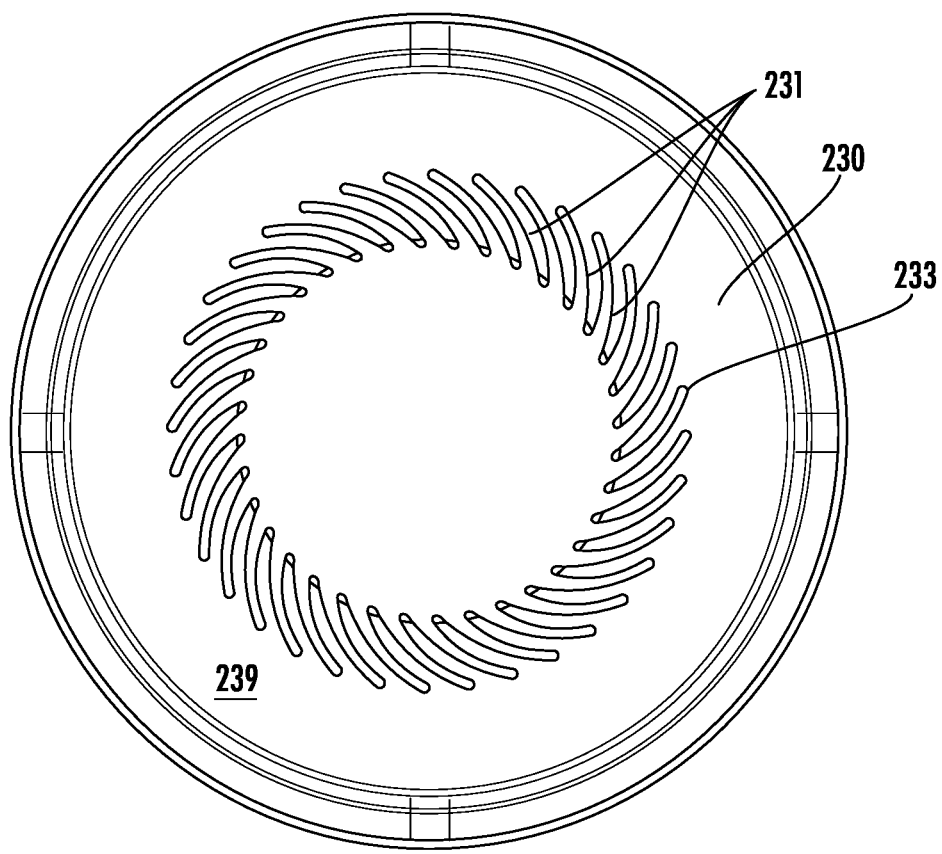
Figure 37:
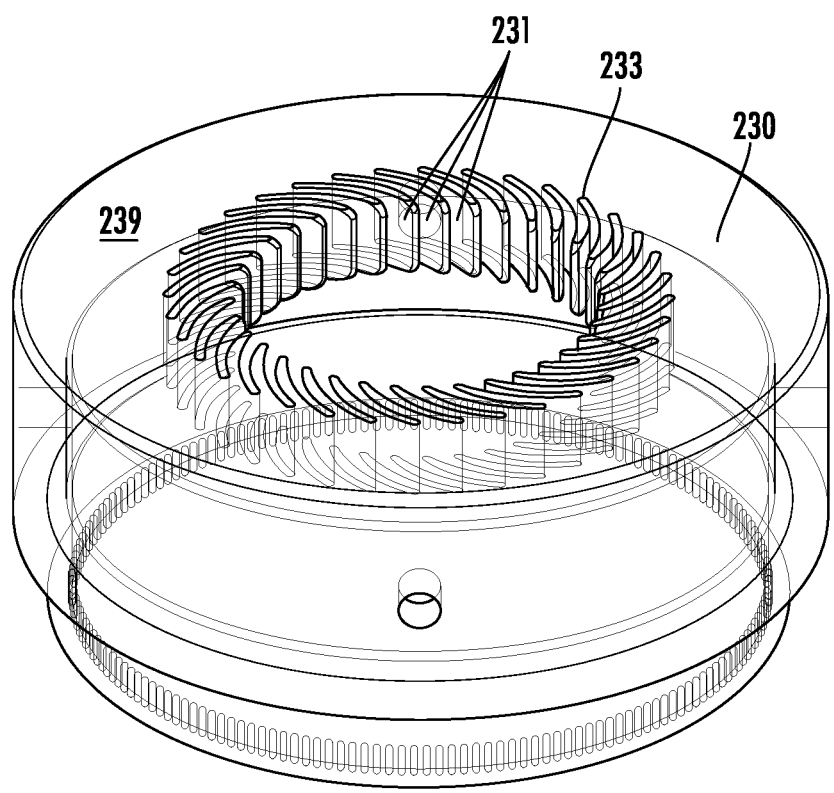
Figure 42:
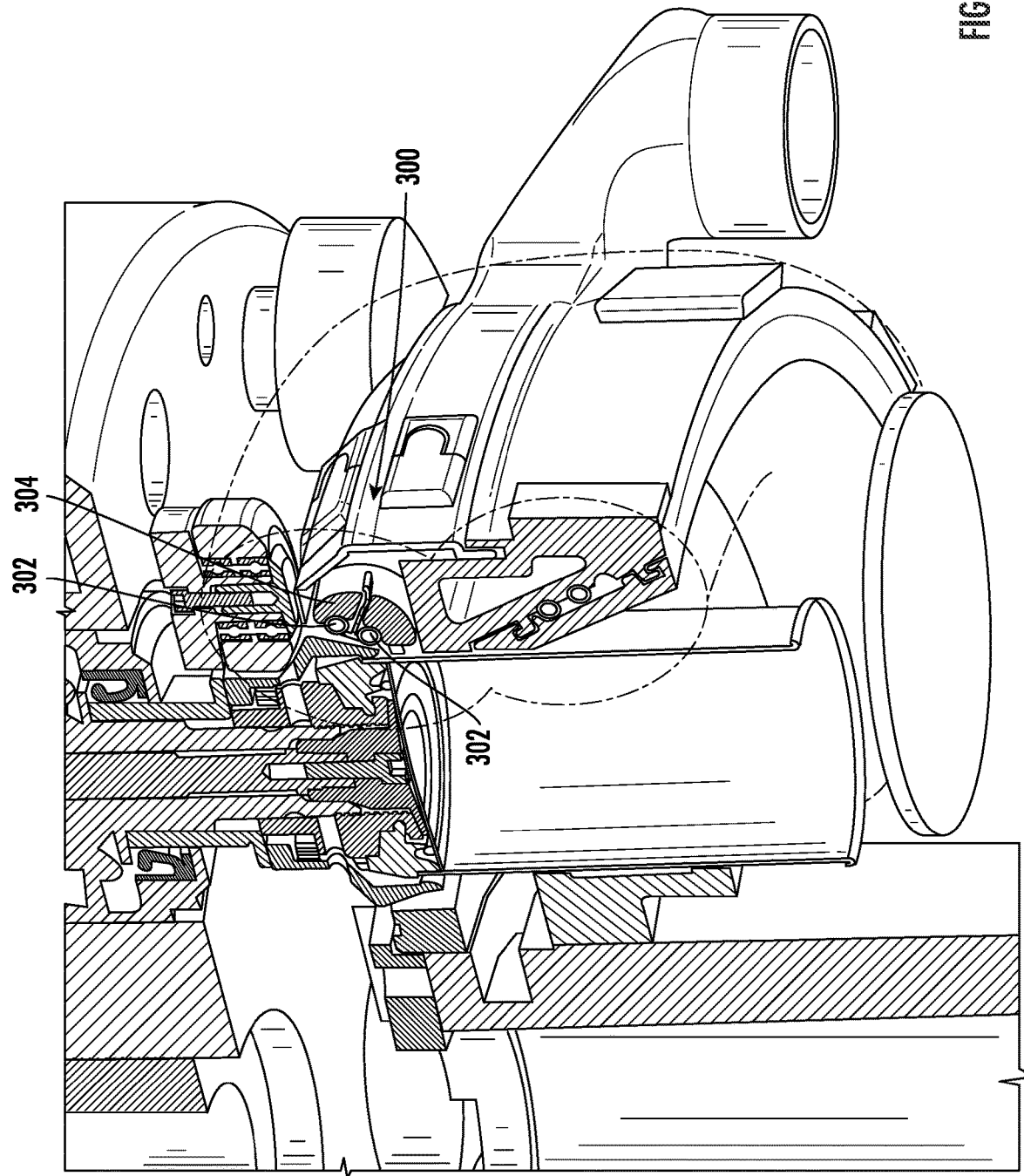
Figure 43:
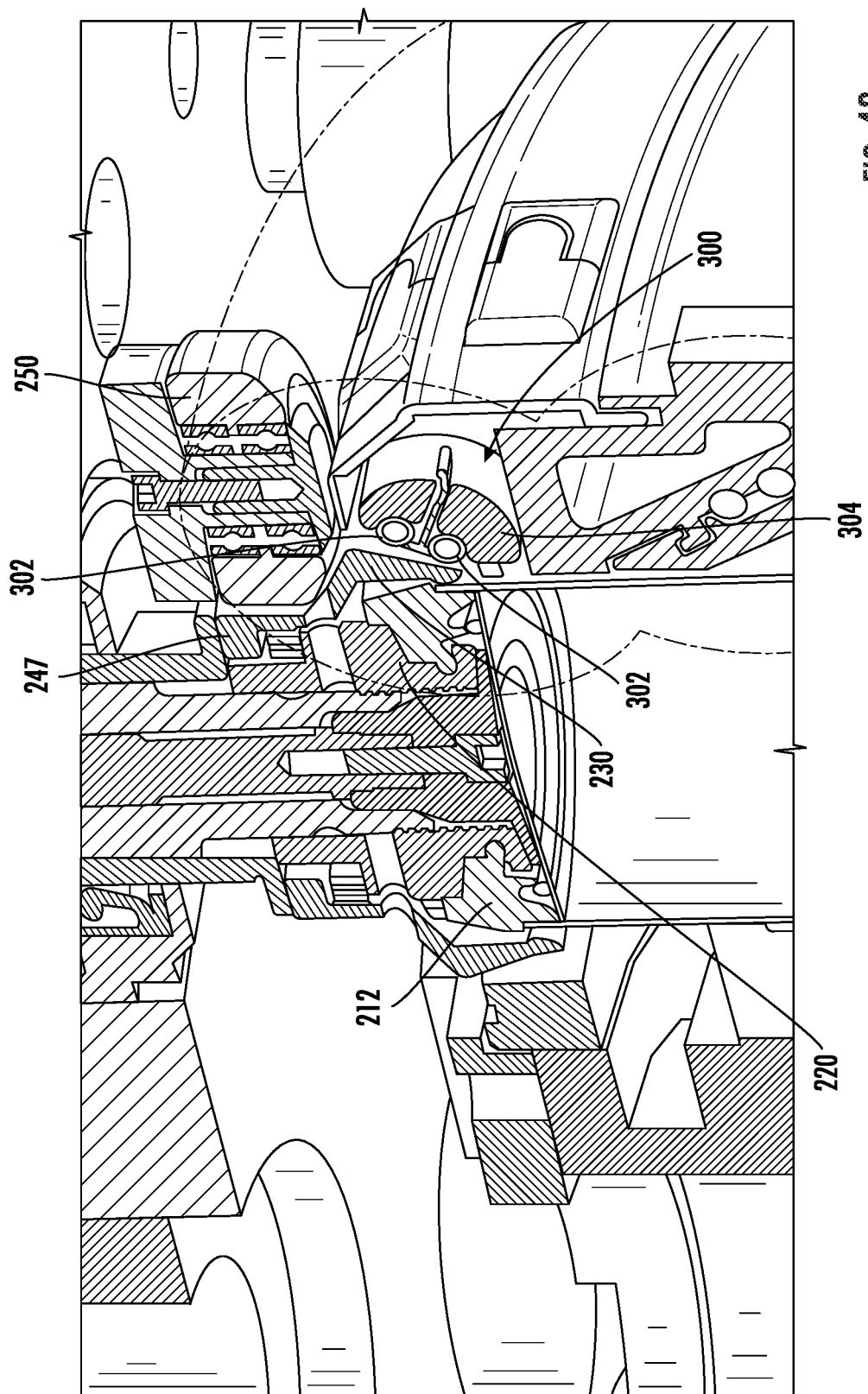
Figure 44:
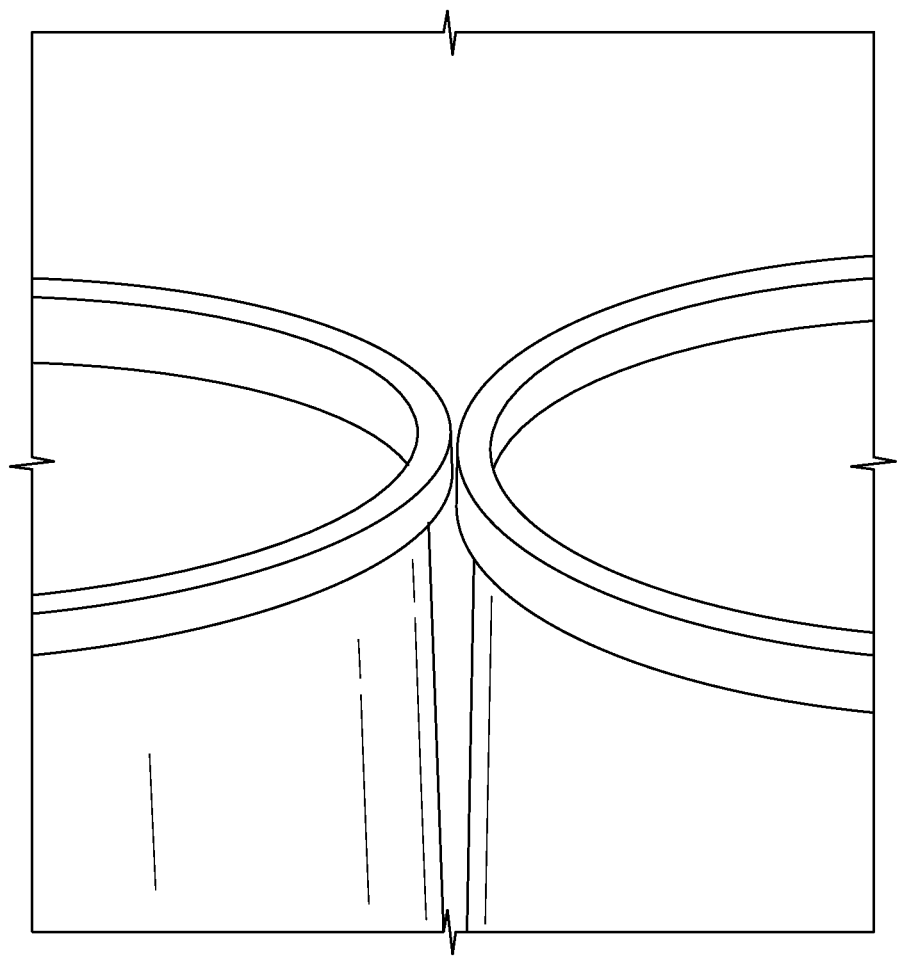
Figure 45:
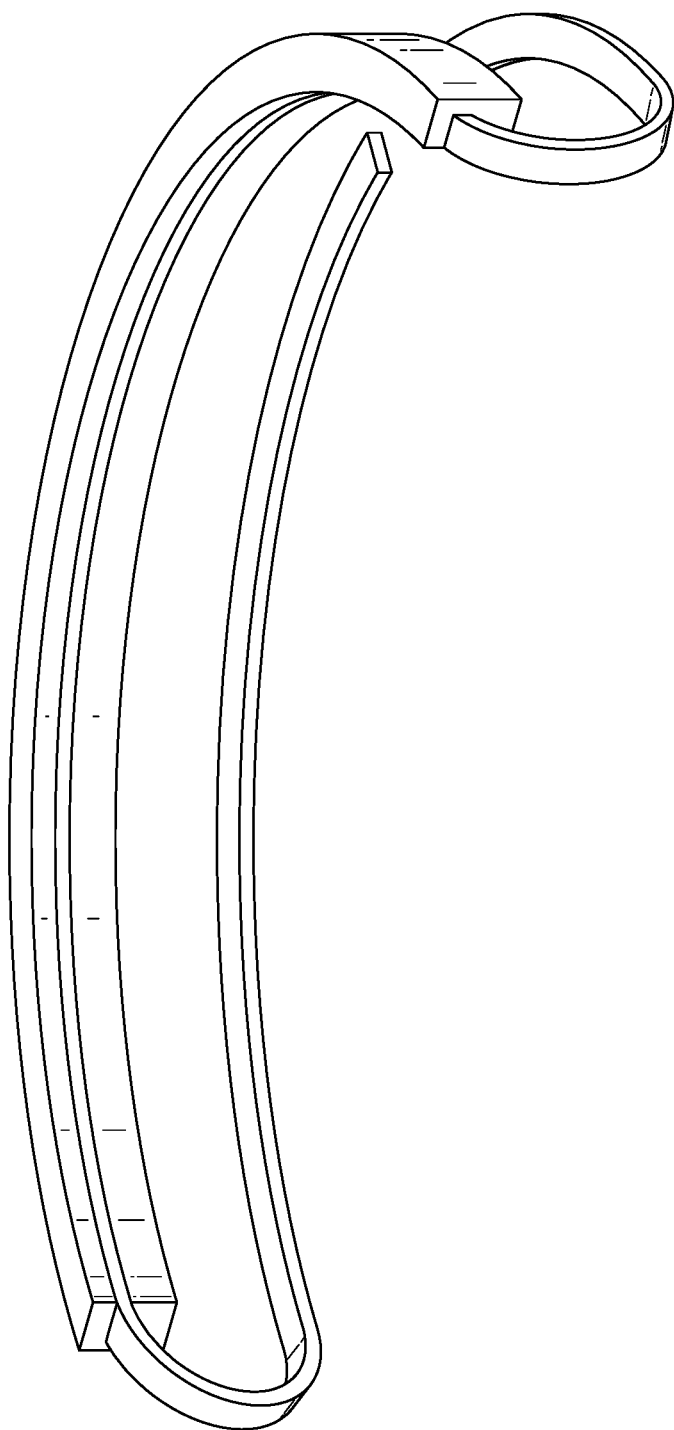
Figure 46:
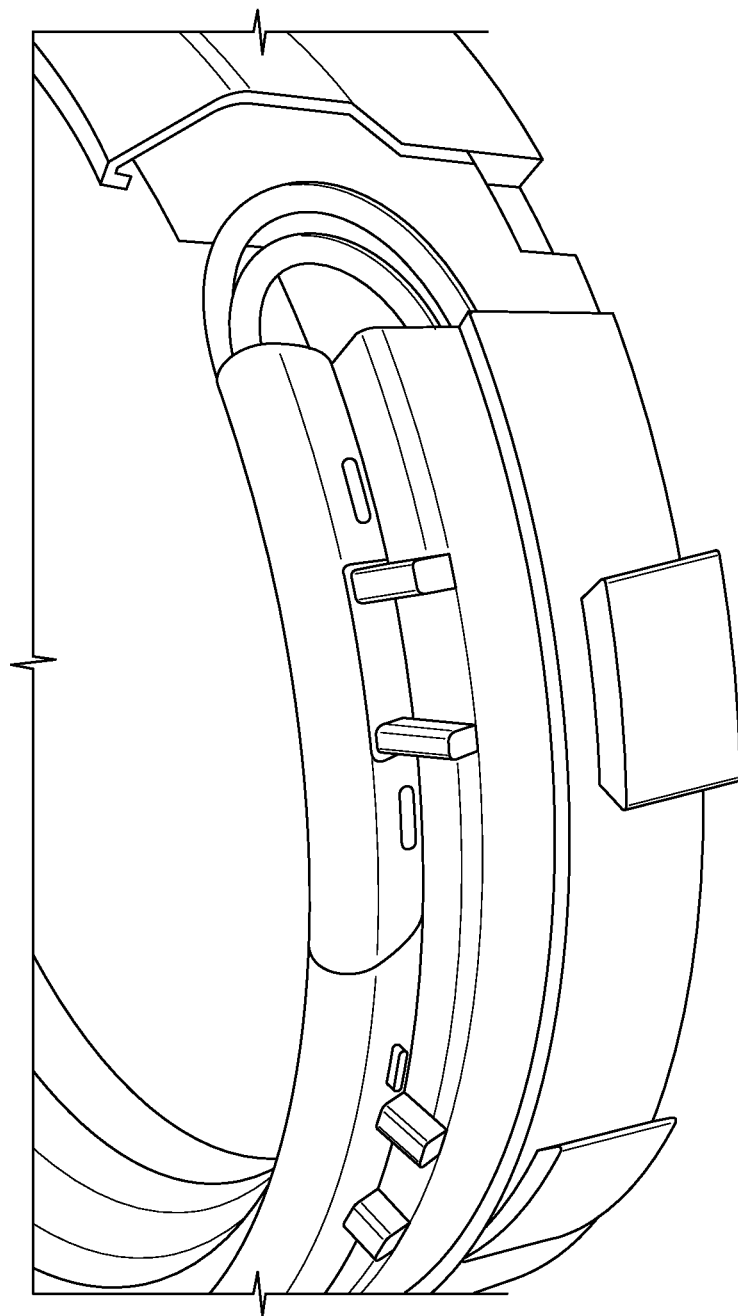
Figure 47B:
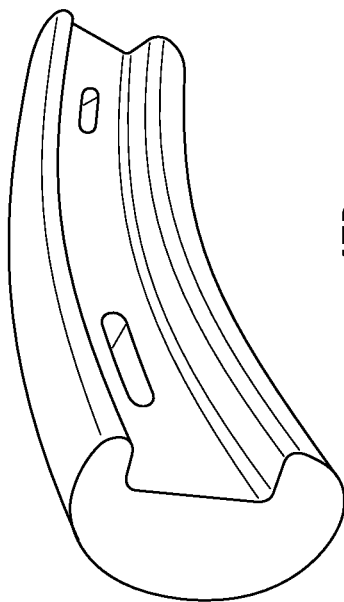
Figure 47D:
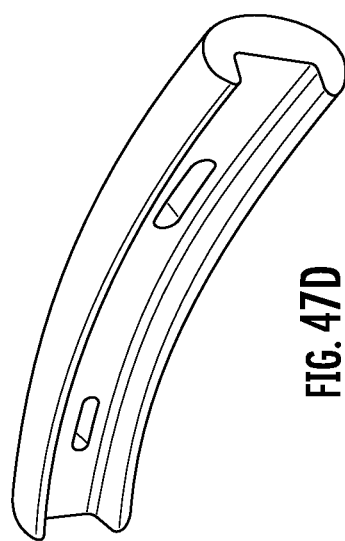
Figure 47A:
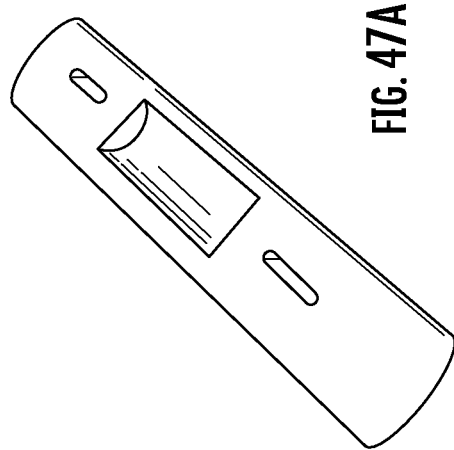
Figure 47C:
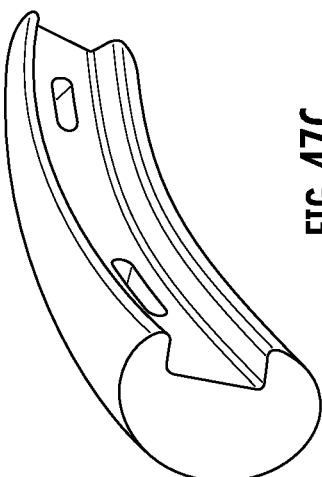
Figure 48:
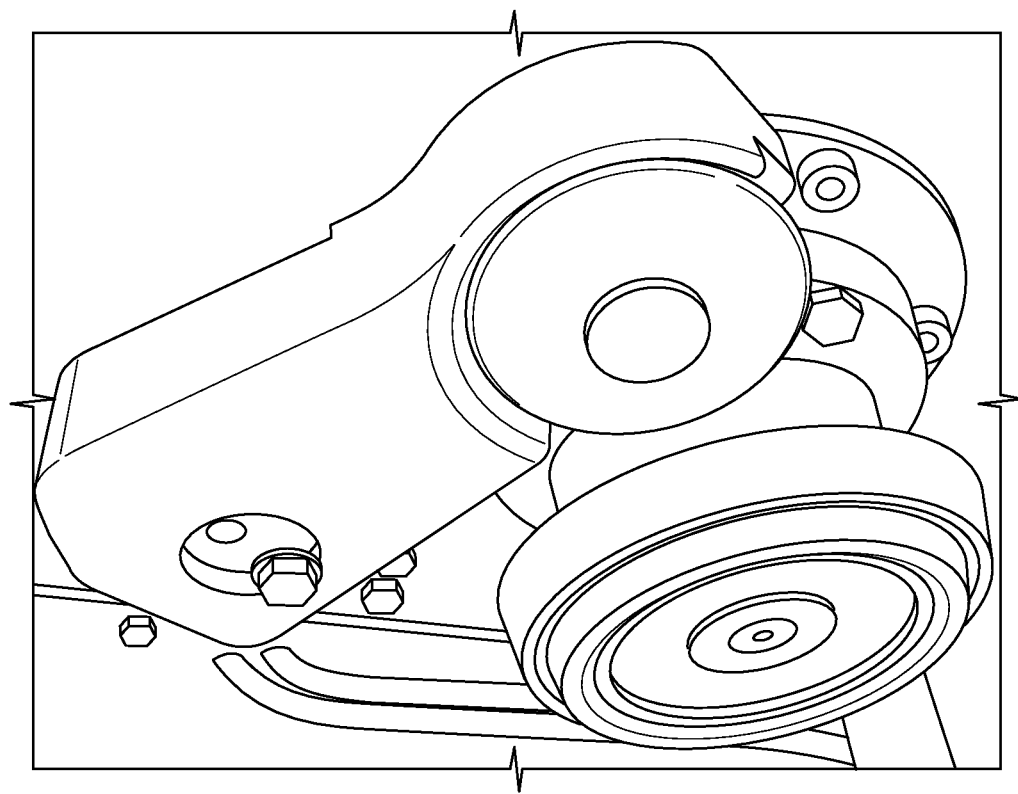
Figure 49:
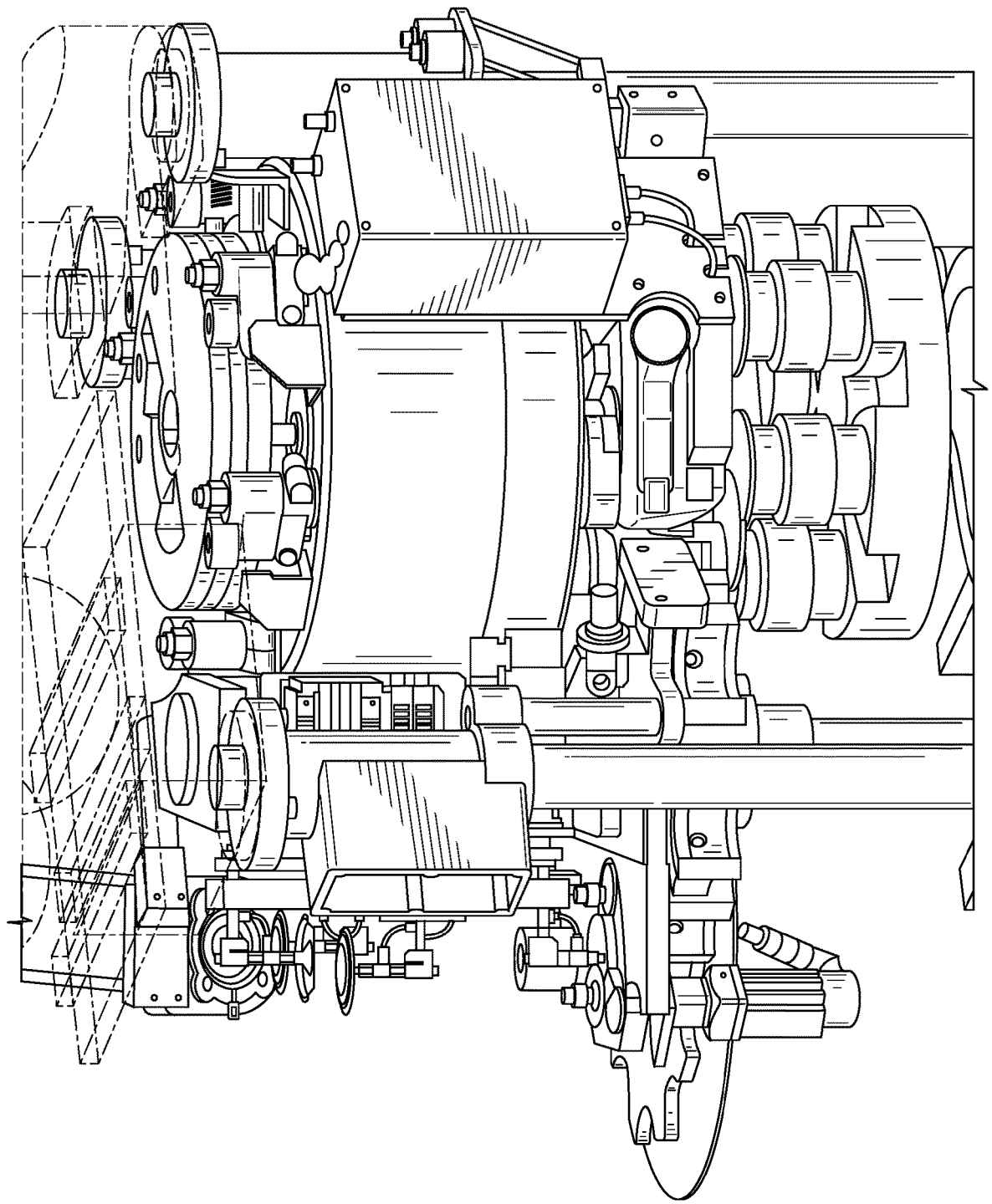
Figure 50:
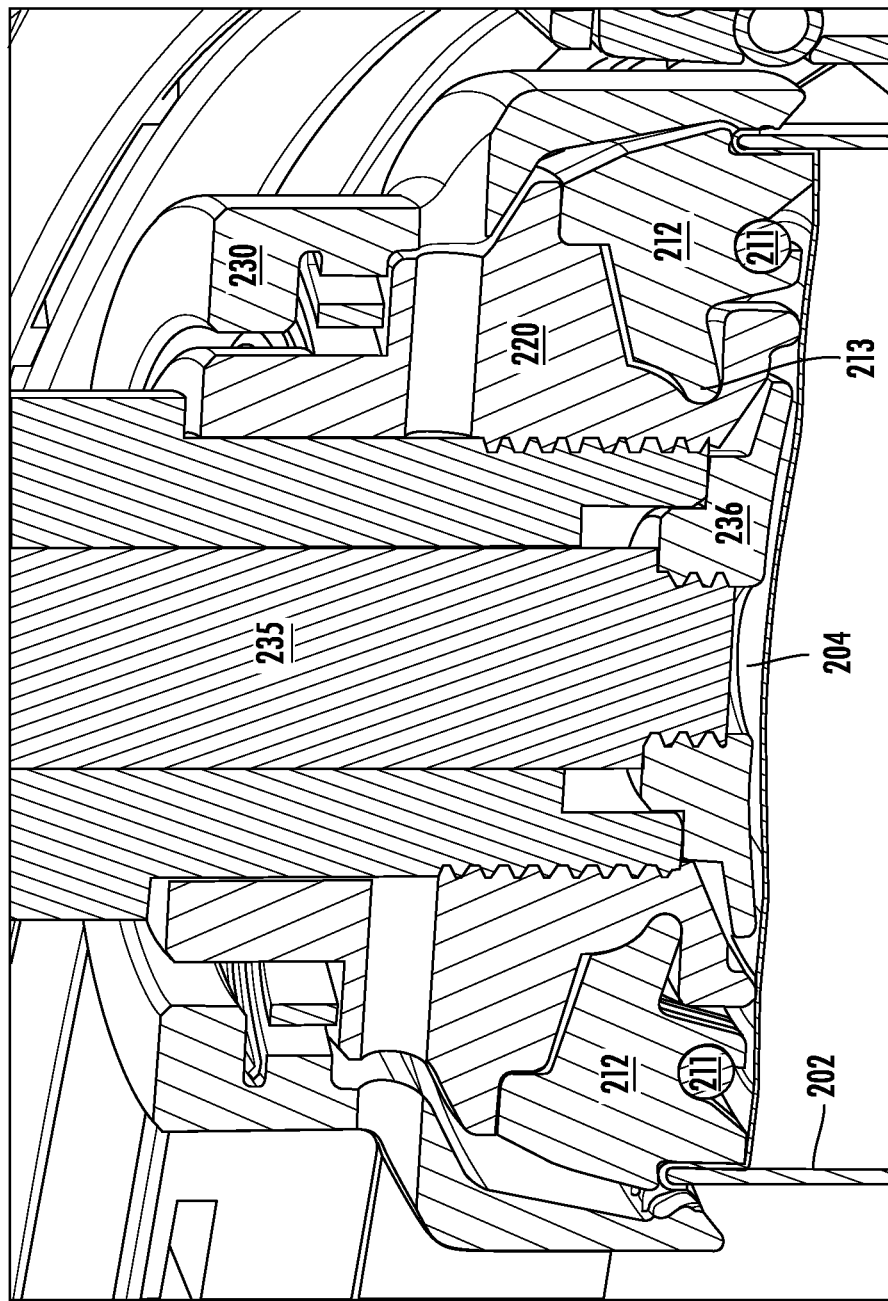
Figure 51:
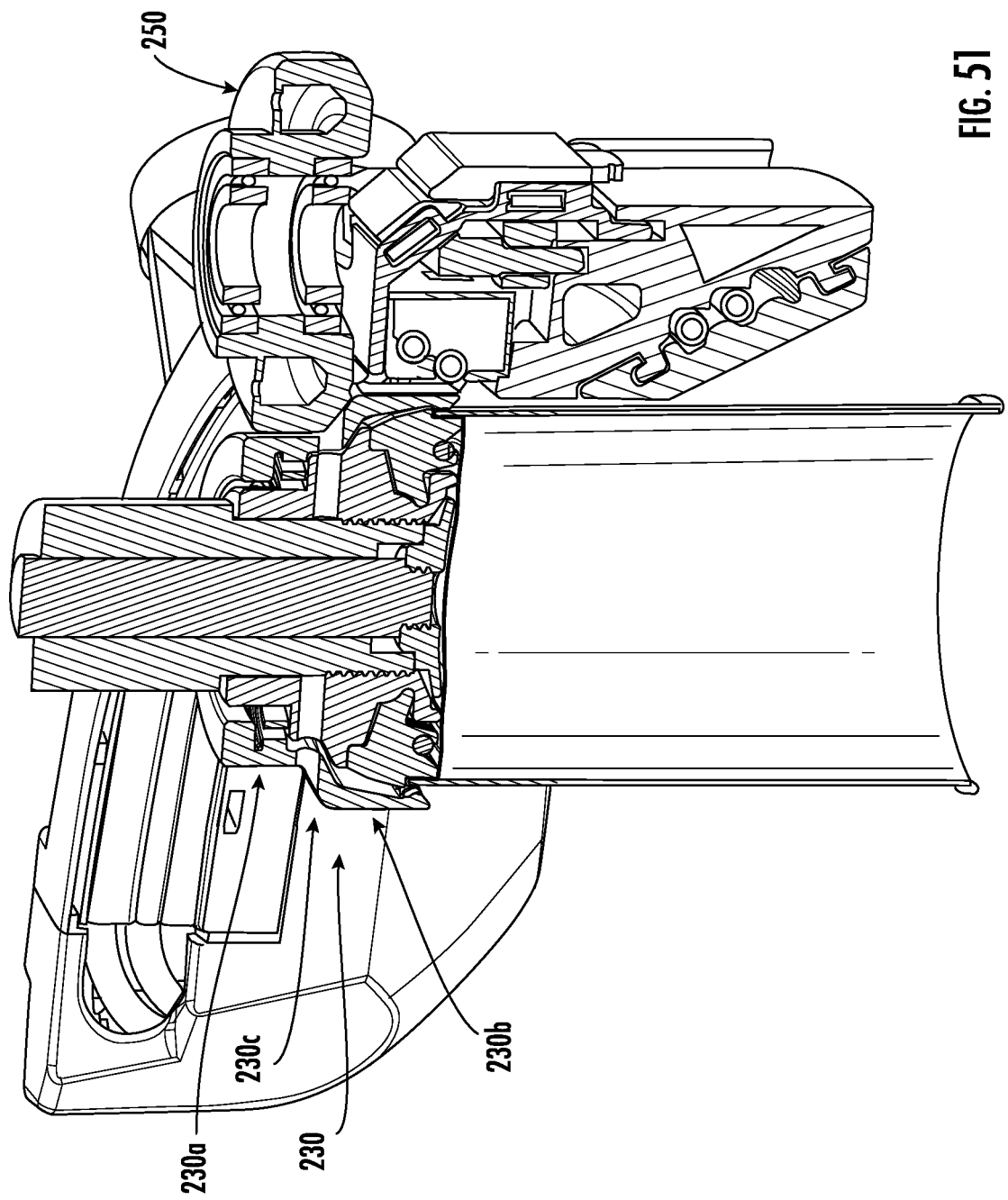

FIG. 12 is a cross-sectional top-side view of an example container and closure engaged with an assembly module including a lateral-moving roller, a peripheral sleeve, a chuck, and an expanding collet in a partially expanded state, in which the container has pivoted collet segments away from a front stop of the chuck to abut a compressible back stop, in accordance with some embodiments of the present disclosure;

FIG. 13 is a cross-sectional top-side view of the container, closure, and assembly module of FIG. 12 in its fully expanded state, in which the container has pivoted the collet segments all the way such that a back stop portion of the collet segments abuts a hard back stop of the chuck, in accordance with some embodiments of the present disclosure;

FIG. 14 is a cross-sectional top-side view of the container, closure, and assembly module of FIGS. 12-13 in its fully expanded state with the roller moved laterally to shift the peripheral sleeve eccentrically relative to the chuck, and further including an example fusing module, in accordance with some embodiments of the present disclosure;

FIG. 15 shows a cross-sectional side view of an example container and closure moving upward toward an assembly module including a lateral-moving roller, a peripheral sleeve, a chuck, and an expanding collet in its unexpanded state, in which collet segments abut a front stop of the chuck, in accordance with some embodiments of the present disclosure;

FIG. 16 shows a cross-sectional side view of the container, closure, and assembly module of FIG. 15 in its fully expanded state, in which the container has pivoted the collet segments away from the front stop to abut a back stop of the chuck, as the roller moves laterally toward the chuck, in accordance with some embodiments of the present disclosure;

FIG. 17 shows a cross-sectional side view of the container, closure, and assembly module of FIGS. 15-16 in its fully expanded state with a peripheral skirt of the closure pinched between the container and the peripheral sleeve, which has been shifted eccentrically relative to the chuck by the lateral movement of the roller, in accordance with some embodiments of the present disclosure;

FIG. 18 shows a cross-sectional bottom-side view of an example container and closure under an assembly module including a peripheral sleeve, a chuck, an expanding collet, and an expandable membrane surrounding the expanding collet, in accordance with some embodiments of the present disclosure;

FIGS. 19-24 show cross-sectional side views of example containers and closures within the assembly module along with example fusing modules, in accordance with some embodiments of the present disclosure;

FIGS. 25-35 show various example embodiments of the fusing module, in accordance with some embodiments of the present disclosure;

FIG. 36 illustrates a top view of a peripheral sleeve in accordance with some embodiments of the present disclosure;

FIG. 37 illustrates a perspective view of a peripheral sleeve in accordance with some embodiments of the present disclosure;

FIGS. 38-41 illustrate cross-sectional views of a separate and feed module in accordance with some embodiments of the present disclosure;

FIGS. 42-43 illustrate cross-sectional views of the fusing module of the invention, in accordance with some embodiments of the present disclosure;

FIG. 44 illustrates exemplary finished container and paper ends in accordance with some embodiments of the present disclosure;

FIG. 45 illustrates an exemplary induction coil in accordance with some embodiments of the present disclosure;

FIG. 46 illustrates an exemplary concentrator used in connection with an induction coil in accordance with some embodiments of the present disclosure;

FIGS. 47A-47D illustrate various angles of an exemplary concentrator for use in accordance with some embodiments of the present disclosure;

FIG. 48 illustrates a three-dimensional printed example of the assembly module in accordance with some embodiments of the present disclosure;

FIG. 49 illustrates an embodiment of the separate and feed module, assembly module, and sealing module, in accordance with some embodiments of the present disclosure;

FIG. 50 illustrates an embodiment of a cross-sectional top-side view of the container, closure, and assembly module in its fully expanded state; and FIG. 51 illustrates an embodiment of a cross-sectional top-side view of the container, closure, and assembly module in its fully expanded state.

DETAILED DESCRIPTION OF THE DISCLOSURE

While this present disclosure may be embodied in many forms, there is shown in the drawings and will herein be described in detail one or more embodiments, with the understanding that this disclosure is to be considered an exemplification of the principles of the present disclosure and is not intended to limit the disclosure to the illustrated embodiments.

Rigid Composite Containers

Rigid, paper-based, composite containers are used to package various products such as snacks and other food items. These containers often comprise a rigid cylindrical or shaped body usually manufactured with the top and bottom ends open. The composite containers may comprise rigid cans made from wound sheet material, such as cardboard and/or paperboard. In an embodiment, the containers may be spirally wound. While the bottom end closure is usually permanently affixed to the container, the top end closure is often designed to be easily removed by the consumer (i.e., a removable overcap and/or a peelable membrane).

Figure 1:
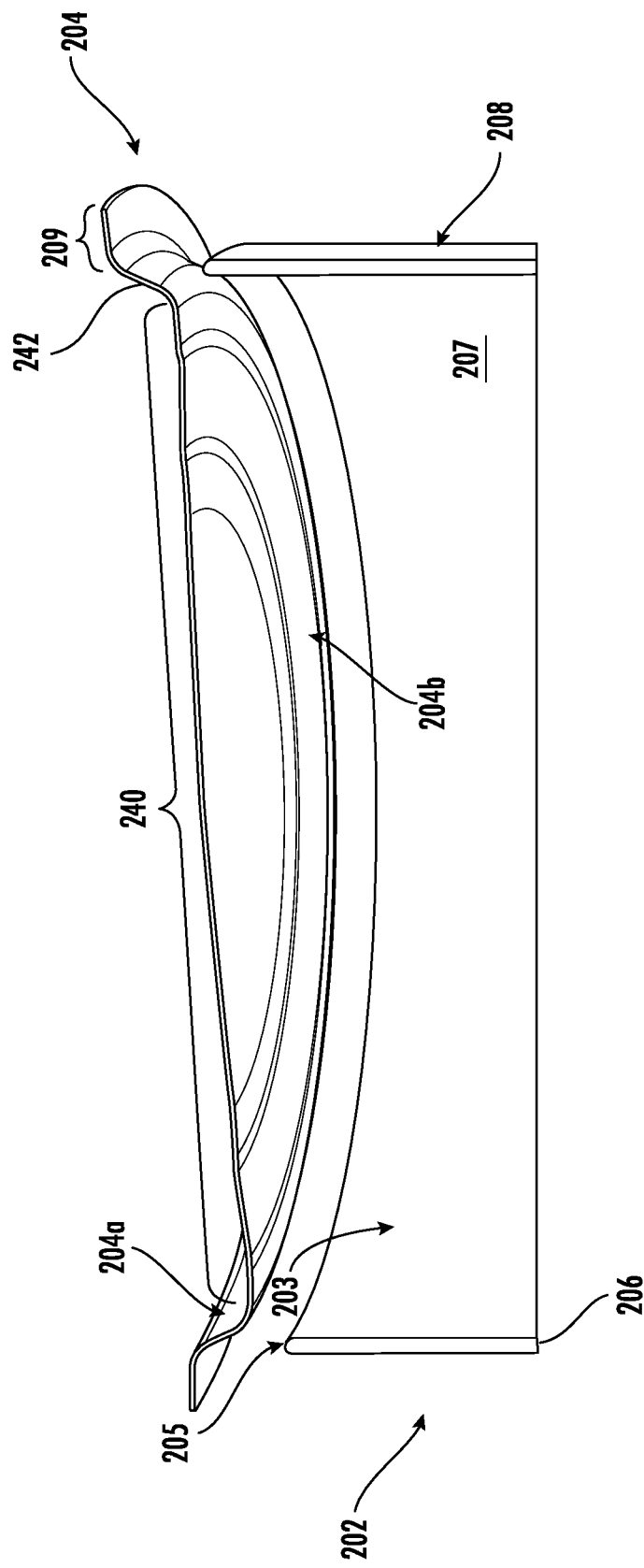
FIG. 1 is a cross-sectional side perspective view of an example container (e.g., rigid composite can) and closure (e.g., paper-based end closure), in accordance with some embodiments of the present disclosure.

FIG. 1 is a cross-sectional side perspective view of an example container 202. The container 202, also shown in FIGS. 3 and 11-14, may comprise a rigid cylindrical body having a sidewall 206 terminating in a rim 205 at an open end 203. In this embodiment, the open end 203 may comprise a bottom end of the container 202. In some embodiments, the open end 203 may be sealed with a closure 204 (e.g., paper-based end closure). In some embodiments, the container 202 may additionally have a second open end (e.g., the top end), opposite the open end 203, which may be sealed with a flexible membrane or other closure.

The open end 203 of the container 202 may be circumscribed by a rim 205 formed by the terminating edge of the sidewall 206 that forms the body of the container 202. The sidewall 206 may include an interior surface 207 facing the inside of the container 202 and an exterior surface 208 facing the outside of the container 202. The interior surface 207 may be the product-facing side of the sidewall 206 of the container 202. In some embodiments, the product(s) may be food products, and the interior surface 207 may include a food-safe layer and/or coating to help protect the integrity of the food product(s) to be contained within the container 202. The exterior surface 208 may include printing or other applied graphics for labeling and/or advertising the product(s) to be contained within the container 202.

In some embodiments, the rigid sidewall 206 of the container 202 may comprise multiple layers of paper, metal foil, and/or sealant. For example, moving from the exterior surface 208 inward, the sidewall 206 may comprise an outer ply of paper (e.g., white) coated with a sealant, two sandwiched plies of paper (e.g., brown cardboard or paperboard), and an inner lining of metal foil (e.g., about 0.0003 in. thick Aluminum) coated with a sealant. The metal foil lining and sealant layers may advantageously aid in the induction heating process—to seal the closure 204 to the container 202. Any combination of container layers (paper, metal, and/or sealant) may be utilized in the invention.

In some embodiments, the interior surface 207 and/or exterior surface 208 may include a layer of sealant at the open end 203 of the container 202 that may melt and seal the assembled closure 204 to the container 202. In some embodiments, the sealant layer may be disposed throughout the interior surface 207 and/or exterior surface 208 of the container 202 or may be disposed only along the edge(s) of the open end 203 of the container 202. In other embodiments, however, no separate sealant material is used.

Paper-Based End Closures

In some embodiments, the closure 204 of the present disclosure may be a paper-based end closure. In an embodiment, the closure 204 may be a generally flat circle or disc, sized to overlay the circumference of the open end 203 of the container 202. In an embodiment, the closure 204 may be a generally flat circle or disc, sized to be inserted into, in a recessed manner, the circumference of the open end 203 of the container 202. In another embodiment, the closure 204 may be pre-stamped, as shown in FIG. 1. In either case, the rotational/circumferential orientation of the closure 204 relative to the container 202 may be ignored where the container 202 and closure 204 are uniform throughout all angles of rotation. Other shapes (e.g., rectangular, polygon with extended side) are possible, however.

As discussed herein, the top and/or bottom sides 204a, 204b of the closure 204 will be referred to in the context of the orientation of the closure 204 when applied to the open end 203 of the container 202. Here, as shown in FIG. 1, the container 202 is oriented with respect to the closure 204 with the rim 205 of the open end 203 of the container 202 facing upward so as to first contact the bottom/lower/under/inner side 204b of the closure 204 that faces downward with the top/upper side 204a of the closure 204 facing upward. In embodiments where the open end 203 of the container 202 is the bottom of the container 202, the top side 204a of the closure 204 would thus be facing downward when the container assembly 406 (shown in FIG. 3) is oriented upright. It should be understood that other orientations not depicted in the present disclosure are possible for applying the closure 204 to the container 202, but the upper/top side 204a of the closure 204 may be that which faces outside when assembled as part of the end-product container assembly 406, and the bottom/lower/under side 204b is that which faces the product(s) inside the container 202 when assembled as part of the end-product container assembly 406.

In some embodiments, the closure 204 may be pre-stamped and/or pre-formed with specific structural features (see FIG. 1). The stamping and/or pressing process may include feeding flat closure material into a die press (e.g., stamping press) and compressing the material between opposing dies.

While the closure 204 may be made primarily of paper and other fiber-based material, it may also contain non-fiber barrier layers made from metal and/or plastic. In some embodiments, the closure material may comprise multiple layers of paper, metal, and/or sealant. For example, the closure may comprise two plies of paper (e.g., white) on the top side and/or a metal foil layer (e.g., about 0.0003 in. thick Aluminum) coated with a sealant on the bottom side 204b. The metal foil layer coated with sealant may advantageously be used with induction heating to seal the closure 204 to the container 202. In some embodiments, the sealant may be applied to the bottom side 204b of the closure 204 only around the outer periphery where the closure 204 is configured to contact the container 202. In other embodiments, the sealant may be applied to the entire bottom side 204b of the closure 204.

Figure 2A:
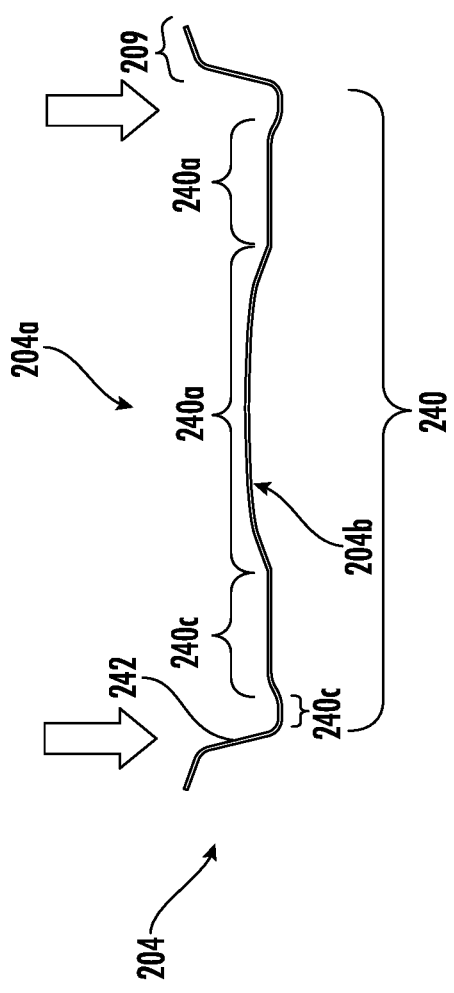
FIG. 2A is a cross-sectional view of an example closure before applying to a container, in accordance with some embodiments of the present disclosure.
Figure 2B:
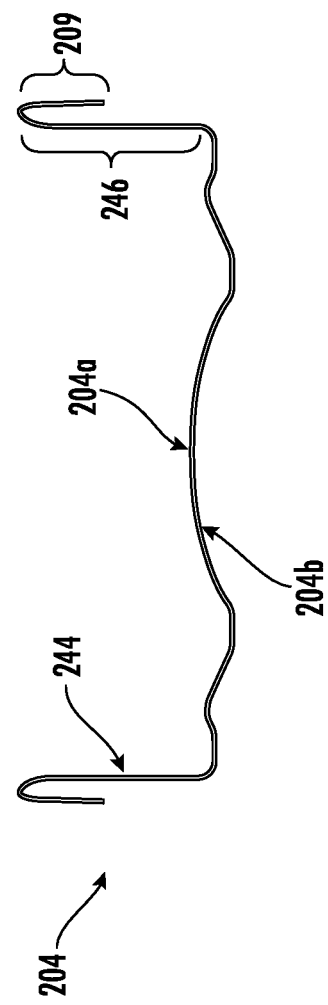
FIG. 2B is a cross-sectional view of the closure of FIG. 2A after being applied to a container, in accordance with some embodiments of the present disclosure.
Figure 2C:
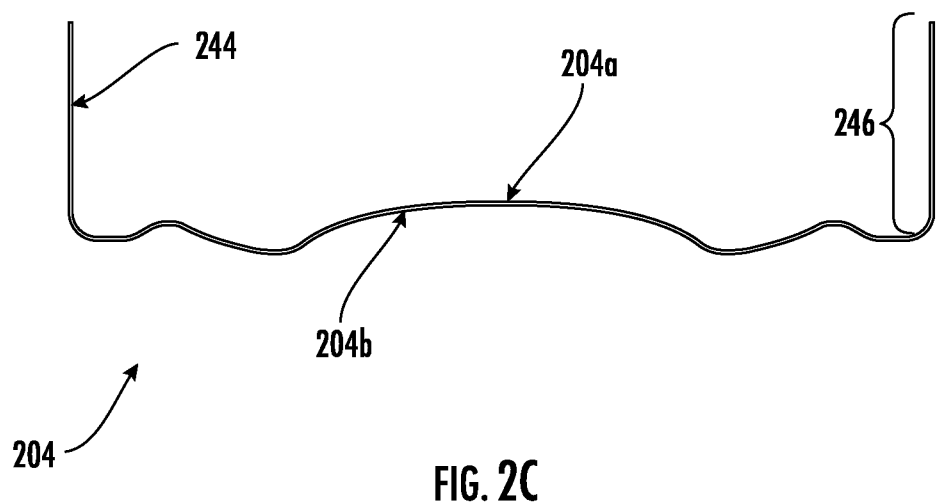
FIG. 2C is a cross-sectional view of a closure after being applied to a container in accordance with some embodiments of the present disclosure.

FIGS. 2A-2C show cross-sectional views of an embodiment of the pre-formed closure 204, both prior to and after assembly with the container 202. Before assembly, the pre-formed closure 204 may have a substantially flat central portion 240 in its center, an annular chuck wall 242 radially surrounding and extending in an angled vertical manner from the central portion 240, and (optionally) a peripheral skirt 209 extending radially outward from the chuck wall 242. The peripheral skirt 209 may also be disposed in an angled vertical manner. As noted above, in other embodiments, the entirety of closure 204, prior to insertion into a container 202, may be substantially flat or flat and disc-shaped.

In some embodiments, the central portion 240 of the closure 204 may be substantially flat and horizontal, but include one or more convex protrusions 240a, 240b rising from its top side. The one or more convex protrusions 240a, 240b may advantageously reserve additional material and/or surface area of the closure 204 within the central portion 240 that may be stretched as the closure 204 is expanded within the open end 203 of the container 202 (e.g., when the chuck wall 242 is pressed against the interior surface 207 of the sidewall 206 of the container 202). In some embodiments, the one or more convex protrusions 240a, 240b may additionally provide flexibility within the closure 204 such that any damage and/or distortion to the container assembly 406 and its seal (e.g., hermetic) due to the changing pressure differential between the outside and the inside of the sealed container assembly 406 may be minimized. In this way, the convex protrusions 240a, 240b formed into the closure 204 may help ensure the integrity of the product(s) contained within. In other embodiments, the central portion 240 of the closure 204 may include one or more concave protrusions or a combination of concave and convex protrusions.

As shown in FIG. 2A, in some embodiments, the central portion 240 may include a dome 240a at the center of the closure 204 atop a plateau 240b surrounding it. In an embodiment, the radially outward edge of the plateau 240b may circumscribe the plateau 240b and form an obtuse angle with a substantially horizontal flat annular ring 240c that forms the lowest portion of the closure 204 on its top side 204a (and the highest ledge of the closure 204 on its bottom side 204b). Said alternatively, the annular ring 240c may be the furthest point from the outer edge of the skirt 209 prior to application of the closure 204 to the container 202. In certain embodiments, the annular ring 240c may be generally U-shaped.

Further radially outward from and adjacent to the annular ring 240c, a chuck wall 242 may be pre-formed and/or stamped into the closure 204. The chuck wall 242 may form an obtuse angle with the annular ring 240c. In this way, the diameter of the lower portion of the chuck wall 242 adjacent the annular ring 240c may be less than the diameter of its upper portion adjacent the peripheral skirt 209.

The chuck wall 242 may be configured to be pressed against the interior surface 207 of the sidewall 206 of the container 202 when inserted into the open end 203 of a container 202, thus forming a countersink portion 244 (shown in FIGS. 2B and 2C, which represent cross-sectional views of various closures 204 after being assembled with a container). The length/height of the chuck wall 242 may correlate to a predetermined countersink depth 246 of the countersink portion 244 of the closure 204 within the open end 203 of the container 202 when assembled.

In some embodiments, further radially outward from and adjacent to the chuck wall 242, the peripheral skirt 209 may extend in a generally horizontal direction. The peripheral skirt 209 may be configured to fold over the rim 205 of the sidewall 206 of the container 202 at its open end 203. In some embodiments, the length of the peripheral skirt 209 may be sufficiently long such that the peripheral skirt 209 extends far enough beyond the rim 205 of the container 202 to be folded around the rim 205 to contact the exterior surface 208 of the sidewall 206 of the container 202. In some embodiments, the peripheral skirt 209 may be further pressed and sealed against the exterior surface 208 of the sidewall 206 of the container 202. In this way, the closure 204 may advantageously form two seals with the container 202 (e.g., one with the interior surface 207 and one with the exterior surface 208). Providing double seals between the container 202 and the closure 204 may aid in maintaining the hermetic seal. In some embodiments, the closure 204 may form a single continuous seal with the container 202 through the countersink portion 244, over the rim 205, and through the peripheral skirt 209.

Figure 2D:
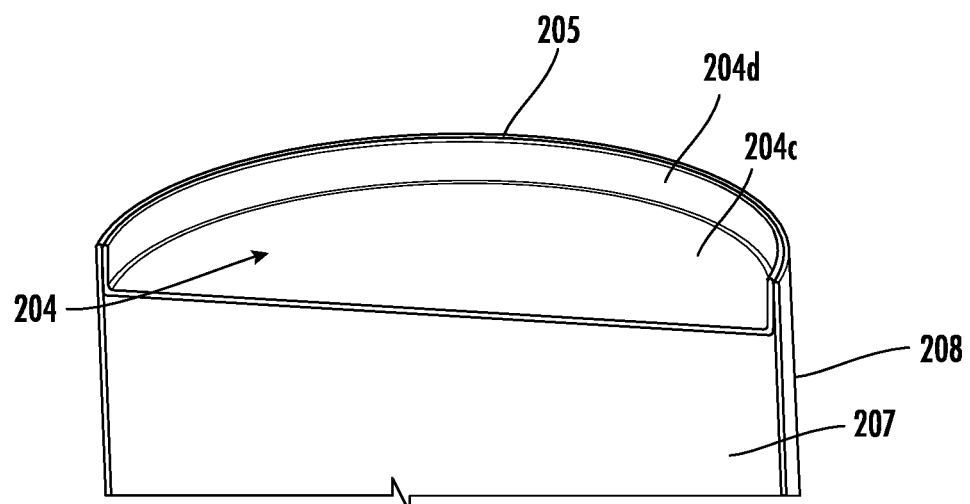
FIG. 2D is a cross-sectional view of a closure and container in accordance with some embodiments of the present disclosure.

In other embodiments, shown in FIGS. 2C-2D, the closure 204 may be configured such that the peripheral skirt 209 is recessed within or positioned inside the container 202 body. In this embodiment, the peripheral skirt 209 may not fold around the rim 205 to contact the exterior surface 208 of the sidewall 206 of the container. In an embodiment, the top surface 204a of the closure 204 may be spaced away from (e.g., recessed within) the bottom peripheral edge 205 of the container 202 body. The closure 204 may be recessed into the container body 202 at a predetermined recessed distance "$D_r$". The recessed distance "$D_r$" may be measured from the bottom peripheral edge or rim 205 of the container body 202 to the surface 204a of the bottom closure 204. In some embodiments, the recessed distance "$D_r$" may be within a range of about 0.2-2 cm (about 0.08-1.2 in.). For example, the recessed distance "$D_r$" may be about 0.7 cm (about 0.275 in.). The recessed distance "$D_r$" may be configured to minimize any protrusion of the surface 204a of the bottom closure 204 past the bottom peripheral edge or rim 205 of the container body 202 when the container assembly is exposed to higher pressure differentials between the container interior and external environment. For example, the depth of the recessed distance "$D_r$" of the bottom closure 204 may ensure that bottom closure 204 will not over inflate past the bottom peripheral edge or rim 205 of the container body 202 at pressure differentials exceeding about 10 inHg (~34 kPa). In this way, the recessed distance "$D_r$" combined with the integrity of the hermetic seal may help prevent distension of the closure beyond peripheral edge or rim 205 of the container body 202, rocking of the container body 202 when it is positioned upright, and/or other issues with the bottom closure 204.

The inventors have surprisingly discovered that the hermeticity of the bottom closure against the interior surface 207 of the container body 202, in this embodiment, can be maintained using a recessed closure 204 that is affixed to only the interior surface 207 of the container body 202. As will be disclosed herein, the closure 204 may be pushed into the container body 202 any distance that would be practical in the art. In some embodiments, the closure 204 becomes a recessed bottom. In some embodiments, the peripheral edge of the closure 204 is flush with the edge or rim 205 of the sidewall of the container body 202 (see FIG. 2D). In other embodiments, the peripheral edge of the closure 204 is disposed inward, in relation to the peripheral edge or rim 205 of the sidewall 206 of the container body 202.

The closure 204 may be recessed inside the container body 202 to form a first deformed surface 204c of the closure 204 is spaced away from (e.g. recessed within) the bottom peripheral edge 205 of the container body 202. The first deformed surface 204c may comprise a central portion of the closure 204. In an embodiment, the first deformed surface 204c may be flat, substantially flat, horizontal or substantially horizontal. During insertion of the closure 204 into the container body 202, as will be explained, in some embodiments, the peripheral skirt 209 of the closure 204 may be bent at a right angle or a near-right angle, shown as the second deformed surface 204d in FIG. 2D. The resulting second deformed surface 204d (previously the peripheral skirt 209) of the closure 204 may be disposed vertically or nearly vertically, adjacent the interior surface 207 of the container body 202, at the open bottom end 203.

System

In some embodiments, the invention comprises a system for applying and sealing a closure (e.g., paper-based end closure) to a container body (e.g., composite can). In an embodiment, the system of the present disclosure may comprise at least a separate and feed module 100, an assemble and press module 200, and a fusing module 300. The various modules may be utilized separately and/or as part of an overall system.

The system may include a conveyor for conveying the container bodies through the modules. The conveyor may also include different sections for moving the container bodies in different manners through the system. In some embodiments, the conveyor may include a rotary turntable 32 that conveys the container bodies in a rotational path through one or more modules.

Figure 4:
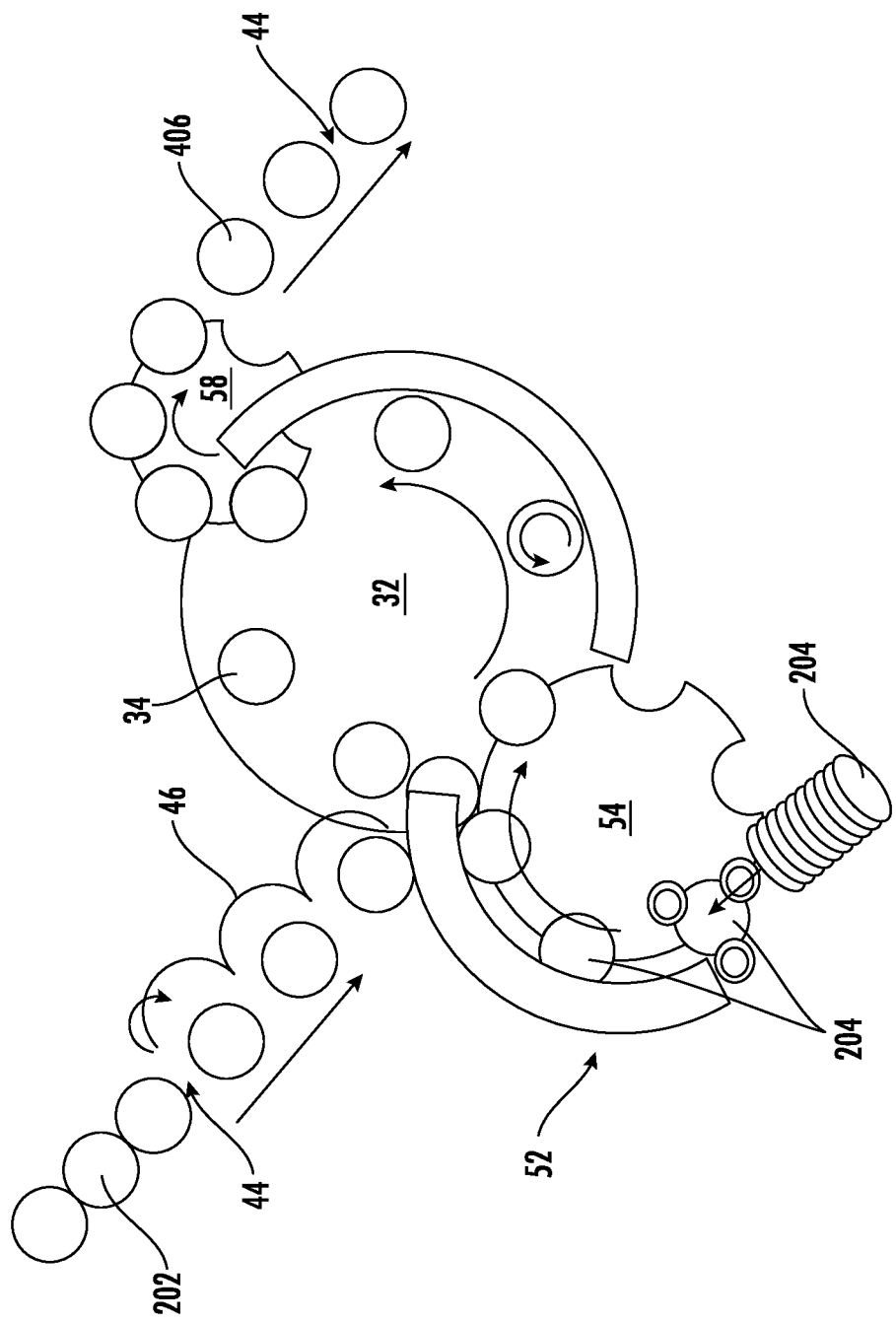
FIG. 4 is a top plan view of a seaming system diagram including a conveyor for conveying containers through various modules (e.g., a separate and feed module, an assembly module, a fusing module), in accordance with some embodiments of the present disclosure.

In some embodiments, as shown in FIG. 4, the conveyor may include an infeed conveyor 44 that conveys the container bodies 202 to the modules. The infeed conveyor 44 may comprise a feed screw 46 or any other suitable type of mechanism for conveying the container bodies to the system. The feed screw 46 may feed the container bodies to a pocketed turret device 52. The turret device 52 may convey the container bodies through the separate and feed module 100.

Next, the container bodies may be fed from the turret 52 to a transfer turret 58. The transfer turret 58 may advance the container bodies one at a time to the assembly module 200.

In some embodiments, the rotary turntable 32 may include chambers 34. The rotary turntable 32 may support a plurality of chambers spaced about its circumference. Each chamber essentially comprises a cylindrical tube into which a container body with a closure resting thereon may be loaded. The chamber's bottom may comprise a lifting plate.

Figure 5:
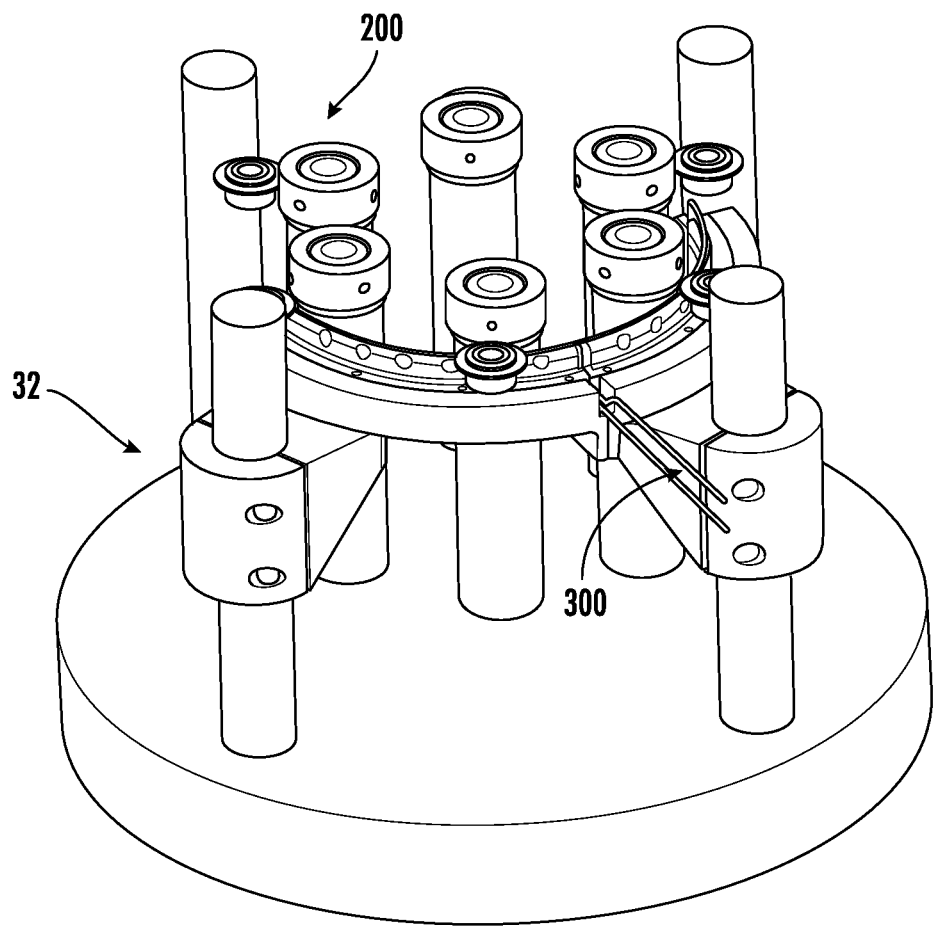
FIG. 5 is a top-side view of an example assembly module and fusing module above a rotary turntable, configured to rotate and convey containers and closures through the modules within the seaming system thereby producing container assemblies, in accordance with some embodiments of the present disclosure.

In some embodiments, as shown in FIG. 5, one or more assembly modules 200 and/or fusing modules 300 may be mounted above the turntable 32. The turntable may include lifting plates. Each lifting plate may be vertically movable relative to the assembly module 200. A cam may be mounted beneath the turntable 32 and may engage lifters attached to the lifting plates. As the turntable 32 is rotated about its axis, the lifter may be moved vertically according to the cam profile to cause the lifting plate to rise and fall, thereby lifting and lowering the container body, in order to perform the various operations involved in the assemble and press module 200.

Separate and Feed

Figure 6:
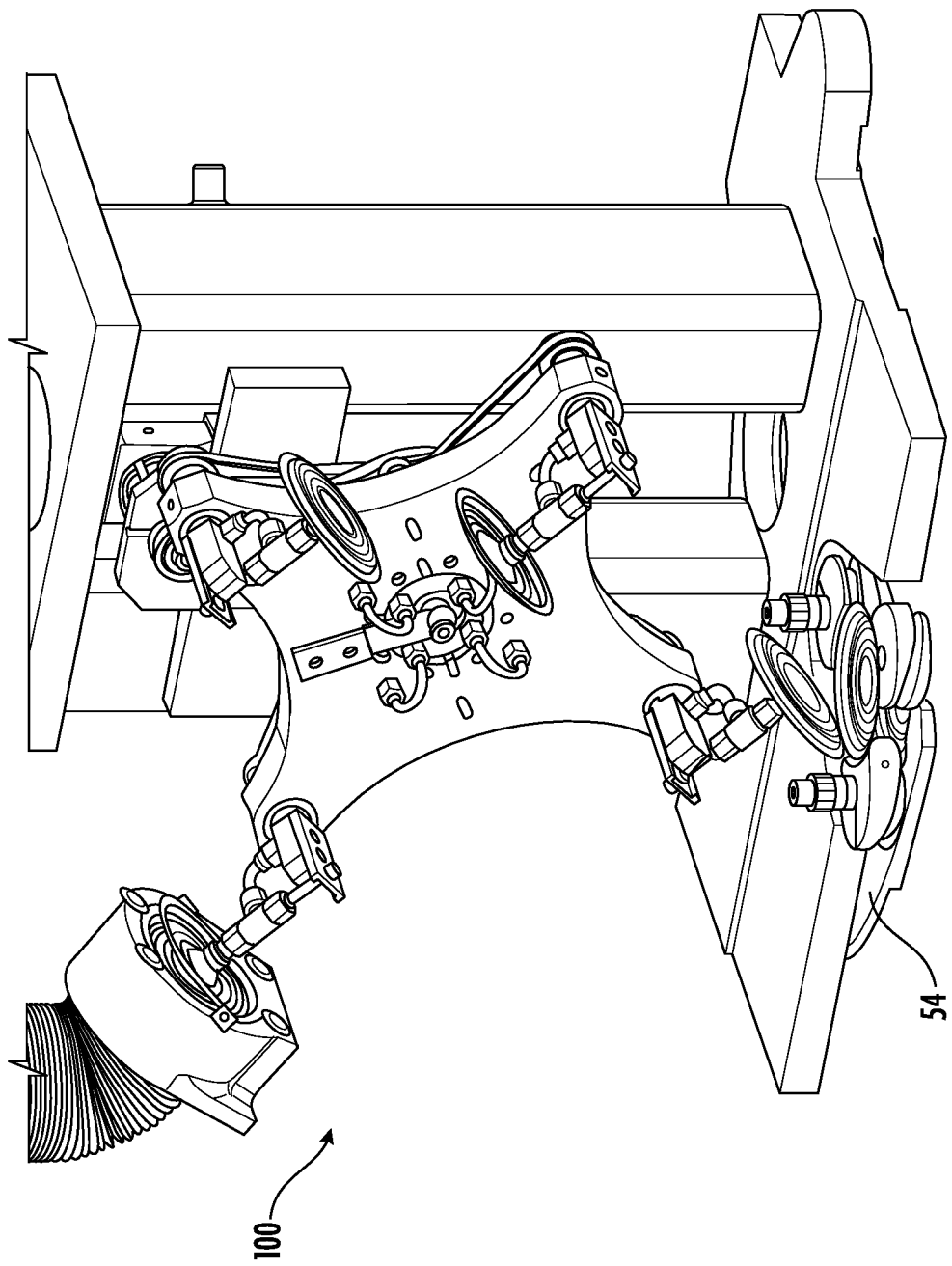
FIG. 6 is a top-side view of an example separate and feed module, configured to use vacuum cups mounted in a spindle arrangement to each remove an individual closure from a stack of closures and transfer the individual closure to a pocketed turret, which rotates to deposit the closure atop an open end of a container, in accordance with some embodiments of the present disclosure.

In some embodiments, the present disclosure includes novel systems and methods for separating and feeding individual closures (e.g., paper-based end closures) from a closure supply onto individual containers (e.g., rigid cylindrical composite cans) (see FIG. 6). In some embodiments, as the containers (e.g., composite cans) are conveyed through the system, the closures 204 (e.g., paper-based end closures) may be placed onto open ends 203 of the containers 202. Prior to placing closures 204 onto containers 202, the closures 204 may be separated from a stack of closures 204 and fed individually onto each container 202. Thus, the separate and feed module 100 will be described.

In some embodiments, the separate and feed module 100 may be capable of separating a single closure 204 from a stack of closures 204 and feeding the closure 204 into an outfeed screw assembly at a rate of at least 200 closures per minute. In other embodiments, the separate and feed module 100 may be capable of separating a single closure 204 from a stack of closures 204 and feeding the closure 204 into an outfeed screw assembly at a rate of at least 300 closures per minute. In some embodiments, the separate and feed module 100 may be capable of separating a single closure 204 from a stack of closures 204 and feeding the closure 204 into an outfeed screw assembly at a rate of at least 400 closures per minute. In still another embodiment, the separate and feed module 100 may be capable of separating a single closure 204 from a stack of closures 204 and feeding the closure 204 into an outfeed screw assembly at a rate of at least 450 closures per minute. In an embodiment, the separate and feed module 100 may be considered a high-speed separate and feed system.

Referring to FIGS. 38-41, generally speaking, the closures (e.g., stamped paper ends) 204 may be provided in a stacked configuration. For example, the closures 204 may be provided to the system via a gravity-fed closure infeed track 105. The infeed track 105 may contain a plurality of stacked closures 204. The infeed track 105 may generally have a size, shape, and configuration which is similar to or the same as the closures 204. For example, if the closures 204 are generally disc-shaped, the infeed track 105 may be generally cylindrical and may enclose a stack of closures 204 within the cylindrical portion. In an embodiment, the infeed track 105 may have an accordion configuration, such that it may bend, rotate, or twist as needed for the system. In an embodiment, the infeed track 105 may be disposed such that the closures 204 are stacked vertically or substantially vertically, with the opening 122 of the infeed track 105, which then deposits the closures 204 facing downwardly or generally downwardly. Alternatively, the infeed track 105 may be disposed horizontally or substantially horizontally. Any configuration may be utilized.

The closures 204 may be disposed in the infeed track 105, in an embodiment, with their non-product-facing surface 116 facing the opening 122 in the separate and feed module 100. In an embodiment, the infeed track may comprise clips 120 on its open end 122 which hold or secure the closures 204 within the track 105 until removal of each closure 204. The clips 120 may take any form or shape which retains the closures 204 in place within the track 105 but allows deformation of the closures 204 sufficient to allow the closures 204 to be removed from the infeed track at the appropriate time. In an embodiment, the clips 120 are disposed partially into the circumference of the open end 122 of the infeed track 105. Alternatively, the open end 122 may have integral features which retain the closures 204 within the infeed track 105 until they are removed by the system.

The separate and feed module 100 may remove one closure 204 at a time from the stack of closures and deliver it to a servo-driven screw, screw conveyor, or other device known in the art, in an embodiment. The screw conveyors can be driven by any known mechanism, such as a belt, gear, chain or other system. In an embodiment, the screw may rotate continuously. In other embodiments, the screw may stop and start, wherein the screw stops are correlated to the placement of a closure 204 within the screw. For example, the screw may rotate at a continuous speed and the stop when the screw is positioned below the displacement location for the closure 204. In still other embodiments, the screw may rotate at a continuous speed and slow when the screw is positioned below the displacement location for the closure 204. In an embodiment, the screw may be timed to the separate and feed module 100. It should be noted that in FIGS. 40 and 41, multiple closures 204 are shown vertically aligned below the displacement location for the system 100. In an embodiment, the closures 204 would be conveyed horizontally prior to another closure 204 being placed into the screw. Thus, in an embodiment, the closures 204 would not be simultaneously vertically aligned.

In some embodiments, the separate and feed module 100 may comprise a servo-driven four (4) head 113 transfer dial 111, each with a vacuum cup 114 mounted in a spindle arrangement. That being said, any number of heads is contemplated herein. In an embodiment, the system comprises a two (2) axis servo system.

Figure 40:
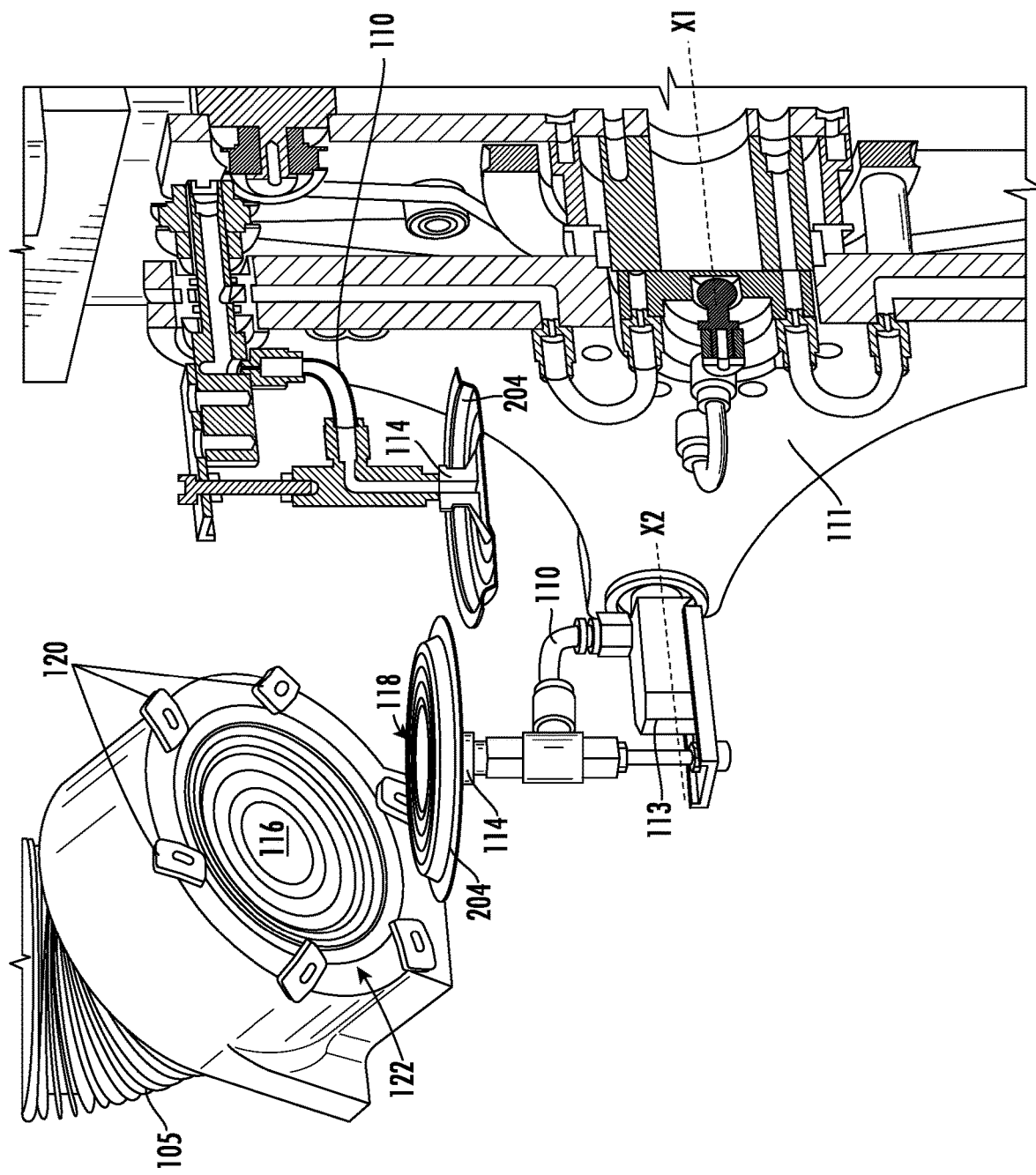
Figure 41:
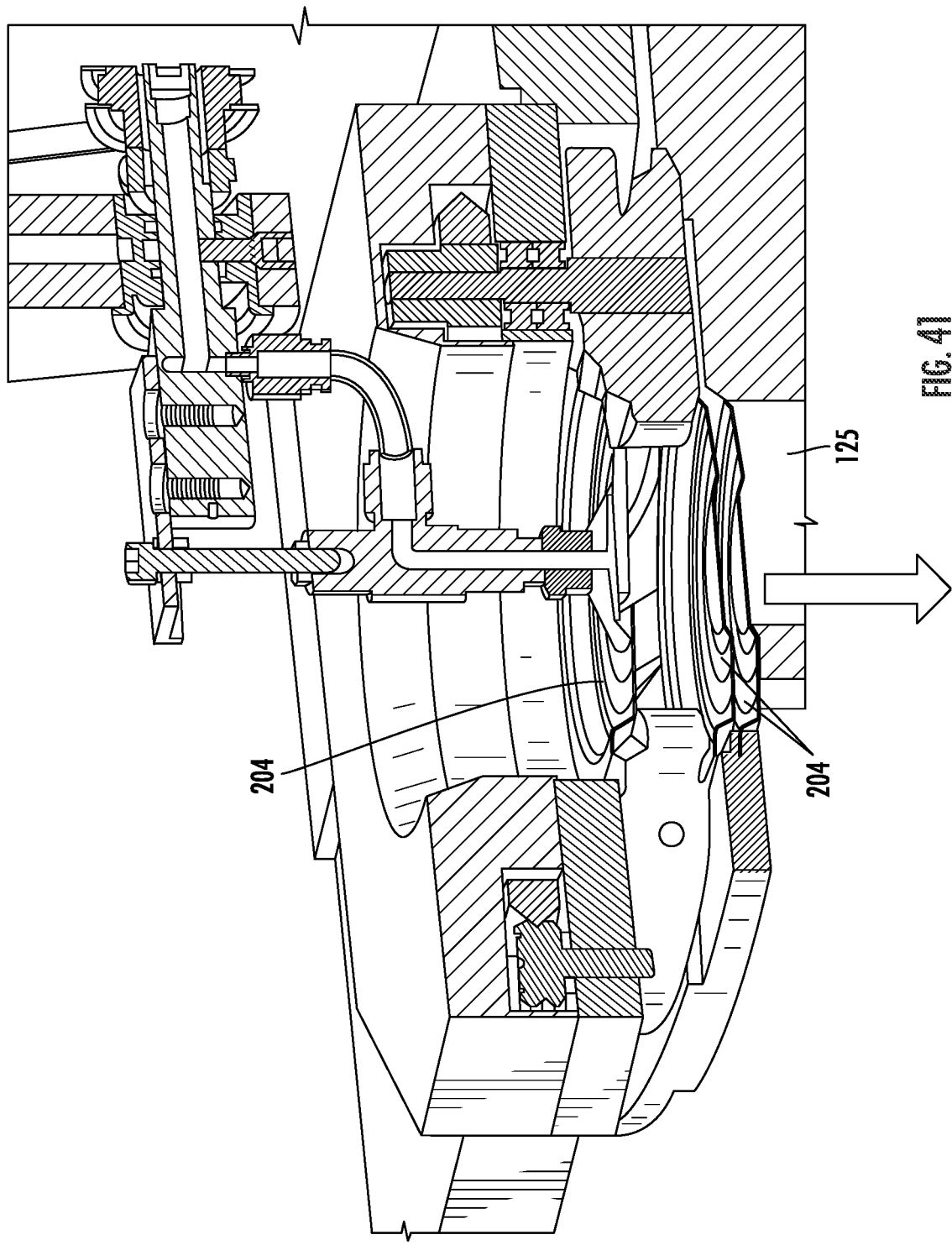

Referring to FIG. 40, the removal of a closure 204 from the infeed track 105 is shown. In an embodiment, a closure 204 is removed from the infeed track 105 by the vacuum cup 114. In an embodiment, the vacuum cup 114 is mounted on the head 113 and rotates about the dial 111 in a clockwise or counterclockwise motion, about an axis of rotation shown as $X_1$, in the center of the transfer dial 111. Likewise, the vacuum cup 114 may rotate about the head 113 in a clockwise or counterclockwise motion, about an axis of rotation shown as $X_2$, in the post supporting the head 113. Thus, it can be understood that the vacuum cups 114 can simultaneously rotate about the axes $X_1$ and $X_2$. In an embodiment, the rotation about axes $X_1$ and $X_2$ is in the same direction (i.e. clockwise or counterclockwise).

As a vacuum cup 114 approaches the open end 122 of the infeed track 105, the vacuum cup 114 is rotated to meet the open end 122 of the infeed track 105. The vacuum cup 114 is pressed into the first closure 204 in the open end 122 of the infeed track 105. Using suction formed based upon the shape of the vacuum cup 114 and/or using forced vacuumed air, sucked inward through a line 110, the closure is temporarily affixed to the vacuum cup 114. As the dial 111 and/or head 113 rotates, the vacuum cup 114 is moved away from the infeed track 105. Due to the suction/vacuum forces, the closure 204 is retained on the vacuum cup 114 and moves with the vacuum cup 114 (see FIG. 40). The closure 204 may deform slightly to pass the clips 120 as it is removed from the infeed track 105.

In some embodiments, the separate and feed module 100 may comprise a vacuum manifold with a blow-off port 112. In this embodiment, the vacuum function may retain the closure 204 on the vacuum cup 114 during transfer and the blow-off port may exert a blast of pressurized air to remove the closure 204 from the vacuum cup 114 upon delivery to the screw 125. Thus, in this embodiment, the vacuum function may be activated until the blow-off function is triggered. In an embodiment, the blow-off port may use house air or a reservoir.

In some embodiments, the vacuum cup engages the exterior side 204*a* (i.e. non-product-facing surface 116) of the closure. In other embodiments, the vacuum cup engages the interior side 204*b* (i.e. product-facing surface) of the closure. In a particular embodiment, the vacuum cup 114 contacts only the surface 116 of the closure 204 which will eventually be outwardly-facing on the container. That is, the vacuum cup 114 may not, in an embodiment, contact the food- or product-facing side 118 of the closure 204. This may provide for a more sanitary application process, particularly for containers housing food, beverages, pharmaceuticals, or other similar products.

In some embodiments, the rotary motion of each head 113 may be geared to the motion of the transfer dial via a timing belt. In some embodiments, the system may feed the closures 204 into one or more outfeed screw assemblies 124. In an embodiment, the system 101 drops the closures 204 vertically into a screw. The outfeed screw assembly 124 may transfer the closure 204 to a rotating dial. In an embodiment, the rotating dial may be continuously rotating about the system 100. The rotating dial may then convey the closure to a container 202, optionally in connection with a body turret. In some embodiments, the outfeed screw comprises one or more (in some cases, three (3)) feed screws, which may also be servo-driven and may be geared together and to the transfer dial. In other embodiments, the vacuum cup 114 rotates the closure 204 to a position adjacent a container 202 or directly onto a container 202. In some embodiments, the closure 204 may be positioned above a container 202 by the system 100.

As shown in FIGS. 4 and 6, the separate and feed module 100 may be associated with a pocketed turret 54. In this embodiment, the turret device 52 of the conveyor may convey the containers to the pocketed turret 54. The separate and feed module 100 may be configured to feed and deposit closures 204 into each pocket of the turret 54.

In any embodiment, the closure 204 may then be loosely placed on the container 202, optionally within a vacuum chamber. The container 202 and closure 204 may then be conveyed to the assemble and press module, in an embodiment.

Assemble and Press

In some embodiments, the system 100 may include an assembly module 200 for assembling containers 202 (e.g., composite cans) and closures 204 (e.g., paper-based end closures). The assembly process for the containers 202 and closures 204 may include applying a closure 204 to an open end 203 of a container 202 and folding and pressing specific portions of the closure 204 to seal (e.g., hermetically) the container 202 closed.

As shown in FIGS. 7-18, the assembly module 200 may include a chuck 220 engaged with an expanding collet 210. Generally speaking, the chuck 220 and expanding collet 210 of the assembly module 200 may be configured to provide a controlled and repeatable pressing and folding action on the closures 204 during assembly with the containers 202. In this way, the chuck 220 and expanding collet 210 may insert, press, and fold the closure 204 into, against, and around the open end 203 of the container 202. More particularly, the expanding collet 210 may be configured to be partially inserted into the open end of the container 202 (adjacent closure 204) and then expanded outwardly to press the closure 204 against the interior surface 207 of the container 202. The closure 204 may also simultaneously or sequentially, in various embodiments, be pressed over the rim 205 of the sidewall 206 of the container 202 and against the exterior surface 208 of the container 202 (e.g., by a peripheral sleeve 230, as discussed herein).

Turning now to specific embodiments, in some embodiments, the chuck 220 may be configured such that the chuck 220 does not move vertically relative to the container 202 (i.e., is vertically stationary). That is, the chuck 220 does not move vertically upward and downward. For clarity, while the chuck 220 may be vertically stationary, the chuck 220 may continuously spin about its axis and/or revolve around the turret center of the machine.

In such an embodiment, the container 202 is raised upward to meet the chuck 220 and collet 210. In such embodiments, the system 100 may include lifting plates on which the containers 202 are elevated to contact the chuck 220 and expanding collet 210, pneumatically or otherwise. The lifting plates may be configured to axially align the rim 205 of the container 202 with certain portions of the expanding collet 210 before raising the container 202 to engage the container rim 205 with the closure 204, chuck 220, and/or expanding collet 210. In other embodiments, a bell guide may drive the closure 204, container 202, and chuck 220 into alignment.

Additionally, the lifting plates may be configured to rotate the container 202 (e.g., revolving about a central longitudinal axis of the container). In some embodiments, the rotational speed of the container 202 may be at least 1000 rotations per minute (RPM). In other embodiments, the rotational speed of the container 202 may be at least 2000 RPM. In some embodiments, the rotational speed of the container 202 may be within the range of about 1000 RPM to about 2000 RPM.

Additionally, the lifting plates may be configured to translate the container 202 (e.g., horizontally along a path). In some embodiments, the translational path may be circular or semi-circular. In some embodiments, the translational speed of the container 202 may be at least 50 RPM. In other embodiments, the translational speed of the container 202 may be at least 100 RPM. In some embodiments, the translational speed of the container 202 may be within the range of about 50 RPM to about 100 RPM.

As will be understood, the rotation and translation of the container 202 may aid in the fusing of the closure 204 to the container 202 and/or in the pressing of the closure 204 to the exterior surface 208 of the sidewall 206 of the container 202. In an embodiment, the translational and rotational movement of the containers 202 at such speeds allows for commercial application of closures 204 to containers 202 at rates of at least 400 or 420 containers per minute ("CPM"). In another embodiment, the translational and rotational movement of the containers 202 at such speeds allows for commercial application of closures 204 to containers 202 at rates of at least 500 CPM. In still another embodiment, the translational and rotational movement of the containers 202 at such speeds allows for commercial application of closures 204 to containers 202 at rates of at least 600 CPM.

One or more additional parts of the assembly module 200 may be configured to rotate in sync with the lifting plate and/or container 202. For example, the chuck 220 and/or the expanding collet 210 may rotate at substantially the same rotational speed as the lifting plate and container 202 during assembly of the container 202 with a closure 204 in order to minimize frictional forces due to relative movement between the container 202, the chuck 220, expanding collet 210, and/or other parts of the assembly module 200.

Additionally or alternatively, the system 100 may lower the chuck 220 and expanding collet 210 onto the rim 205 of the open end 203 of the container 202 to apply the closure 204. In either case, the pressing force of the container 202 into the collet 210 or the collet 210 into the rim 205 of the container 202 may be between about ten (10) and thirty (30) pounds of pressure. In a particularly, embodiment, the pressing force may be about twenty (20) pounds.

Chuck

As noted above, the assembly module 200 may include a chuck 220 engaged with an expanding collet 210. In an embodiment, the chuck 220 may be generally cylindrical with indentations formed and/or cut into its circumferential surface to form alcoves for engaging with the expanding collet 210. In an embodiment, the chuck 220 may comprise an upper portion 220a and a lower portion 220b. The diameter of the upper portion 220a may be greater than the diameter of the lower portion 220b, in an embodiment. The lower portion 220b of the chuck 220, in an embodiment, may be the portion that is engaged with the collet 210. In an embodiment, the chuck 220 may additionally comprise a neck portion 220c disposed above the upper portion 220a. The neck portion 220c may have a smaller diameter than the upper portion 220a and/or lower portion 220b.

In some embodiments, the center of the chuck 220 may comprise a central hollow portion (e.g., a through hole or bore) with internal threading for mounting the chuck 220 onto cooperating threaded parts of the system 100.

Expanding Collet

The expanding collet 210 may surround the generally cylindrical lower portion 220b of the chuck 220. In an embodiment, the expanding collet 210 may also be generally cylindrical and may comprise a plurality of individual collet segments 212. Portions of the expanding collet 210 may be inserted into indentations and/or alcoves of the lower portion 220b of the chuck 220, creating engagement between the expanding collet 210 and the chuck 220.

In some embodiments, the expanding collet 210 may be configured to pivot axially upward and/or radially outward as the rim 205 of the open end 203 of the container 202 moves axially toward the chuck 220 and engages the expanding collet 210.

Figure 7:
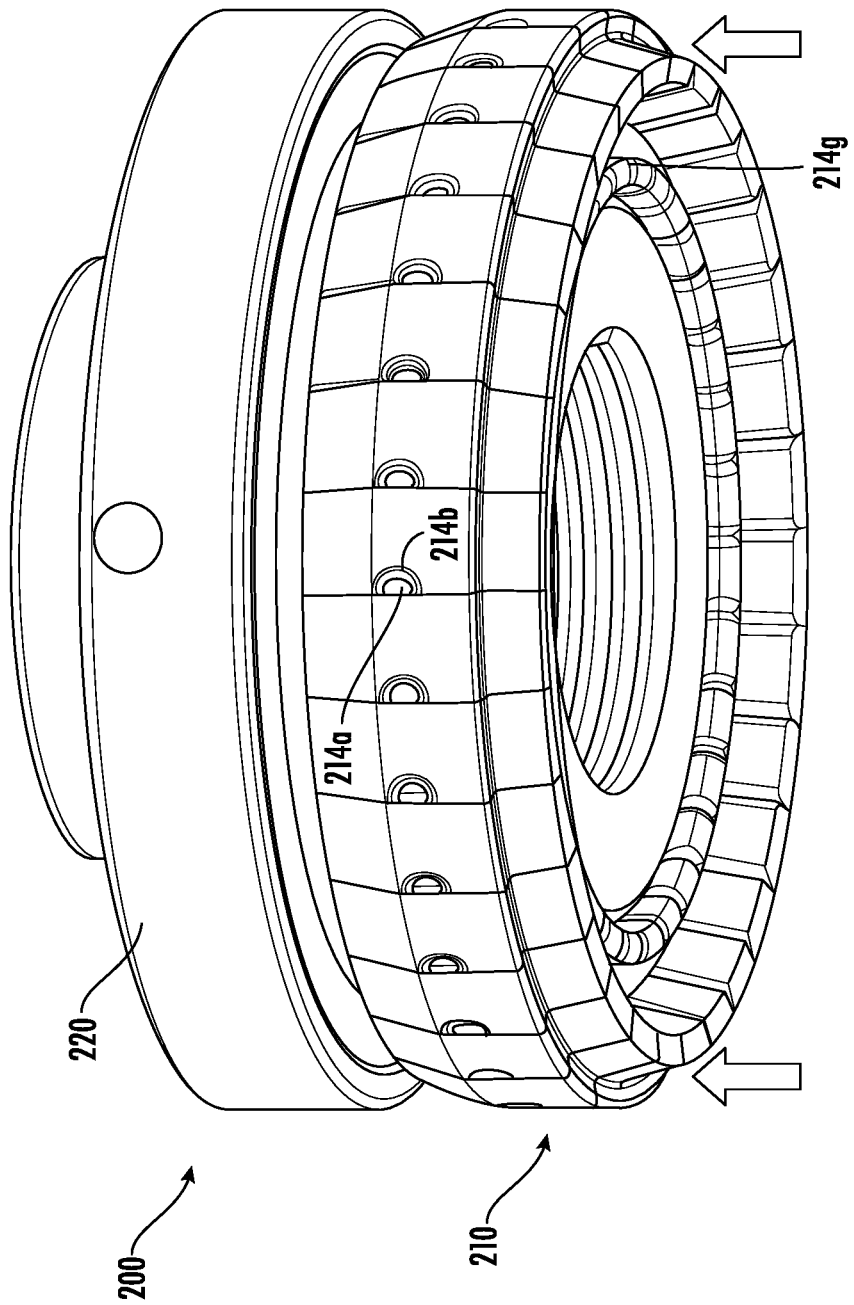
FIG. 7 is a bottom-side view of an example assembly module comprising a chuck and an expanding collet in its unexpanded state, in accordance with some embodiments of the present disclosure.
Figure 8:
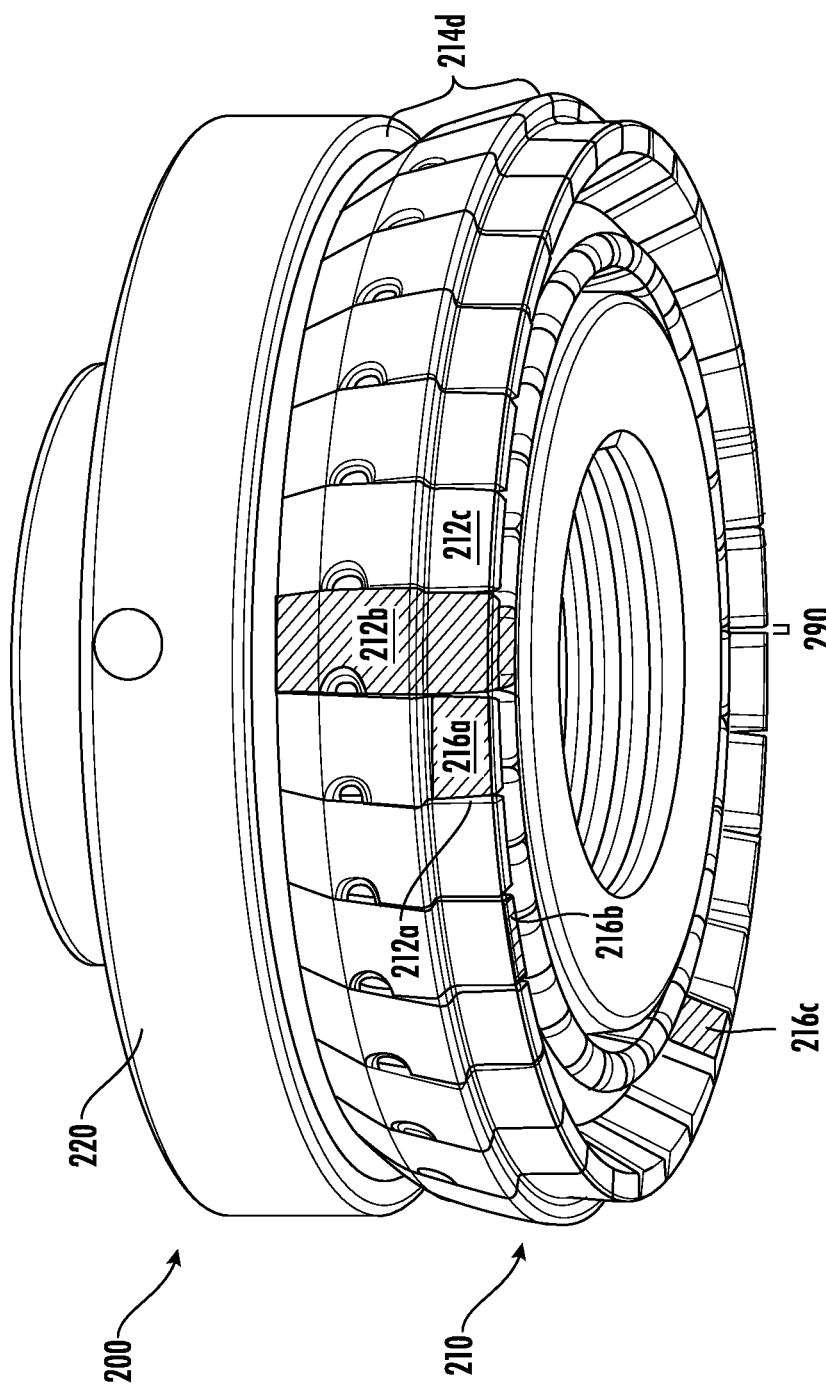
FIG. 8 is a bottom-side view of the assembly module of FIG. 7 in its fully expanded state, in accordance with some embodiments of the present disclosure.
Figure 9:
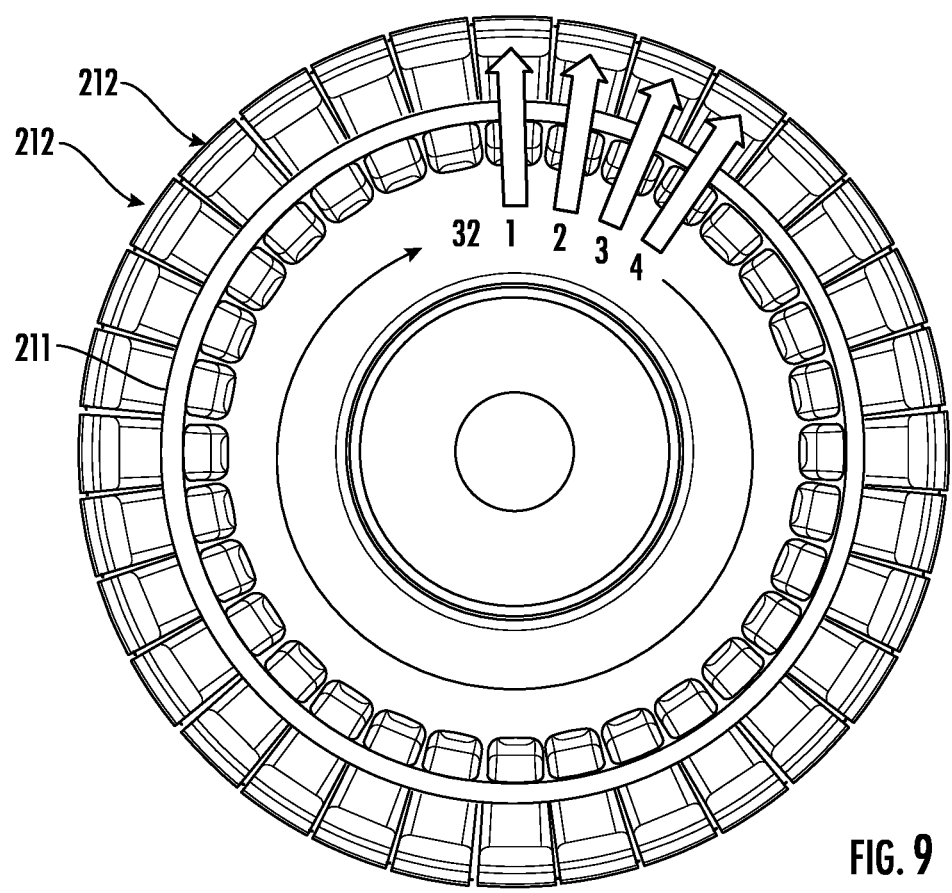
FIG. 9 is a bottom plan view of the assembly module of FIGS. 7-8 in its unexpanded state, wherein collet segments that together form the expanding collet are unpivoted, in accordance with some embodiments of the present disclosure.

The expanding collet 210 may have different states of expansion. For example, as shown in FIG. 7, the expanding collet 210 may have a resting or unexpanded state in which the collet segments 212 are initially unpivoted. In the unexpanded state, the expanding collet 210 may have the smallest diameter and/or circumference compared to other states of expansion. As shown in FIG. 8, the expanding collet 210 may have a fully expanded state in which the collet segments 212 are unable to pivot any further. In the fully expanded state, the expanding collet 210 may have the largest diameter and/or circumference compared to other states of expansion.

As the collet segments 212 pivot radially outward about the pivot point 213, the overall diameter and/or circumference of the expanding collet 210 may increase. In some embodiments, the diameter of the expanding collet 210 may increase by approximately 5% of the total diameter (e.g., widest diameter) of the expanding collet 210. In an embodiment, the diameter of the expanding collet 210 may increase by about 5% at maximum rotation of the collets (i.e., when the collet is at the expanded state with the widest diameter).

In some embodiments, the expanding collet 210 may operate similar to a Hoberman sphere, expanding to its desired final shape with a single actuation. In some embodiments, the expanding collet 210 may be configured such that the actuation from the unexpanded state to the fully expanded state occurs solely due to the force of the container 202 acting on the collet segments 212 of the expanding collet 210. In this way, the assembly module 200 may not require a separate driver for actuating or expanding the expanding collet 210 in order to perform the pressing and/or folding actions. Rather, the actuation is integral to the construction of the system 100. As the container 202 and chuck 220 are brought together, the container/chuck axial forces may convert to forces applied in the radial direction and/or to specific forces applied to certain portions of the closure 202. This may advantageously save on power and/or wear of the expanding collet 210 because when the system 100 is utilized without a container 202 in place, the collet 210 will not expand. In some embodiments, the expanding collet 210 may only expand when a container 202 is pressed against the collet segments 212.

In some embodiments, the action of the expanding collet 210 is resisted by the hoop strength of the container 202. In some embodiments, the actuation and/or action of the expanding collet 210 relative to the chuck 220 may be caused by the upward force of the rim 205 of the container 202 against specific portions (e.g., the lips 215) of the expanding collet 210. In some embodiments, the resistance of the expanding collet 210 to this upward force may be tailored to the hoop strength of the container 202. The hoop strength of the container 202 may vary based on the thickness of the sidewall 206, the diameter of the container 202, and/or the height of the container 202, for example.

In some embodiments, the expanding collet 210 may be formed from a non-metal material (e.g., plastic, ceramic, resin). For example, the collet segments 212 may be formed from nylon (e.g., nylon-12) or a combination of nylon and glass. The collet segments 212 may be individually formed using a three-dimensional (3D) printer and then assembled into the expanding collet 210 through engagement with the chuck 220 and/or retainer 211. Forming the expanding collet 210 from a non-metal material may aid in the fusing of the closure 204 to the container 202 in embodiments where induction heating is utilized. In this way, the non-metal materials may not be heated due to the induction heating.

As shown in FIG. 18, in some embodiments, the assembly module 200 may include a membrane 260 arranged around the expanding collet 210 to prevent ingress of debris between the collet segments 212 as the expanding collet 210 expands and small gaps are created between the collet segments 212. For example, the membrane 260 may be formed from silicone, rubber, and/or any other expandable material. In some embodiments, the membrane may be a sleeve that is fitted snugly over the expanding collet 210.

In certain embodiments, the expansion of the expanding collet 210 causes small gaps to be created between the collet segments 212 and when the individual collet segments 212 are pressed against the inner sidewall of the container, ridges may form in the closure 204, between collet segments 212. It should be understood that these ridges in the closure 204 do not pose an issue from a hermeticity standpoint. The ridge is merely a compression mark into the actual paper. However, the membrane 260 may additionally serve to reduce or eliminate ridge lines from forming on the closure 204, as the pressure from the individual collet segments 212 is distributed more uniformly when the membrane 260 is in place.

Collet Segments

As noted, the expanding collet 210 may comprise multiple pivoting collet segments 212, the pivoting action of which provides the expansion of the expanding collet 210. Any number of pivoting collet segments 212 is encompassed within the present disclosure. In some embodiments, the expanding collet 210 comprises between about twenty and forty pivoting collet segments 212. In some embodiments, the expanding collet 210 comprises at least twenty pivoting collet segments 212. In some embodiments, the expanding collet 210 comprises thirty-two pivoting collet segments 212. Other amounts of collet segments 212 are possible (e.g., two, four). A greater number of pivoting collet segments 212 may provide smaller space or gaps between the segments, a benefit that will be explained herein.

Figure 10:
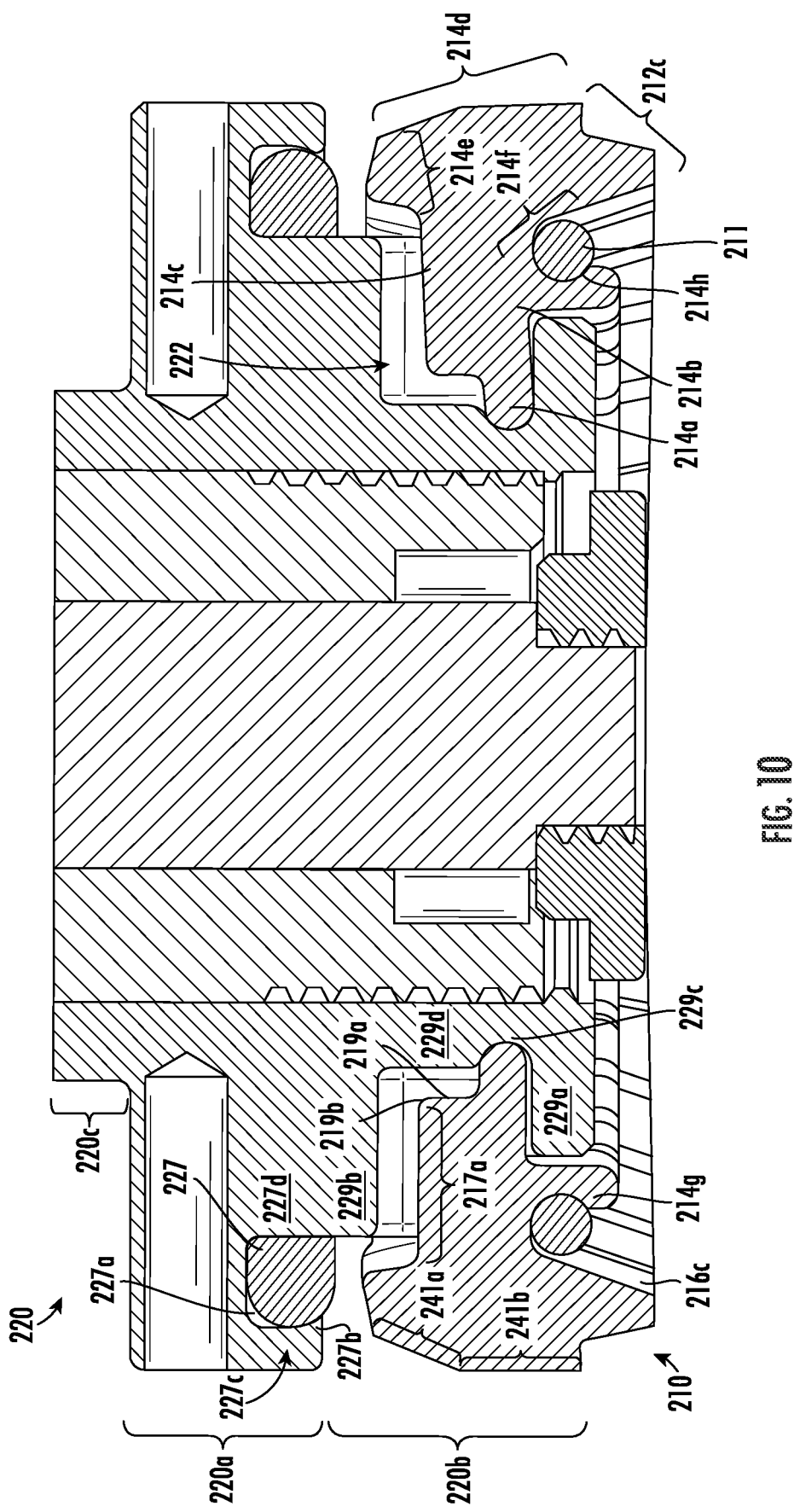
FIG. 10 is a cross-sectional side view of the assembly module of FIGS. 7-9 in a partially expanded state, wherein a front stop portion of the collet segments is just pivoted away from abutting a front stop of the chuck, in accordance with some embodiments of the present disclosure.
Figure 2:
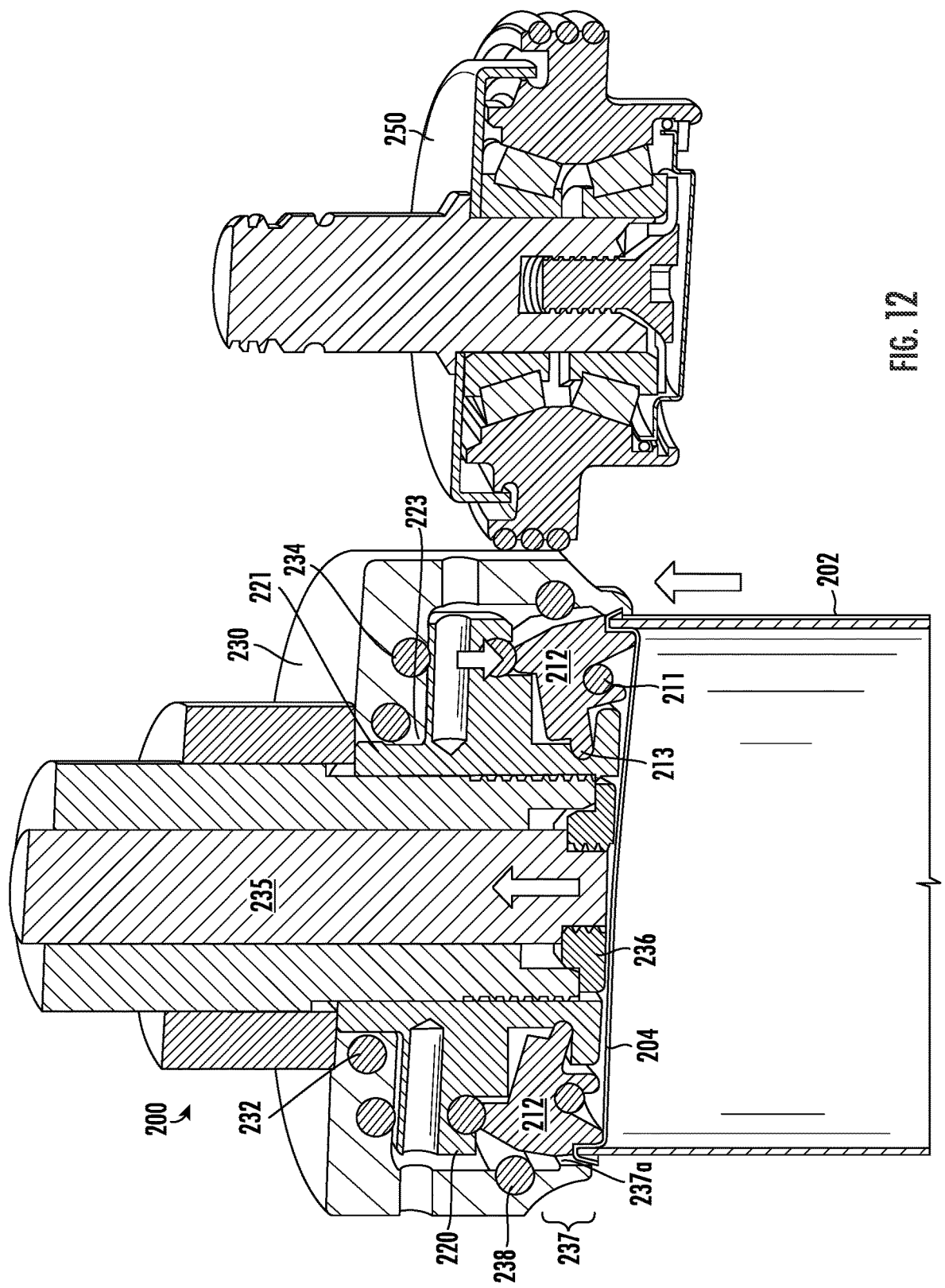

As shown in FIG. 10, a portion of each collet segment 212 may be inserted into a segment alcove 222 formed into the circumferential surface of the lower portion 220b of the chuck 220. The segment alcove 222 may be configured to be larger than the collet segment 212, thereby allowing the collet segment 212 to move within the segment alcove 222. In some embodiments, each collet segment 212 may have an individual segment alcove 222 within the chuck 220. For example, the chuck 220 may include thirty-two segment alcoves 222 formed into its lower portion 220b. In some embodiments, the number of segment alcoves 222 formed into the chuck 220 may be less than the number of collet segments 212 in the expanding collet 210, such that multiple collet segments 212 share one segment alcove 222.

Each segment alcove 222 may include radially-oriented sidewalls separating it from adjacent segment alcoves 222. In this way, the sidewalls of the segment alcoves 222 may form spokes emanating out from the central axis of the chuck 220. Having sidewalls for the segment alcoves 222 may help keep each collet segment 212 from moving circumferentially relative to the chuck 220 as the chuck 220 rotates. In this way, the sidewalls of the segment alcoves 222 may aid in the engagement of the expanding collet 210 with the chuck 220.

In addition to sidewalls, each segment alcove 222 may include a lower ledge or front stop 229a, an upper ledge or back stop 229b, and a rear wall 229d. The rear wall 229d may be located radially inward toward the central axis of the chuck 220. The rear wall 229d may include a curved inlet 229c in which a curved tip of the collet segment 212 engages to for the pivot point 213, around which each collet segment 212 pivots.

Each collet segment 212 comprising the generally cylindrical expanding collet 210 may be generally wedge-shaped with two planar sides 212a and a peripheral surface 212b that wraps around the collet segment 212. The collet segment 212 may be oriented with respect to the chuck 220 so that the planar sides 212a are parallel or substantially parallel to the radial direction of the chuck 220 (and/or the sidewalls of the segment alcoves 222) and so that the peripheral surface 212b is generally perpendicular to the radial direction of the chuck 220, as shown in FIG. 8.

Each collet segment 212 may have distinct portions around its peripheral surface 212b, such as a closure contour surface 212c, a pivoting portion 214a (which may be engaged with the segment alcove 222 of the chuck 220, forming a pivot point 213), a front stop portion 214b (configured to contact a front stop 229a of the chuck 220 in its unexpanded state (unexpanded state shown in FIG. 7), a back stop portion 214c (configured to contact a hard back stop 229b of the chuck 220 in its fully expanded state, as shown in FIG. 8), and/or a side stop portion 214d (configured to contact the side stop 238 of the peripheral sleeve 230 when the roller 250 pushes the peripheral sleeve).

In some embodiments, the collet segments 212 may each include additional portions or elements within each portion, such as a compression outdent 214e (configured to contact and compress an o-ring (e.g., compressible back stop 227) before the back stop portion 214c hits the hard back stop 229b of the chuck 220) and/or a retainer nook 214f (configured to receive retainer 211 therein such that the collet segments 212 are retained in their engagement with the chuck 220).

Closure Contour Surface

Advantageously, the collet segment 212 may be shaped such that certain portions of the peripheral surface 212b (e.g., closure contour surface 212c) that are configured to contact (e.g., press and/or push) the closure 204, are shaped in a manner to mimic or mirror the desired final profile of the closure 204 on the container 202 when assembled. In this way, at least a portion of the closure 204 may be formed into the shape desired for the end-product during fusing when the collet segments 212 are fully pivoted and the expanding collet 210 is in its fully expanded state. For example, the closure contour surface 212c comprises three surfaces in an embodiment (e.g., two substantially horizontal surfaces 215, 216b and one substantially vertical surface 216a therebetween), forming two substantially right angles.

Other profiles of the closure contour surface 212c are possible, such as a horizontal surface (horizontal may be useful as the orientation of the first surface to ensure stability of the container assembly 406 once inverted) followed by a longer angled surface that meets with another horizontal surface. As another example, the profile of the closure contour surface 212c may include a horizontal surface followed by a long arcuate surface, such that the closure forms a dome shape on the underside of the container assembly 406. In yet another example, the profile of the closure contour surface 212c may include a slanted surface followed by another slanted surface meeting at acute or other angles in a repeating pattern, such that the underside of the bottom of the container assembly 406 forms ridges for sitting better on uneven surfaces. In some embodiments, the surfaces within the profile of the closure contour surface 212c may include outward extending ridges and/or other surface textures desired to be incorporated into the form of the closure on the container assembly 406.

As the closure contour surfaces 212c of the collet segments 212 form at least a portion of the desired final profile of the closure 204 in the end-product when the collet segments 212 are fully pivoted and the expanding collet 210 is in its fully expanded state, it may be advantageous to minimize the gaps between the fully pivoted collet segments 212. In order to minimize the gaps, in some embodiments, the expanding collet 210 may include a greater number of collet segments 212 (e.g., at least twenty-four) in order to lessen the gap/interrupted closure profile between adjacent collet segments 212. In this way, minimizing the space between the collet segments 212 may provide a more uniform pressing surface against and/or around the sidewall 206 of the container 202. For example, as shown in FIG. 8, the gap 290 between the thirty-two collet segments 212 may be about 0.025 in. In some embodiments, the gap 290 may range between about 0.01 in. to about 0.25 in.

Lip

Within the closure contour surface 212c, each collet segment 212 may include a lip 215 positioned to be engaged by the rim 205 of the open end 203 of the container 202. Alternatively, in some embodiments, such as where the closure 204 is configured to be assembled completely within the open end 203 of the container 202 (e.g., where no portion of the closure 204 folds over to the rim 205 of the container 202), the lip 215 may be located outside of the closure contour surface 212c, elsewhere on the peripheral surface 212b.

The lip 215 may be configured to receive the upward force of the rim 205 when the container 202 contacts the chuck 220 and collet 210 engaged mechanism. In some embodiments, the lip 215 may be angled slightly such that the substantially horizontal surface of the lip 215 angles slightly toward the central axis of the expanding collet 210. In other words, the more radially-outward end of the substantially horizontal surface of the lip 215 (e.g., the end most distal from the central axis of the expanding collet 210) is situated lower than the radially-inward end of the substantially horizontal surface of the lip 215. In this way, as the rim 205 of the container 202 causes the collet segment 212 to pivot, the substantially horizontal surface of the lip 215 may be tilted to be closer to 0° horizontal. Having the lip 215 oriented at 0° horizontal may aid in the application of the upward force of the flat, horizontal rim 205 onto the lip 215 by spreading the force over the larger surface area of the entire rim 205. In other words, since both the rim 205 and lip 215 are horizontal and flat, the pressure applied by the upward force of the container 202 can be spread across the entire area of engagement between the rim 205 and lip 215. For example, in embodiments in which the surface area of the lip 215 is equal to or greater than the surface area of the rim 205, the upward force may be spread across the entire surface area of the rim 205 where both the lip 215 and rim 205 are oriented at 0° horizontal when engaging. Otherwise, the upward force is more concentrated at the inner or outer corners of the rim 205 if the lip 215 is angled away from 0° horizontal so as to engage more with the inside or outside of the sidewall 206 of the container 202. Additionally, having the lip 215 initially angled slightly such that the outer portion of the lip 215 points slightly downwardly may ensure that any portions of the closure 204 (e.g., a peripheral skirt 209) extending beyond the rim of the container are forced downwardly over and/or around the rim to the exterior wall of the container.

The lips 215 of the collet segments 212 may form the most radially outward portion of the expanding collet 210, such that when the upward force of the rim 205 is applied, the distance of each lip 215 from the respective pivot point 213 of the collet segments 212 allows the upward force to apply a maximum torque on each collet segment 212. Applying a force (e.g., constant upward force) against the lip 215 will provide the necessary torque on the collet segment 212 to cause pivoting at the pivot point 213. In an embodiment, the lip 215 is located distally from the pivot point 213. Advantageously, the structural configuration of the collet segment 212 may optimized for converting the upward force of the container 202 into the pressing forces required for assembling and/or folding the closure 204 into/around the container 202.

In some embodiments, the length of the substantially horizontal surface of the lip 215 of the collet segment 212 may be substantially similar to and/or slightly greater than the thickness of the sidewall 206 of the container 202. The expanding collet 210 may be configured such that outer circumference of the lips 215 is substantially equivalent to the circumference of the container 202. In some embodiments, the inner diameter of the lips 215 may be less than the diameter of the interior surface 207 of the container 202, and the outer diameter of the lips 215 may be greater than the diameter of the exterior surface 208 of the container 202. Due to the axial alignment of the container 202 with the expanding collet 210, the engagement and upward force of the rim 205 of the container 202 with and on the lips 215 of the expanding collet 210 causes the collet segments 212 to all pivot radially outward simultaneously.

Adjacent the substantially horizontal surface of the lip 215 toward the central axis of the expanding collet 210, each collet segment 212 may include a radially outward-facing substantially vertical surface 216a as part of the closure contour surface 212c. The radially outward-facing substantially vertical surface 216a may be part of an angled tip 216 of the collet segment 212.

In some embodiments, each collet segment 212 may include an angled tip 216. The angled tip 216 may be positioned radially inward from and adjacent to the lip 215.

In some embodiments, before the collet segments 212 are pivoted and/or when the expanding collet 210 is in its unexpanded state, the radially outward-facing substantially vertical surface 216a of the angled tip 216 may be angled away from the interior surface 207 of the container 202 and radially inward toward the center of the expanding collet 210. In other words, the radially outward-facing substantially vertical surface 216a of the angled tip 216 may be angled such that the diameter of top portions of the radially outward-facing substantially vertical surfaces 216a of the angled tips 216 proximate to the lips 215 is greater than the diameter of bottom portions of the radially outward-facing substantially vertical surfaces 216a of the angled tips 216 distal from the lips 215. In this way, the combined radially outward-facing substantially vertical surfaces 216a of all the collet segments 212 may form a transverse conical section when the expanding collet 210 is in its unexpanded state.

Figure 3:
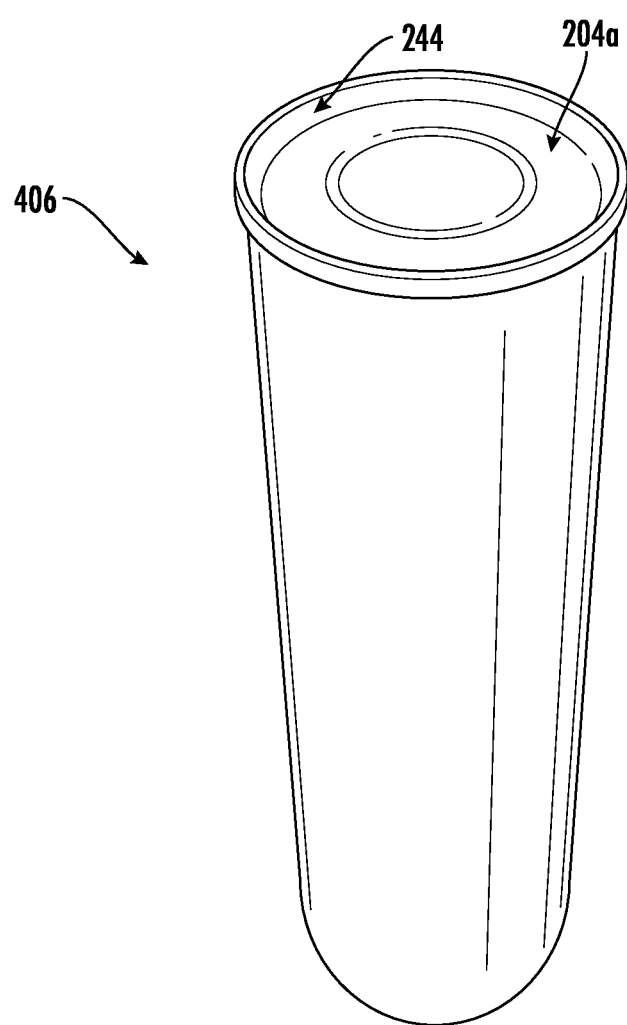
FIG. 3 is a bottom perspective image of an example container assembly formed from the application of a closure to a container, in accordance with some embodiments of the present disclosure.

In some embodiments, the radially outward-facing substantially vertical surfaces 216a of the angled tips 216 may be configured to press the inner chuck wall 242 of the closure 204 against the interior surface 207 of the container 202 as the collet segments 212 pivot radially outward due to the torque applied by the upward force of the rim 205 of the container 202 on the lip 215. As the collet segments 212 are pivoted, the radially outward-facing substantially vertical surfaces 216a of the angled tips 216 may rotate to become increasingly closer to vertical (e.g., approaching 90°) until the radially outward-facing substantially vertical surfaces 216a become parallel to the interior surface 207 of the container 202. In this way, as the collet segments 212 are pivoted, the radially outward-facing substantially vertical surfaces 216a of the angled tips 216 pivot outward toward the interior surface 207 of the container 202, thereby pushing the inner chuck wall 242 of the closure 204 against the interior surface 207 of the container 202, forming a countersink portion 244 (as shown in FIGS. 2B, 2C, and 3).

The actuation of the expanding collet 210 may convert the pre-formed chuck wall 242 of the closure 204 into a countersink portion 244 through a pushing, stretching, and/or pressing series of actions.

The length of the radially outward-facing substantially vertical surface 216a of the angled tip 216 may be equivalent to or substantially equivalent to the predetermined countersink depth 246 of the countersink portion 244 of the closure 204 within the open end 203 of the container 202 when assembled.

The engagement of the collet segments 212 of the expanding collet 210 with the chuck 220 allows the upward force of the container 202 to result in the inner chuck wall 242 of the closure 204 being pressed against the interior surface 207 of the container 202. This pressing action may aid in creating a seal between the closure 204 and the container 202 during the fusing process.

The collet segments 212 may be configured such that when the diameter of the expanding collet 210 is at its maximum diameter in the fully expanded state (e.g., as shown in FIG. 8), the exterior diameter of the radially outward-facing substantially vertical surfaces 216a and/or angled tips 216 of the collet segments 212 is substantially equivalent to the inner diameter of the container 202 (e.g., the diameter measured across the interior surface 207 of the container 202). For example, the inner diameter of the container 202 and the widest allowable diameter of the angled tips 216 may about 2.88 in.

The collet segments 212 may be configured such that when the diameter of the expanding collet 210 is at its maximum diameter in the fully expanded state (e.g., as shown in FIG. 8), the exterior diameter of the radially outward-facing substantially vertical surfaces 216a and/or angled tips 216 of the collet segments 212 is slightly larger than the inner diameter of the container 202 (e.g., the diameter measured across the interior surface 207 of the container 202). This ensures intimate contact between the collet segments 212, the container 202, and the closure 204, in preparation for sealing. In this embodiment, some minor stretching/expansion of the container diameter may occur, within the elastic limits of its comprised materials.

Further radially inward along the closure contour surface 212c, adjacent the radially outward-facing substantially vertical surface 216a, the angled tip 216 may include a substantially horizontal generally downward-facing end surface 216b located at the portion of the angled tip 216 that is farthest vertically from the lip 215. The end surface 216b may be configured to contact the closure 204 and push and/or tamp it down into the corner created by the bottom and countersink portion 244 of the closure 204.

The combination of the substantially horizontal surface of the lip 215 with the radially outward-facing substantially vertical surface 216a and end surface 216b of the angled tip 216 may form the closure contour surface 212c of a collet segment 212.

Advantageously, the closure contour surface 212c may substantially outline the desired bottom/end profile of the end-product or container assembly 406 with the closure 204 and container 202 assembled together. When taken all together in the expanded state of the expanding collet 210, the contoured surfaces (e.g., closure contour surface portion 212c) of the collet segments 212 form the desired shape of the closure 204 inserted into the container 202. For example, in some embodiments, the closure contour surface 212c may include specific radii of curvature between the various configured surfaces that are angled and/or curved as desired. In some embodiments, the desired bottom/end profile of the container assembly 406 may not be uniform along the circumference of the closure 204, and thus, the collet segments 212 may vary from one another to form specific indents and outdents (e.g., logos, notches, stabilizing shapes) in the closure 204.

In some embodiments, the angled tip 216 may include an inward-facing surface 216c located radially inward from and adjacent to the substantially horizontal generally downward-facing end surface 216b of the angled tip 216. In some embodiments, the inward-facing surface 216c may be nearly vertical when the expanding collet 210 is in its unexpanded state, as shown in FIG. 7. In the fully expanded state of the expanding collet 210 (e.g., as shown in FIG. 8), the inward-facing surface 216c may form nearly a 45° angle with the axial and transverse planes.

Moving radially inward and axially upward along the collet segment 212, the inward-facing surface 216c may transition to a retainer nook 214f. The retainer nook 214f may be a generally semi-circular cylindrical recess or downward-facing U-shaped (as viewed in cross-section) portion of the peripheral surface 212b of the collet segment 212. The retainer nook 214f may be configured such that the retainer 211 (e.g., an o-ring) may be inserted therein.

The expanding collet 210 may, in some embodiments, include a retainer 211 engaged with the collet segments 212 within the retainer nook 214f. For example, the retainer 211 may be an o-ring (e.g., oil-resistant Buna-N o-ring with a 3/16 fractional width, 70 A duro, and inner diameter of about 1.6 in.). The retainer 211 may be configured to urge collet segments 212 to pivot radially inward such that the expanding collet 210 is in its unexpanded state with a minimum circumference and/or diameter (e.g., as seen in FIG. 7). Thus, without any upward force of a container 202 applied to the expanding collet 210 to overcome the resisting force of the retainer 211, the retainer 211 may maintain the expandable collet 210 in its unexpanded state.

In some embodiments, the retainer 211 may be expandable and comprise a material which has elastic or resistive properties, such as rubber. The resistance of the expandable retainer 211 may be tailored to the hoop strength and/or upward force of the container 202. The resistance or urging force of the expandable retainer 211 through a predetermined expansion may be less than the hoop strength of the container 202.

In some embodiments, the assembly module 200 may be configured such that the expandable retainer 211 is expanded by the pivoting action of the collet segments 212 during a predetermined pivot angle range, thus increasing the resisting force of the expandable retainer 211. The collet segments 212 may be shaped such that the resisting force of the expanded retainer 211 due to its engagement with the expanding collet 210 in the retainer nooks 214f causes the pressing force of the radially outward-facing substantially vertical surface 216a on the chuck wall 242 of the closure 204 against the interior surface 207 of the open end 203 of the container 202 to be decreased. By decreasing the pressing force of the collet segment 212 and closure 204 against the interior surface 207 of the container 202 while maintaining the upward force of the rim 205 of the container 202 acting on the peripheral skirt 209 of the closure 204 and the lips 215 of the collet segments 212, the full insertion of the closure 204 into the open end 203 of the container 202 may be encouraged before allowing the chuck wall 242 of the closure 204 to be fully pinched against the interior surface 207 of the container 202.

In some embodiments, the assembly module 200 may be configured such that the engagement of the retainer 211 with the expanding collet 210 at the retainer nooks 214f does not cause the retainer 211 to elastically expand as the collet segments 212 pivot due to the shape of the collet segments 212 and/or retainer nook 214f. In such embodiments, the retainer nook 214f may be eccentrically shaped and/or act as a cam such that the retainer 211 maintains the same circumference and/or diameter as the collet segment 212 is pivoted about the pivot point 213. In such embodiments, the collet segments 212 may be configured to pivot back to their limit in the unexpanded state at the minimum circumference and/or diameter of the expanding collet 210 (e.g., as seen in FIG. 7) due to gravity and/or other timed actuation of the system.

In some embodiments, in the unexpanded state of the expanding collet 210, the retainer nook 214f may be located in line (in the radial direction) with the front stop 229a of the chuck 220. A radially inward wall 214h of the retainer nook 214f may extend downward opposite the inward-facing surface 216c of the angled tip 216 (e.g., as shown in FIG. 10). The retainer nook 214f may include a projecting surface 214g on its radially inward wall 214h that projects toward the inward-facing surface 216c of the angled tip 216. The projecting surface 214g of the radially inward wall 214h of the retainer nook 214f may provide resistance such that the retainer 211 will not be unintentionally displaced from within the expanding collet 210. In some embodiments, the projecting surface 214g of the radially inward wall 214h may comprise a ridge, bump, retention arm, extension, projection, or the like.

Front Stop Portion

Further radially inward from and adjacent to the retainer nook 214f, the peripheral surface 212b of the collet segment 212 may include a front stop portion 214b. The front stop portion 214b may contact the vertical (or substantially vertical) surface and/or the horizontal (or substantially horizontal) surface of the front stop 229a of the chuck 220, when the expanding collet 210 is in its unexpanded state (e.g., as shown in FIG. 7). As shown in FIG. 10, the front stop portion 214b may be shaped as a right angle (or a substantially right angle), and the front stop 229a may be shaped like a disc (optionally with a squared top corner) around the base of the chuck 220 forming the lower ledges of the segment alcoves 222.

At rest in the unexpanded state, the collet segments 212 of the expanding collet 210 may pivot all the way to their limit, which may be provided by front stop portions 214b of the collet segments 212 contacting the front stops 229a of the chuck 220 (e.g., the lower ledges of the segment alcoves 222). In the unexpanded state, the collet segments 212 may be at a minimum pivot angle (e.g., 0°).

In some embodiments, the substantially inward-facing surface of the front stop portion 214b may be generally vertical. In some embodiments, the inward-facing surface of the front stop portion 214b may contact the vertical (or substantially vertical) surface of the front stop 229a of the segment alcove 222, when the expanding collet 210 is in its unexpanded state.

In some embodiments, the substantially downward-facing surface of the front stop portion 214b may be generally horizontal. In some embodiments, the downward-facing surface of the front stop portion 214b may contact the horizontal (or substantially horizontal) surface of the front stop 229a of the segment alcove 222, when the expanding collet 210 is in its unexpanded state.

Pivoting Portion

The expanding collet segments 212 may each be configured to pivot about a pivot point 213 such that the expanding collet 210 changes diameter as the collet segments 212 pivot between states of expansion. As shown in FIG. 11, in some embodiments, the pivot point 213 may be centered within the most radially inward portion of the collet segment 212 and may be adjacent the chuck 220 (e.g., at the rear walls 229d of the segment alcoves 222). In this way, the pivot point 213 may be located at the radially innermost portion of the expanding collet 210, where it engages with the chuck 220 (e.g., at the curved inlet 229c).

In some embodiments, as shown in FIG. 10, each collet segment 212 may have a curved tip (e.g., pivoting portion 214a) formed at its most radially inward portion. In some embodiments, the terminal end of the pivoting portion 214a may have a circular radius of curvature. In some embodiments, the terminal end of the pivoting portion 214a may have a semi-circular cylindrical shape. The curved tip (e.g., pivoting portion 214a) may be inserted into a cooperating curved inlet 229c of the chuck 220 having substantially the same radius of curvature. In this way, the interface between the curved tip (e.g., pivoting portion 214a) and cooperating curved inlet 229c creates a pivot point 213 for each collet segment 212.

Back Stop Portion

Further radially outward from and adjacent to the pivoting portion 214a, the collet segment 212 may include a collet back stop portion 214c. The collet back stop portion 214c may be configured to abut the chuck back stop 229b (e.g., upper ledge of the segment alcove 222) of the chuck 220 when the expanding collet 210 is in its fully expanded state (e.g., as shown in FIG. 8). As shown in FIG. 13, the collet back stop portion 214c comprise a substantially vertical, substantially horizontal, or obtuse angled (nearly a right angle) portion that contacts the vertical surface, horizontal surface, and/or corner of the chuck back stop 229b of the chuck 220 when the collet 212 is expanded. For example, in an embodiment, a corner of the collet back stop portion 214c may contact a corner of the chuck back stop 229b, in an aligned manner, to stop any further expansion of the collet 212.

In some embodiments, a substantially inward-facing surface 219a of the back stop portion 214c may be nearly vertical (FIG. 10). In some embodiments, the inward-facing surface 219a of the back stop portion 214c may contact the vertical (or substantially vertical) surface or rear wall 229d of the back stop 229b of the chuck 220, when the expanding collet 210 is in its fully expanded state. However, this contact is not necessary.

In some embodiments, the substantially upward-facing surface of the back stop portion 214c may be generally horizontal. In some embodiments, the upward-facing surface of the back stop portion 214c may at least partially contact the horizontal (or substantially horizontal) surface (e.g., upper ledge of the segment alcove 222) of the back stop 229b of the chuck 220, when the expanding collet 210 is in its fully expanded state.

In the fully expanded state, the collet segments 212 of the expanding collet 210 may pivot all the way to their limit, which may be provided by back stop portions 214c of the collet segments 212 contacting the back stops 229b of the chuck 220 (e.g., the upper ledges of the segment alcoves 222). In the fully expanded state, the collet segments 212 may be at a maximum pivot angle (e.g., about 45°).

In this way, the widest allowable diameter of the angled tips 216 (e.g., the expanding collet 210) may be controlled by the shape of the collet segments 212 and the engagement of the collet segments 212 of the expanding collet 210 with the chuck 220. For example, the back stop 229b of the chuck 220 may prevent the collet segment 212 from pivoting further after the maximum pivot angle. The chuck 220, and thus the back stop 229b, may comprise a rigid, non-compressible material.

In some embodiments, between the substantially upward-facing surface 217a of the back stop portion 214c and the pivoting portion 214a, the peripheral surface 212b of the collet segment 212 may include a substantially vertical surface 219a as part of the back stop portion 214c. The substantially upward-facing surface 217a and substantially vertical surface 219a may form nearly a right angle. In some embodiments, the corner 219b formed between the substantially vertical surface 219a and substantially upward-facing surface 219a of the back stop portion 214c may be configured to contact the rear wall 229d of the segment alcove 222 of the chuck 220, when the expanding collet 210 is in its fully expanded state. This contact may be in addition or alternatively to the substantially inward-facing surface and/or substantially upward-facing surface of the back stop portion 214c contacting the vertical surface, horizontal surface, and/or corner of the back stop 229b of the chuck 220 when the expanding collet 210 is in its fully expanded state (e.g., when the collet segments 212 have been pivoted to their maximum pivot angle).

Further radially outward from and adjacent to the substantially inward-facing surface of the back stop portion 214c, the peripheral surface 212b of the collet segment 212 may include a substantially upward-facing surface. The substantially upward-facing surface may form an approximately right angle with the substantially inward-facing surface of the back stop portion 214c. The substantially inward-facing surface of the back stop portion 214c and the substantially upward-facing surface may together form a compression outdent 214e.

In some embodiments, the compression outdent 214e may be configured to abut a compressible back stop 227 in the chuck 220 when the expanding collet 210 is in its partially expanded state (e.g., as shown in FIG. 12). The assembly module 200 may include a compressible back stop 227 positioned between the upper portion 220a of the chuck 220 and the expanding collet 210. More particularly, the compressible back stop 227 may be disposed or fitted within a back stop recess 227a. The back stop recess 227a may be formed in the underside of a wide, disc-shaped projection in the upper portion 220a of the chuck 220. In some embodiments, the back stop recess 227a may comprise a semi-circular cylindrical recess or downwardly facing U-shape.

In some embodiments, the compressible back stop 227 may have a retention bead 227b formed in the radially inward-facing surface 227c of the back stop recess 227a. The radially inward-facing surface 227c may have a generally vertical radial cross-section (e.g., circular when viewed from a transverse cross-section), whereas the retention bead 227b may form a quadrant of a circle when viewed as a radial cross-section (e.g., as shown in FIG. 10). The retention bead 227b may project from the radially inward-facing surface 227c of the back stop recess 227a toward the radially outward-facing surface 227d of the back stop recess 227a (e.g., toward the central axis of the chuck 220). Similar to the radially inward-facing surface 227c, the radially outward-facing surface 227d of the back stop recess 227a may have a generally vertical radial cross-section (e.g., circular when viewed from a transverse cross-section). The radially outward-facing surface 227d may be an extension of the substantially vertical radially outward-facing surface of the upper ledge or back stop 229b of the chuck 220. The retention bead 227b may be configured to hold the compressible back stop 227 in place within the back stop recess 227a. In some embodiments, the retention bead 227b of the back stop recess 227a may comprise a ridge, bump, retention arm, extension, projection, or the like.

When the expanding collet 210 is in its unexpanded state (e.g., as shown in FIG. 7), the compressible back stop 227 may be positioned vertically above the collective compression outdents 214e of the expanding collet 210, such that there is a space or distance between the compressible back stop 227 and the collective compression outdents 214e of the expanding collet 210. In this unexpanded state, the compressible back stop 227 may be uncompressed.

When the expanding collet 210 is in its partially expanded state (e.g., as shown in FIG. 12), the compressible back stop 227 may be positioned adjacent the collective compression outdents 214e of the expanding collet 210. In some embodiments, the compression outdents 214e of the expanding collet 210 rotate upwardly through the space or distance between the compressible back stop 227 and the collective compression outdents 214e, toward the compressible back stop 227, until contacting the compressible back stop 227. In this partially expanded state (e.g., as shown in FIG. 12), the compressible back stop 227 may be uncompressed or at least partially compressed.

The compressible back stop 227 may be configured, in some embodiments, to resist the pivoting of the collet segments 212 after they have pivoted for a predetermined pivot angle (or predetermined upward distance of the container 202), such that the pressing force of the angled tip 216 on the chuck wall 242 of the closure 204 against the interior surface 207 of the open end 203 of the container 202 is decreased when the compression outdents 214e compress the compressible back stop 227. By decreasing the pressing force of the closure 204 against the interior surface 207 of the container 202 while maintaining the upward force of the rim 205 of the container 202 against the closure 204 and the lips 215 of the collet segments 212, the full insertion of the closure 204 into the open end 203 of the container 202 may be encouraged before allowing the inner chuck wall 242 of the closure 204 to be fully pinched against the interior surface 207 of the container 202.

The pressing force of the closure 204 against the interior surface 207 may provide better sealing of the closure 204 to the container 202. In some embodiments, the compressible back stop 227 may prevent the angled tip 216 of the collet segments 212 from exerting so much pressure on the container interior surface 207 that the interior surface 207 becomes distorted. In an embodiment, the pressing force of the closure 204 against the interior surface 207 may be between about four hundred and about five hundred pounds of pressure. In a particularly, embodiment, the pressing force may be about four hundred and seventy-five pounds. In an embodiment, the pressing force of the container 202 into the collet 210 or the collet 210 into the rim 205 of the container 202 may be about twenty pounds of pressure, which may translate into a pressing force of the closure 204 against the interior surface 207 of about four hundred and seventy-five pounds total (e.g., approximately 1000 PSI). In an embodiment, the invention provides a translated pressure of about twenty-three to twenty-four times that which is exerted. In an embodiment, each of the collet segments 212 may press against the container 204 with about fourteen to fifteen pounds of pressure.

In some embodiments, the compressible back stop 227 may be an o-ring made from foam, rubber, silicone, and/or another compressible material. For example, the compressible back stop 227 may be an oil-resistant Buna-N o-ring with a 3/16 fractional width, 70 A duro, and inner diameter of about 1.6 in. The resistance or compressibility of the compressible back stop 227 through a predetermined compression or compressing pivot angle may be tailored to the hoop strength and/or lifting force of the container 202. The resistance of the compressible back stop 227 through the predetermined compression or compressing pivot angle may be kept lower than the hoop strength of the container 202, such that the upward force of the rim 205 on the lips 215 of the collet segments 212 causes the collet segments 212 to pivot and compress the compressible back stop 227 without damaging the sidewall 206 of the container 202.

As shown in FIGS. 11-13, as the rim 205 of the container 202 engages the lips 215 of the collet segments 212, the upward force of the rim 205 may cause the collet segments 212 to pivot the predetermined pivot angle before the substantially upward-facing surface of the compression outdent 214e contacts the compressible back stop 227 and then to pivot the compressing pivot angle while compressing the compressible back stop 227 before the back stop portion 214c contacts the hard back stop 229b at the predetermined maximum pivot angle.

In some embodiments where the retainer 211 reduces the pressing force of the radially outward-facing substantially vertical surface 216a through the predetermined pivot angle range, the assembly module 200 may not include a compressible back stop 227 and/or a compression outdent 214e. Alternatively, the assembly module 200 may have a compression outdent 214e with a different configuration.

While the collet segments 212, the chuck 220, and the compressible back stop 227 have been described with specific reference to the figures, it should be understood that any shape and/or geometry which will accomplish the features set forth herein is encompassed by the present disclosure.

Side Stop Portion

In some embodiments, as shown in FIG. 10, the side stop portion 214d may include two surfaces angled in different radially-outward directions—an upper surface 241a and a lower surface 241b. In the unexpanded state of the expanding collet 210 (e.g., with the collet segments 212 unpivoted and abutting the front stop 229a of the chuck 220), the upper surface 241a of the side stop portion 214d may be positioned to be contacted by the side stop 238 of the peripheral sleeve 230. In the fully expanded state of the expanding collet 210 (e.g., with the collet segments 212 pivoted against the hard back stop 229b of the chuck 220), the lower surface 241b of the side stop portion 214d may be positioned to be contacted by the side stop 238 of the peripheral sleeve 230.

As shown in FIG. 7, in some embodiments, the side stop portion 214d and/or one or both planar sides 212a of each collet segment 212 may include a nesting lug 218a and a cooperating nesting depression 218b. The nesting lugs 218a and depressions 218b may aid in assembling the individual collet segments 212 together in the proper orientation/alignment, particularly while the retainer 211 is positioned within the retainer nooks 214f of the collet segments 212 and/or while the pivoting portions 214a of the collet segments 212 are inserted into the cooperating curved inlets 229c of the chuck 220. In some embodiments, the nesting lugs 218a and depressions 218b may aid in the substantially uniform expansion of the expanding collet 210 in case of a defective rim 205 on a container 202—such as one that is uneven, torn, bent or otherwise does not engage all the lips 215 of the expanding collet 210 simultaneously.

In some embodiments, as shown in FIG. 11, the assembly module 200 may include an assembly rod 235. In some embodiments, the assembly rod 235 may position and initially insert the closure 204 into the container 202 as the container 202 is lifted toward the chuck 220 and expanding collet 210 (or as the chuck 220 and collet 210 are moved toward the container 202). The assembly rod 235 may be cylindrical and may be positioned concentrically within the hollow central portion of the chuck 220. The assembly rod 235 may be configured to move axially to ensure proper positioning of the closure 204 relative to the container 202. Specifically, the assembly rod 235 may be configured to push a central portion 240 of the closure 204 into the open end 203 of the container 202 as the container 202 is lifted toward the chuck 220. The assembly rod 235 may be integral with and/or further include a centering disc 236. The centering disc 236 may be generally cylindrical and may be wider than the assembly rod 235. The centering disc 236 may be configured to initially contact the central portion 240 of the closure 204 as the closure 204 is pushed into the open end 203 of the container 202.

In some embodiments, the assembly rod 235 may contain helical screws on its outermost surface which may engage with corresponding helical screws on the interior surface of the chuck 220. Likewise, in some embodiments, the centering disc 236 may comprise helical screws on its innermost surface which are configured to correspond to helical screws on the outer surface of the assembly rod 235. In some embodiments, the centering disc 236 may be axially movable separately from the assembly rod. In other words, the assembly rod 235 may have a maximum extension length and the centering disc 236 may extend axially further than the assembly rod's 235 maximum extension length.

In some embodiments, the assembly rod 235 and the centering disc 236 may aid in removal of the assembly module 200 from the closure 204. That is, after the assembly is complete, the assembly rod 235 and/or centering disc 236 may remain in place after the chuck 220 is moved away from the container assembly 406 and/or the container assembly 406 is moved away from the chuck 220. The assembly rod 235 and/or centering disc 236 may retain the positioning of the closure 204 and then, lastly, release from the surface of the closure 204.

Peripheral Sleeve

As shown in FIG. 12 (and various other figures), the assembly module 200 may include a peripheral sleeve 230 surrounding the chuck 220 and the expanding collet 210. The peripheral sleeve 230 may be configured to fold a peripheral skirt 209 of the closure 204 over the rim 205 and around the exterior surface 208 of the sidewall 206 of the container 202. FIGS. 50-51 illustrate an alternate configuration for the peripheral sleeve 230, which operates in the same manner described herein.

The peripheral sleeve 230 may be generally cylindrical in nature and may vertically extend from at least the top of the chuck 220 to approximately the base of the chuck 220 and expanding collet 210. In the embodiment shown in FIGS. 50-51, the peripheral sleeve 230 may comprise a neck portion 230a which is narrower in diameter than the body portion 230b. The neck portion 230a may be integral with and/or disposed above the body portion 230b. A shoulder portion 230c may connect the neck portion 230a and the body portion 230b.

When the expanding collet 210 is in its retracted/resting unexpanded state (e.g., as shown in in FIGS. 7, 10-11, and 15), a brim 237 of the peripheral sleeve 230 may be disposed adjacent radially outward-facing side stop portions 214d of the collet segments 212. When the expanding collet 210 is in its partially expanded state (e.g., as shown in FIG. 12), the brim 237 of the peripheral sleeve 230 may be disposed vertically below the lips 215 of the collet segments 212. In these embodiments, the peripheral sleeve 230 may not move vertically. Instead, the lips 215 of the collet segments 212 are pivoted upward by the rim 205 of the container 202 and change position. In this way, as the peripheral skirt 209 of the closure 204 moves upward with the lips 215 of the expanding collet 210 and the rim 205 of the container 202, the peripheral skirt 209 is folded over the rim 205 of the container 202 and pushed or squeezed between the peripheral sleeve 230 and the exterior surface 208 of the sidewall 206 of the container 202.

The inner brim surface 237a of the peripheral sleeve 230 may be disposed on the interior side of the brim 237 and configured to contact the folded peripheral skirt 209 of the closure 204. The inner brim surface 237a may include a knurled or gripping surface texture to grab hold of the peripheral skirt 209 of the closure 204 and minimize any slippage that could be caused by the rotating parts.

In another embodiment, the inner brim surface 237a need not be knurled or have a gripping texture. In this embodiment, the skirt 209, when folded down and forced into a smaller circumference, may tend to buckle and fold/wrinkle as it occupies a smaller area. In still another embodiment, a knurled inner brim surface 237a may force these wrinkles into a pattern with repeatable frequency and amplitude and may be more likely to appear intentionally manufactured.

In some embodiments, the peripheral sleeve 230 may be formed from a non-metal material (e.g., plastic, resin). For example, the peripheral sleeve 230 may be formed from nylon (e.g., nylon-12) or a combination of nylon and glass. Forming the peripheral sleeve 230 from a non-metal material may aid in the fusing of the closure 204 to the container 202 in embodiments where induction heating is utilized.

In some embodiments, the inner diameter of the peripheral sleeve 230 may be larger than the outer diameter of the container 202.

In some embodiments, the assembly module 200 may include one or more o-rings (e.g., o-ring 232, 234, 238) positioned between the chuck 220 and the peripheral sleeve 230. In some embodiments, the o-rings (e.g., o-ring 232, 234, 238) may be made from foam, rubber, silicone, and/or another compressible material. For example, each o-ring (e.g., o-ring 232, 234, 238) may be an oil-resistant Buna-N o-ring with a 3/16 fractional width, 70 A duro, and inner diameter of about 1.6 in. In some embodiments (see FIGS. 50-51), many of the o-rings may be optional. For example, ring 211 may be provided while omitting the other o-rings.

The peripheral sleeve 230 may be movable rotationally and laterally along the o-rings 232, 234 relative to the chuck 220. The peripheral sleeve 230 may be configured to remain stationary in the axial direction relative to the chuck 220. For clarity, while the peripheral sleeve 230 may be axially stationary, the peripheral sleeve 230 may continuously spin about its axis and/or revolve around the turret center of the machine.

Figure 38:
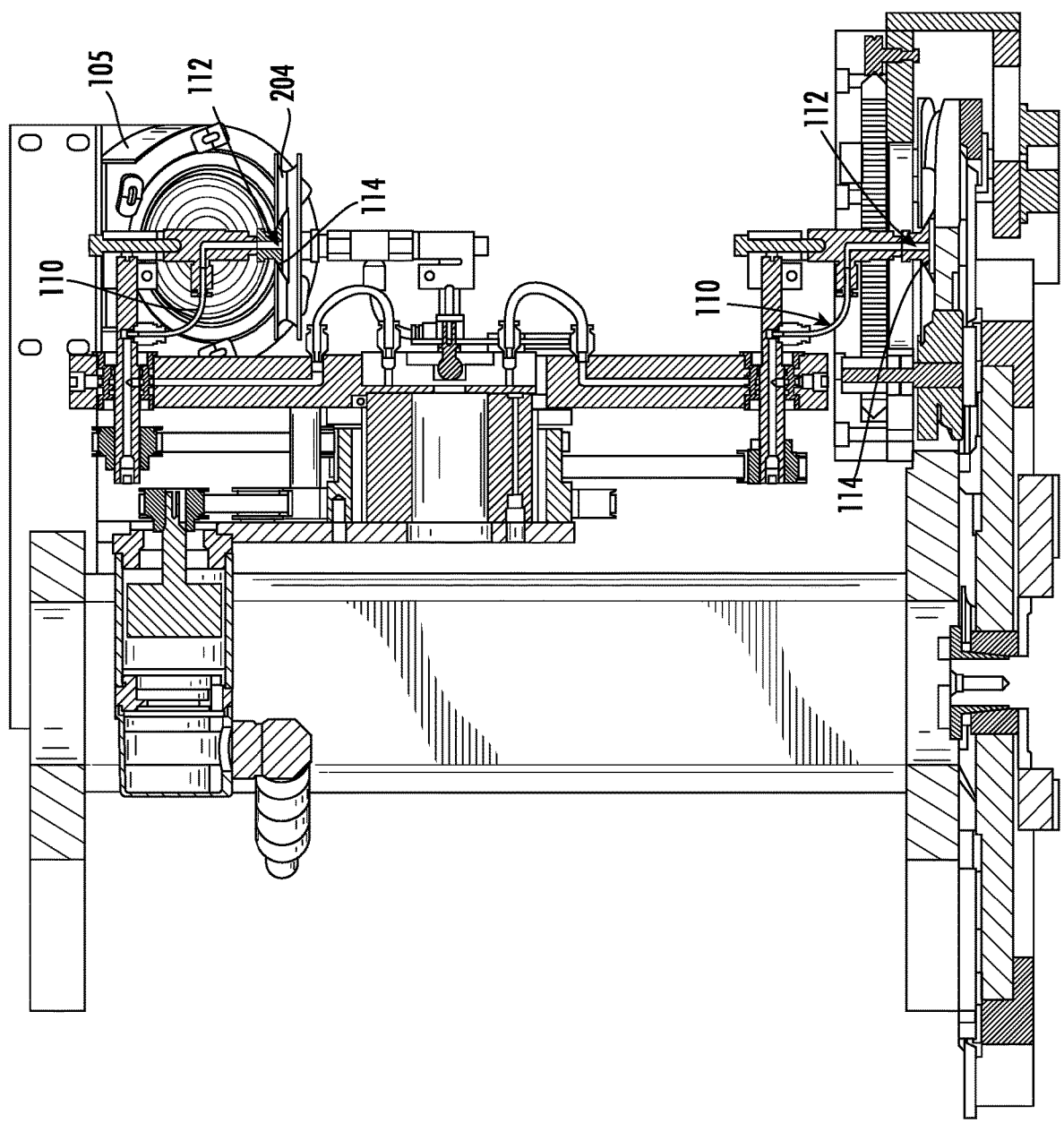
Figure 39:
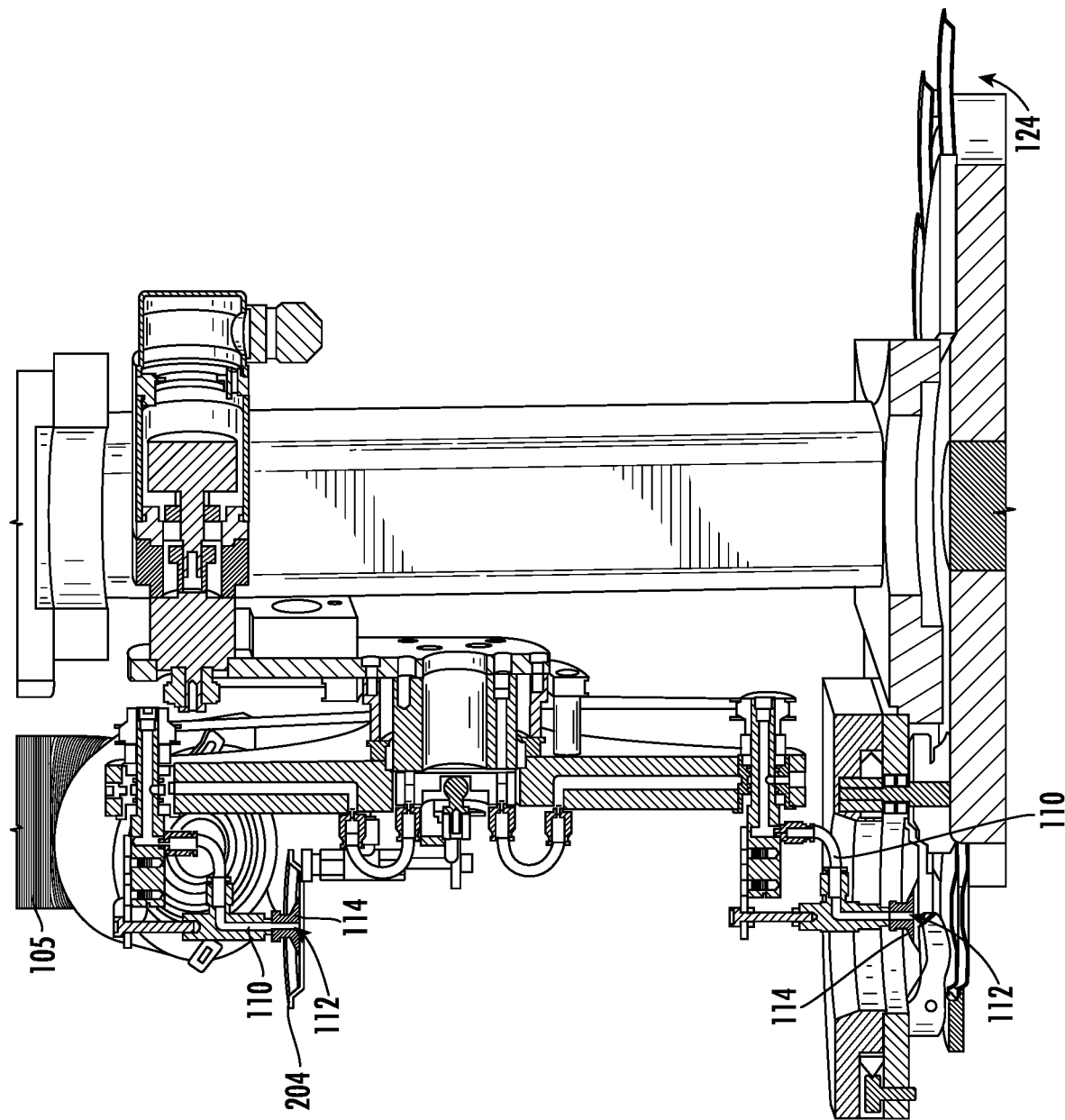

In an embodiment shown in FIGS. 37-38, the peripheral sleeve 230 may comprise a plurality of teeth 231 on its inner axial surface. In an embodiment, these teeth 231 may replace one or more o-rings of the system. For example, o-ring 232 could be replaced by the teeth 231. The teeth 231 may extend radially inwardly from the inner surface 233 of the sleeve 230, in an embodiment. In an embodiment, the teeth 231 need not extend the entire vertical distance of the sleeve 230. The teeth 231 may be positioned at a discrete circumferential location within the inner surface of the sleeve 230. For example, contrary to FIG. 37, the teeth 231 may not extend to the top surface 239 of the sleeve and may be positioned vertically lower than the top surface 239.

The teeth 231 may be oriented axially inwardly and may be straight, angularly positioned and/or may comprise a non-zero radius of curvature. In an embodiment, the teeth 231 are disposed in a spiral pattern. A plurality of teeth 231 may be provided. In some embodiments, each of the teeth 231 has the same angle or radius of curvature. In some embodiments, some of the teeth 231 may have different or alternating angles or radii of curvature.

In an embodiment, the teeth 231 may engage the chuck 220. The teeth 231 may extend from the sleeve 230 such that they are in contact with an outer surface 223 of a neck 221 of the chuck 220 (see FIG. 12). In this embodiment, the neck 221 of the chuck 220 may be more narrow than the remainder of (or portions of) the chuck 220. The tips of the teeth 231 may contact the neck 221 of the chuck 220 when the sleeve 230 is in a neutral position (FIG. 12). This teeth 231/neck 221 contact may keep the sleeve 230 in the neutral position unless outside forces are applied. This contact between the teeth 231 and neck 221 may provide the necessary spacing between the sleeve 230 and the collet segments 212 such that the closure 204 and container rim may be inserted therebetween. Without the teeth 231 (or a similar mechanism, which is also encompassed herein), the sleeve 230 could inadvertently move laterally prior to insertion of the container rim and prevent proper insertion of the container rim and closure 204, potentially jamming the system. Thus, it is essential that the sleeve 230 is maintained in a neutral position until contact by the roller 250 and is returned to a neutral position after contact with the roller 250 ceases. The teeth 231 ensure this positioning.

The teeth 231 may bias the peripheral sleeve 230 to a laterally neutral and/or stationary position (i.e. FIG. 12), but the teeth 231 may flex somewhat to allow the peripheral sleeve 230 to move laterally when pressure is applied by the roller 250 (i.e. FIG. 14). Thus, when the roller 250 presses into the exterior surface of the sleeve 230, at least those the teeth 231 adjacent the portion of the sleeve 230 that is receiving the pressure may flex inwardly and allow the sleeve 230 to move axially (laterally) inwardly. As the roller 250 and/or sleeve 230 rotate, the correspondingly adjacent teeth 231 flex inwardly. Likewise, when tension is released from a circumferential portion of the sleeve 230, the circumferentially corresponding teeth 231 may relax to their neutral position. This process repeats through the rotations.

In an embodiment, the teeth 231 provide a spring-like mechanism. In a particular embodiment, the teeth 231 may prevent rotational movement of the peripheral sleeve 230 in a direction that is opposite that direction which is desired. For example, the teeth 231 shown in FIG. 36 may allow the sleeve 230 to rotate in a counterclockwise direction, but may prevent rotation in a clockwise direction. Thus, the teeth may flex in one direction but may not flex in the other direction, preventing such rotation. In other embodiments, the sleeve 230 may rotate in either direction, but the angle/curve of the teeth is directionally related to the rotation of the sleeve 230. For example, the teeth 231 shown in FIG. 36 may be designed for a sleeve 230 which rotates in a counterclockwise direction even if it does not prevent rotation in a clockwise direction.

As shown in FIGS. 13-14, the o-ring 234 may be positioned in a downward-facing o-ring recess formed into the downward-facing surface within the peripheral sleeve 230. The upward-facing surface of the upper portion 220a of the chuck 220 may be positioned under the downward-facing o-ring recess to hold the o-ring 234 in place. The o-ring 232 may be positioned in an inward-facing o-ring recess formed into an inward-facing surface toward the top of and inside the peripheral sleeve 230. The radially outward-facing surface of the neck portion 220c of the chuck 220 may be positioned adjacent to and inside the o-ring 232, which may help keep the o-ring 232 inside the inward-facing o-ring recess. The downward-facing and inward-facing o-ring recesses may have a simple U-shaped cross-section with somewhat squared corners.

As the peripheral sleeve 230 moves laterally relative to the chuck 220, the o-ring 234 may slide along the upward-facing surface of the upper portion 220a of the chuck 220. In some embodiments, as the peripheral sleeve 230 moves laterally relative to the chuck 220 the o-ring 232 may contact the radially outward-facing surface of the neck portion 220c of the chuck 220, thereby resisting the lateral motion of the peripheral sleeve 230 and acting as a compressible side stop.

In other embodiments, the one or more o-rings (232, 234, 238) could be substituted with a lightweight, wavy, spring steel insert in place. In such an embodiment, the spring steel insert may be less prone to compression set and may be better able to re-center the sleeve 230 after it has been driven eccentrically. Further, in other embodiments, the one or more o-rings (232, 234, 238) could be substituted with numerous small springs, lateral to the axis.

Roller

With further reference to FIGS. 12-14 and 51, the assembly module 200 may include a roller 250 configured to press laterally against the peripheral sleeve 230 and thereby press a portion of the folded peripheral skirt 209 of the closure 204 against the exterior surface 208 of the sidewall 206 of the container 202. Pressing the peripheral skirt 209 against the exterior surface 208 of the sidewall 206 may aid in the fusing process discussed in further detail herein.

In some embodiments, as shown in FIGS. 12-14, the roller 250 may press laterally against the body portion 230b of the peripheral sleeve 230. In other embodiments (see FIG. 51), the roller 250 may press laterally into the neck portion 230a and/or shoulder portion 230c of the peripheral sleeve 230. In any case, the pushing and compressing action of the peripheral sleeve 230 operates similarly.

The roller 250 may be configured to move laterally relative to the chuck 220 to push against the peripheral sleeve 230 using a pushing force. The peripheral sleeve 230 may be configured to shift eccentrically relative to the expanding collet 210 and/or the chuck 220 when pushed by the roller 250. In this way, as the roller 250 applies its pushing force on the peripheral sleeve 230, the pushing force causes the peripheral sleeve 230 to shift eccentrically and pinch a portion of the folded peripheral skirt 209 of the closure 204 between the inner brim surface 237a of the peripheral sleeve 230 and the exterior surface 208 of the container 202.

As shown in FIGS. 12-14, the radially outward-facing surface of the roller 250 may include one or more roller o-rings. The roller o-rings may fit snugly into curved grooves formed around the radially outward-facing surface (e.g., circumference) of the roller 250. In some embodiments, the roller o-rings may be expandable and stretched to fit into the curved grooves in the outward-facing circumference of the roller 250. In this way, the contracting force of the roller o-rings may aid in keeping the roller o-rings in place within the grooves. In some embodiments, the roller o-rings made from foam, rubber, silicone, and/or another compressible material. As the roller 250 moves laterally relative to the peripheral sleeve 230 and chuck 220, the roller o-rings may be positioned to contact the substantially vertical radially outward-facing surface of the peripheral sleeve 230. The lateral force of the roller 250 on the peripheral sleeve 230 may cause the roller o-rings to at least partially compress. The at least partially compressed roller o-rings may help to provide a controlled pressing action of the roller 250 on the peripheral sleeve 230, and thereby, the peripheral sleeve 230 against the peripheral skirt 209 of the closure 204 and exterior surface 208 of the container 202.

As the roller 250 forces the peripheral sleeve 230 to move laterally with respect to the chuck 220, the o-ring 232, acting as a compressible side stop, may resist the pushing force of roller 250 against peripheral sleeve 230. The pushing force of the roller 250 may cause the radially inward-facing surface of the inward-facing o-ring recess to compress the o-ring 232 against the radially outward-facing surface of the neck portion 220c of the chuck 220. In this way, the o-ring 232 may help minimize any damage to the chuck 220 caused by the peripheral sleeve 230. Additionally, the resistance of the o-ring 232 may aid in the controlled pressing action of the peripheral sleeve 230 against the peripheral skirt 209 of the closure 204 and exterior surface 208 of the container 202.

Additionally, the roller 250 may be configured to freely rotate. In this way, as the roller 250 makes contact with the peripheral sleeve 230 that is rotating substantially in sync with the rotational speed of the container 202, the roller 250 may also rotate to minimize any damaging or slowing frictional forces between the roller 250 and the peripheral sleeve 230.

The expanding collet 210 may be configured to resist the pushing action of the roller 250 through its engagement with the chuck 220. In an embodiment, the hoop strength of the container may additionally resist the pushing action of the roller, working to retain its manufactured diameter. In some embodiments, the assembly module 200 may include a side stop 238 (e.g., a compressible o-ring) positioned between the peripheral sleeve 230 and expanding collet 210 to minimize any damage that could otherwise be caused by the pushing action of the roller 250 shifting the peripheral sleeve 230 against the expanding collet 210, particularly when there is no closure 204 and/or container 202 present to pivot the collet segments 212 of the expanding collet 210. Alternatively, in some embodiments, the expanding collet 210 may be timed and/or otherwise synchronized with the system such that the collet segments 212 of the expanding collet 210 automatically shift without requiring the upward force of the container 202.

After assembly, the closure 204 is countersunk vertically downward with respect to the rim 205 of the container 202, forming a bottom portion and a countersink portion 244. The countersink portion 244 comprises the chuck wall 242 folded and pressed against the interior surface 207 of the open end 203 of the container 202. The bottom portion comprises the central portion 240 stretched across and inserted into the open end 203 of the container 202. The bottom portion and countersink portion 244 may each extend below the rim 205 of the container 406 (e.g., as shown in FIG. 3). In some embodiments, after assembly, the closure 204 may form an outer wrapped portion comprising the peripheral skirt 209 pressed and/or folded over (and around) the rim 205 of the container 202. The outer wrapped portion may also comprise the peripheral skirt 209 pressed against the exterior surface 208 of the sidewall 206 of the container 202.

As depicted, the chuck 220 and expanding collet 210 of the assembly module 200 are positioned above the container 202, however, it should be noted that other orientations are possible. For example, the chuck 220 and expanding collet 210 may be axially aligned horizontally, and the containers 202 are conveyed past in a sideways orientation and moved toward the chuck 220 from the left and/or right. As another example, the chuck 220 and expanding collet 210 may be mounted at about 45° or other angle facing down and to the side, while the containers 202 are conveyed to the chuck 220 and expanding collet 210 at a substantially equivalent angle thereby axially aligning each container 202 with the expanding collet 210 during assembly of a container 202 with a closure 204.

While disclosed in terms of rigid paper-based composite containers and paper-based end closures, the containers 202 and closures 204 used with the assembly module 200 may be made from other materials (e.g., plastics, metals, pulps, resins).

As shown in FIGS. 15-17, the operation of the assembly module may include the expanding collet initially in its unexpanded state, where the collet segments rest on the chuck unpivoted. As the container moves axially toward the chuck, the rim of the container actuates the expanding collet, thereby pivoting the collet segments about their respective pivot points until the expanding collet reaches its fully expanded state, where the structure of the chuck prevents the collet segments from pivoting any further. In some embodiments, the chuck and/or expanding collet may include a resistance feature (e.g., compressible back stop 227) that resists the pivoting of the collet segments at some point before they reach the maximum pivot angle. The resistance feature may allow the expanding collet to provide a controlled pressing action of the closure against the interior surface of the container, as the container continues to move axially toward the chuck.

In embodiments wherein the closure 204 is a recessed closure (see FIG. 2D), the pressure of the expanding collet against the closure 204 and the interior sidewall 207 of the container 202 is sufficient to seal the second deformed surface 204d of the closure 204 against the interior sidewall 207 of the container 202. In this embodiment, there is no portion of the closure 204 (i.e. a skirt) that folded over the rim 205 of the container. In an embodiment, a benefit of the expanding collet system described herein is that it can be utilized with containers having varied diameters and thicknesses (of the sidewall, that is) and with closures having varied diameters and thicknesses. The system can close and seal one set of containers and then may be used later to close and seal a different set of containers having a different container sidewall thickness, different container diameter, different closure thickness, and/or a different closure diameter. This provides a dynamic system that can be utilized for more than one container type. In an embodiment, the expanding collet system can effectively close and seal a container and closure having a thicknesses of 0.010 mm, within a ±0.25 mm tolerance, which could represent as much as 25% of the total assembled wall thickness. This is a significant improvement over equipment known in the art which requires significantly less material thickness variation.

In other embodiments, however, while the container is moving axially toward the chuck to actuate it to its fully expanded state, the rim 205 of the container 202 forces the peripheral skirt 209 of the closure past the brim 237a of the peripheral sleeve 230, thereby folding the peripheral skirt 209 of the closure around the rim 205 of the container between the inner brim surface of the peripheral sleeve and the exterior surface 208 of the container.

In some embodiments, after the expanding collet is in its fully expanded state (e.g., when the container is fully actuating the expanding collet and no longer moving axially toward the chuck), as the roller moves laterally toward the chuck, the roller o-rings push against the exterior of the peripheral sleeve. The lateral pushing force of the roller causes the peripheral sleeve to shift eccentrically relative to the central axis of the chuck, thereby pressing the folded peripheral skirt of the closure between the inner brim surface of the peripheral sleeve and the exterior surface of the container. The roller may then move laterally away from the chuck to return to its initial position, thereby allowing the peripheral sleeve to re-center itself relative to the central axis of the chuck. In the embodiment wherein the closure 204 is recessed within the container body 202 as shown in FIG. 2D, the roller and peripheral sleeve may operate against the outer sidewall 208 of the container without any intervening closure portion (i.e. skirt). In another embodiment wherein the closure 204 is recessed within the container body 202 as shown in FIG. 2D, the roller and peripheral sleeve may not be present and/or may not be operated.

After the closure has been fully assembled with the container 202 to become the container assembly 406, the container assembly may move axially away from the chuck 220. As the container assembly 406 moves axially away from the chuck 220, the collet segments 212 may rest on the terminal end of container assembly as they pivot back to their positions in the unexpanded state.

FIGS. 42 and 43 show an alternative embodiment of the roller 250 and peripheral sleeve 230 configuration. In this embodiment, rather than the roller 250 pressing against a sidewall 249 of the peripheral sleeve 230 (see FIG. 15), instead, the roller 250 presses against a neck portion 247 of the peripheral sleeve 230. Thus, in this embodiment, the neck portion 247 of the peripheral sleeve 230 is circumferentially narrower than the remainder of the peripheral sleeve 230. The radially inward pressure that the roller 250 places on the neck 247 of the peripheral sleeve 230 is sufficient to cause the actions described herein. Furthermore, this configuration may provide more space for the fusing module, described below. This configuration may allow the fusing module to be positioned adjacent the sealing edge of the container (outside the sleeve 230).

Fusing Module

In another embodiment, the system may include a fusing module 300 for fusing the closure 204 (e.g., paper-based end closure) to the container 202 (e.g., rigid composite can). In some embodiments, the fusing module 300 may be integrated with the assembly module 200, such that the closure 204 may be fused to the container 202 concurrently with the assemble and press methods. In some embodiments, the fusing module 300 may comprise induction coils 302 that are physically integrated into the assembly module 200, such that the closure 204 may be fused to the container 202 using a combination of the assemble and press methods and the induction coils 302. As noted, the fusing module 300 may employ inductive heating techniques to fuse the closure 204 to the container 202. In such embodiments, the fusing module 300 may include at least one induction coil 302.

In some embodiments, the induction heater may include a coil through which a high-frequency alternating current is passed, thereby creating a high-frequency alternating electromagnetic field. The metal layer of the closure 204 and/or container 202 is exposed to this alternating electromagnetic field, which induces eddy currents (also called Foucault currents) within the metal so as to cause Joule heating due to of the resistance of the metal. This heating of the metal layer then causes heat transfer by conduction to anything in contact with the metal, including any heat-sealable material(s) on the closure and/or side wall.

In an embodiment, a composite conductor 304 may be utilized to hone or focus the inductive energy of the coil(s) 302 toward the container 202/closure 204. Shown in FIGS. 42 and 43, the composite conductor 304 may have a curved body which directs and reflects the energy and magnetic field lines from the coils 302 toward the container 202/closure 204. The specific curvature of the composite conductor 304 may be based on the design of the coils 302. For example, in some embodiments, the composite conductor 304 may comprise a half-moon, U-shape, or C-shape. In some embodiments, the composite conductor 304 may have one or more sections that may be continuous or discontinuous. For example, if two coils 302 are present, two separate composite conductors 304 may be utilized.

The composite conductor 304 may comprise ferrous material suspended in a composite, which is then baked and hardened into the desired form. That being said, the composite conductor 304 may comprise any conductor known in the art. In an embodiment, the composite conductor 304 may be affixed to the induction coils 302. The coils 302, in turn, may be adjacent the peripheral sleeve 230.

In an embodiment, the closure 204 may comprise at least one metal or metalized layer and at least one heat-sealable layer. In an embodiment, the container sidewall 206 may comprise at least one metal or metalized layer and at least one heat-sealable layer. When the metal layer(s) are heated by induction heating, the heat-sealable layer(s) are heated by conduction, which causes the heat-sealable material to be softened or melted.

In some embodiments, the induction heating of the seam, followed by cooling (which occurs rapidly upon cessation of the electromagnetic field or movement of the container away from the coil), may result in two areas of thermal fusing between the closure 204 and the sidewall 206 of the container 202. There may be an inner seal between the interior surface 207 of the sidewall 206 and a portion of the chuck wall 242 that lies parallel to and intimately contacts the sidewall 206, and there may be an outer seal between the exterior surface 208 of the sidewall 206 and a portion of what was the peripheral skirt 209 of the closure 204 prior to assembly. Likewise, in recessed embodiments such as is shown in FIG. 2D, the induction heating system may thermally fuse only the second deformed portion 204d against the inner surface 207 of the container 202.

In an embodiment, the induction coils may be disposed in a manner which optimizes the sealing function of the system. Examples of such coil arrangements are shown in FIGS. 19-35. In some embodiments, the induction coils may comprise single turn coils. In an embodiment, the coil configuration is a hairpin coil. In some embodiments, as shown in FIG. 45, the coil may comprise a flattened coil, such as a coil that has a rectangular cross-section.

In some embodiments, the induction coils apply heat for approximately 0.1 to 1.0 seconds. In other embodiments, the induction coils apply heat for approximately 0.3 to 0.6 seconds.

In some embodiments, the chuck 220 and/or expanding collet 210 of the present disclosure are not metallic (e.g., they may comprise a polymeric material) to avoid heating/overheating of those elements. In some embodiments, after induction sealing, the container 202 is sealed and ready to be discharged from the chamber.

Many modifications and other embodiments of the present disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A module for separating a closure from a closure supply and transferring the closure to a container body, the module comprising:
    a transfer dial having at least one spindle, the transfer dial being rotatable about a first axis;
    at least one head connected to the at least one spindle of the transfer dial, the at least one head rotatable about a second axis, the at least one head comprising:
    a vacuum cup disposed on an end of the at least one head; and
    a port disposed within the vacuum cup, wherein the port is in fluid communication with a gas source such that the port can expel gas or create a vacuum via gas suction;
    a closure supply, wherein the vacuum cup is configured to engage a closure from the closure supply with application of gas suction from the port to create a vacuum between the vacuum cup and the closure, rotate the closure about the first axis and the second axis, and transfer the closure to a container body, and wherein the container body is rotatable about a third axis.

2. The module of claim 1, wherein the port is configured to additionally expel gas during transfer of the closure to a container body.

3. The module of claim 1, wherein the first axis and the second axis are parallel.

4. The module of claim 3, wherein the first direction is different than the second direction.

5. The module of claim 3, wherein the first direction is the same as the second direction.

6. The module of claim 3, wherein the third axis is perpendicular to the first axis.

7. The module of claim 1, wherein the at least one spindle of the transfer dial rotates about the first axis in a first direction, and the at least one head rotates about the second axis in a second direction.

8. The module of claim 1, wherein the transfer dial and the at least one head rotate independently.

9. The module of claim 1, wherein the vacuum cup contacts a non-product-facing surface of the closure.

10. The module of claim 1, wherein the closure supply is a supply of stacked closures.

11. The module of claim 1, wherein a servo-driven screw mechanism receives the closure from the vacuum cup and places the closure on a container body.

12. The module of claim 1, wherein the container body is disposed in a rotary turret.

13. The module of claim 12, wherein the rotary turret is a pocketed turret.

14. The module of claim 13, wherein the rotary turret and the transfer dial are continuously rotating.

15. A method of separating a closure from a closure supply and transferring the closure to be applied to a container body, the method comprising:
    rotating a transfer dial about a first axis;
    positioning a head, connected to at least one spindle of the transfer dial, in contact with the closure, the head connected to the at least one spindle, rotatable about a second axis, wherein the head comprises:
        a vacuum cup disposed on an end of the at least one head; and
        a port disposed within the vacuum cup, wherein the port is in fluid communication with a gas source such that the port can or create a vacuum via gas suction;
    applying a suction force between the vacuum cup and the closure;
    moving the closure from the closure supply to a container body;
    releasing the closure onto the container body via cessation of the suction force, wherein the container body is rotatable about a third axis.

16. The method of claim 15, wherein the third axis is perpendicular to the first axis.

17. The method of claim 15, wherein the port is configured to additionally expel gas.

18. The method of claim 17, wherein the releasing step comprises expelling gas from the port toward the closure.

19. The method of claim 15, comprising rotating the at least one spindle about the first axis in a first direction, and rotating the at least one head about the second axis in a second direction.

20. The method of claim 15, wherein the first axis and the second axis are parallel.

* * * * *